United States Patent [19]

Hall et al.

[11] Patent Number: 4,470,562

[45] Date of Patent: Sep. 11, 1984

[54] POLARIS GUIDANCE SYSTEM

[75] Inventors: Eldon C. Hall, Wollaston; Joseph D. Sabo, Arlington; Samuel A. Forter, Hingham; Ralph R. Ragan, Lincoln; J. H. Laning, West Newton; David G. Hoag, Medway; Wallace E. Vander Velde, Winchester; Daniel J. Lickly, Melrose; Edward M. Copps, Jr., Arlington, all of Mass.

[73] Assignee: The United States of America as represented by the Secretary of the Navy, Washington, D.C.

[21] Appl. No.: 502,717

[22] Filed: Oct. 22, 1965

[51] Int. Cl.³ .................... F41G 7/36; F42B 15/18
[52] U.S. Cl. ................................ 244/3.2; 244/3.22
[58] Field of Search ........................ 35/150.25; 244/3.2–3.22, 77; 60/230

[56] References Cited

U.S. PATENT DOCUMENTS

| 2,946,539 | 7/1960 | Fischel | 244/3.2 |
|---|---|---|---|
| 3,003,312 | 10/1961 | Jewell | 60/230 |
| 3,078,042 | 2/1963 | Grado | 244/3.2 |
| 3,164,340 | 1/1965 | Slater et al. | 244/3.2 |
| 3,219,293 | 11/1965 | Parker et al. | 244/3.2 |
| 3,231,726 | 1/1966 | Williamson | 244/3.2 |
| 3,249,324 | 5/1966 | Coffman | 244/3.2 |
| 3,301,508 | 1/1967 | Yamron | 244/3.2 |

Primary Examiner—Charles T. Jordan
Attorney, Agent, or Firm—Robert F. Beers; Arthur L. Branning

[57] ABSTRACT

An inertial guidance system for a rocket powered ballistic missile which provides navigation and control while the missile is proceeding in its flight trajectory. Signals are generated within the confines of the missile and without outside information representative of angular and linear motion of the missile with respect to an inertial frame of reference, a digital computer compares these signals against a preset parameter stored in the computer to provide control signals along the pitch and yaw axes. An autopilot uses these control signals to provide mechanical control movements, and an exhaust nozzle deflection arrangement connected to the autopilot deflects the exhaust of the rocket for guidance along a predetermined flight trajectory.

31 Claims, 31 Drawing Figures

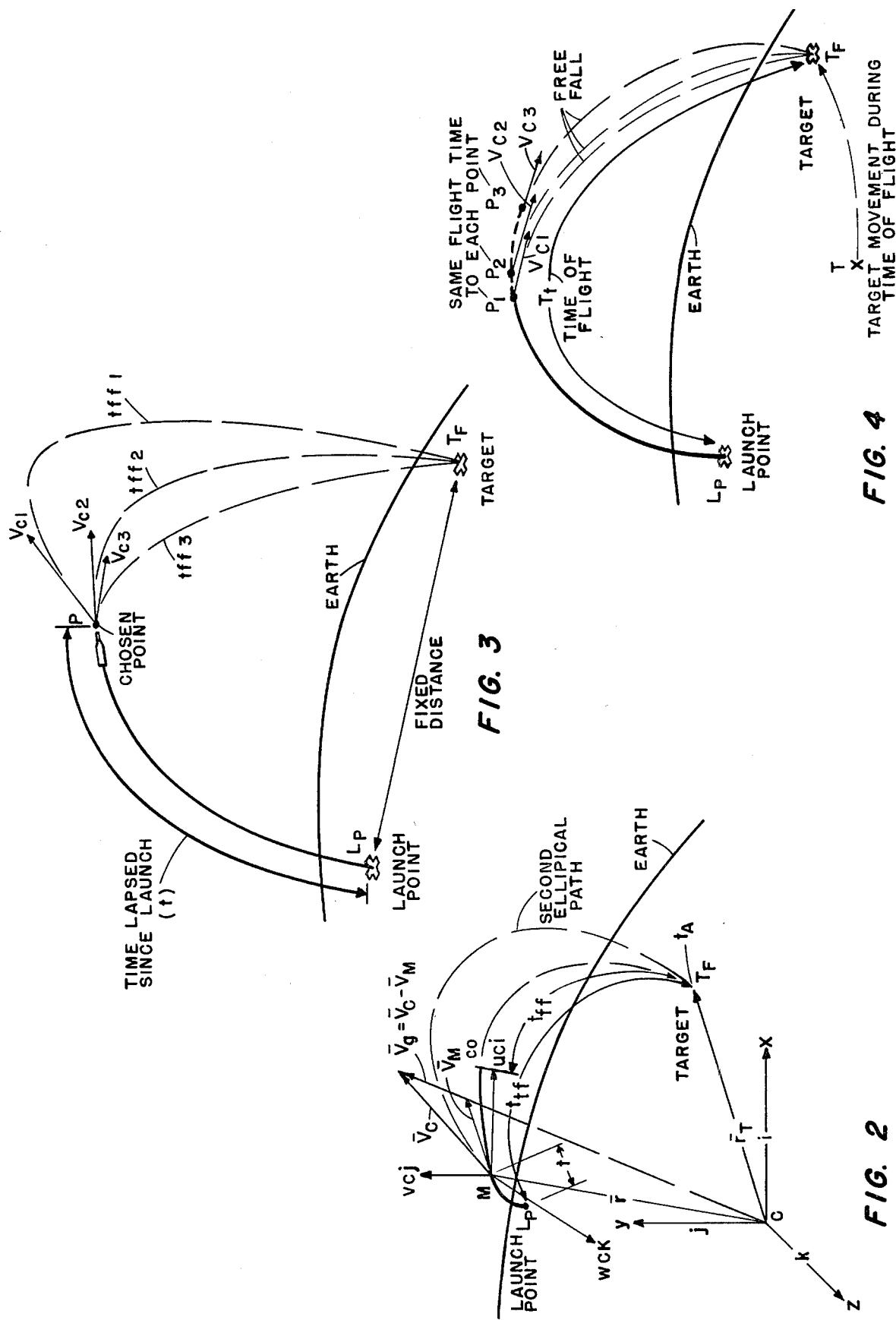

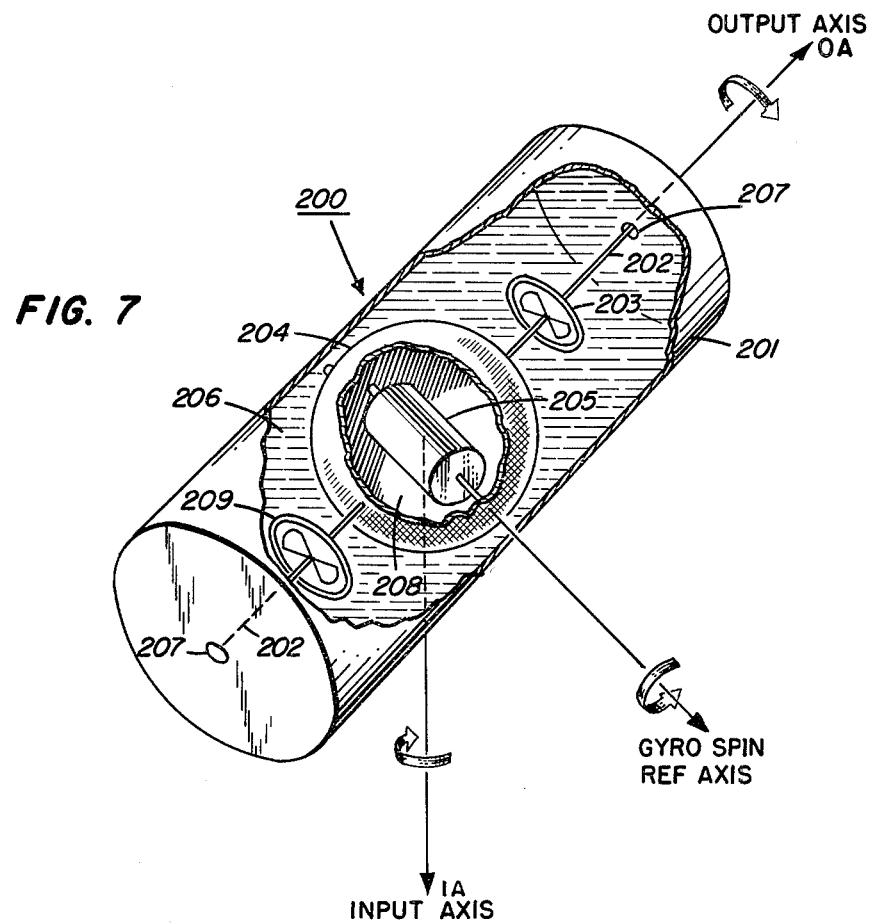
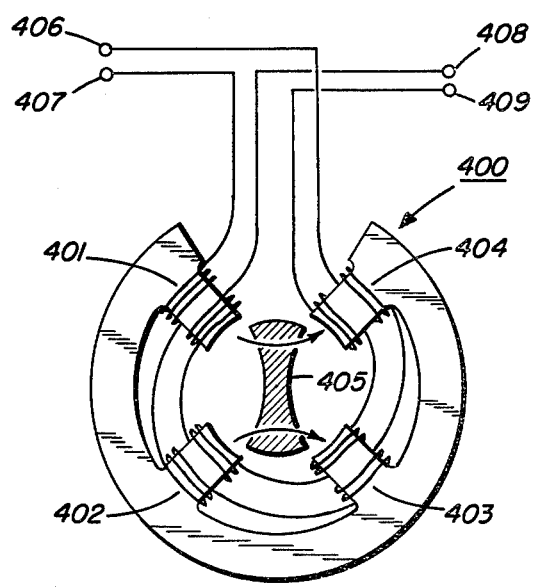
FIG. 7
FIG. 8

JETEVATORS 1 & 3 WORKING COUNTER FOR ROLL
JETEVATORS 2 & 4 WORKING COUNTER FOR ROLL

NEUTRAL POSITION

PITCH & YAW CORRECTION

JETEVATORS 1 & 3 WORKING IN COORDINATION FOR PITCH
JETEVATORS 2 & 4 WORKING IN COORDINATION FOR YAW

FULL DEFLECTION

POLARIS GUIDANCE SYSTEM

This invention relates to rocket powered guided missiles, and more particularly, to an inertial guidance system for providing navigation and control for an intercontinental ballistic missile while it is proceeding in a flight trajectory to a target.

Navigation and steering are techniques necessary to a guidance system. Navigation may be accomplished by the simplest type of pilotage; i.e., observation of a present position by reference to known points of reference on a map and operation of the speed or magnitude of motion and the direction to or from a reference point. Once a position has been established, with regard to a reference point, it then becomes necessary to change or maintain motion and direction in order to travel from a present position to some desired destination. Whenever guidance problems become complex, it is necessary to provide additional or other apparatus to augment the map or chart used in pilotage. In many cases, automatic or semi-automatic apparatus is necessary to solve the navigation and steering problems in order that instantaneous solutions are effected for the most efficient guidance techniques possible.

Numerous techniques have been used and are presently in use for providing guidance for missiles or vehicles. Some are totally automatic while others have various degrees of automatic control. Prior ballistic missiles use various forms of radar or optical systems for monitoring the guided phase of a missile in flight. One such technique uses a system in which radar measures the velocity and position of a missile as it travels along a flight trajectory. The position of the missile trajectory at each point in time is compared with the position the missile should have had in accordance with an ideally computed trajectory. The difference in various variables (velocity, direction, etc.) is computed at radar or optical observation positions or tracking stations, and suitable corrective command signals are transmitted to the missile's flight control to bring the missile back to the ideal trajectory. However, under conditions other than ideal, it is generally impractical to cause the missile to be brought back to an ideal trajectory, since the corrections necessary may require abrupt directional changes and these changes could be great enough to cause structural failure of the missile. Therefore, small increments of change are usually commanded to the missile, as it proceeds along its flight trajectory, to cause it to fly as close to the ideal flight trajectory as possible. This technique is not usually feasible, since it may cause inefficient rocket fuel consumption, and it is necessary to provide continuous control to the missile at all times.

Another system, with much the same technique as that discussed above, is the technique of computing a new trajectory at each or predetermined points along the actual missile trajectory, and adjusting the direction and velocity of the missile accordingly, to provide a new time of flight and cut-off condition to cause the missile to impact on the target or within a predetermined area of the target.

The two techniques generally discussed above have essentially the same disadvantages; that is, control is needed from observation or tracking points along the missile's direction of travel, and command signals must be transmitted to control the missile as it is in flight. Militarily, this is not feasible because of the possibility of losing control of the missile due to failure of missile reception to the command signal, or due to the inability of the command signals to break through enemy jamming signals or possible interfering atmospheric conditions.

A guidance system technique was necessary which would be completely self-contained, and capable of furnishing all of the elements required for control of a ballistic missile once it is launched. The inertial guidance technique offered the most practical solution to providing a guidance system that is wholly contained in the missile. The inertial concept is based upon measurements made with respect to inertial space; that space and reference frame for which Newton's law of motion is valid. Generally, the inertial guidance measurements made with respect to inertial space are those measurements which involve angle and/or linear motion of a frame of reference with respect to an inertial frame of reference.

As is well-known to those in the ballistic arts, Germany during World War II was the first to develop a practical long-range ballistic missile which demonstrated the feasibility of inertial guidance in military missiles. The Germany V-2 missile guidance system used a platform stabilized along three axes. Mounted on this platform were spring mass accelerometers which sensed missile accelerations, and controlled the missile in accordance with signals received. The early inertial guidance systems have proven so sound that substantially all of their basic principles form a basis for the more advanced guidance systems which require the solution of complex guidance situations. Basically, the V-2 rocket operated on the principle that once the missile is launched and is traveling through the atmosphere of the earth along a particular trajectory path, its point of impact on the earth's surface will depend upon the trajectory of the missile at the point at which its rocket motor stopped; this point known as cut-off. At this point (cut-off), the missile falls freely under the influence of the earth's gravitational field to impact on the earth's surface. Missiles of the ICBM and IMBM ranges, which use guidance systems employing this principle, need only be guided by either internal or ground electronic apparatus for relatively short distances, and allowed after termination of powered flight to continue along a free path to the target.

The instant guidance system is capable of being used in missiles which may be launched from either fixed or mobile positions; for example, underwater and underground launching sites or mobile surface or underwater vehicles. Ballistic missiles of these types are usually designed to be fired to impact on preselected targets, which are positioned on the earth's surface relative to the launching point of the missile. Usually, the initial stages of missile flight are guided, and the missile is powered to a predetermined point along its flight trajectory by various stages of rocket engines. As these engine stages burn out, they are activated to drop off at predetermined intervals during the missile flight trajectory, in order to lessen the weight of the missile as it proceeds along its flight trajectory. As the last powered stage burns out and separates from the missile re-entry body (which contains the warhead), the re-entry body falls to the target in the same manner as a ballistic shell emerging from a gun barrel; the point of separation of the ballistic shell and the gun barrel being similar to the point of cut-off of power on a powered missile. Both the ballistic shell and the ballistic missile free fall to the target under the influence of the gravitational pull of the earth.

If the missile were capable of generating a tremendous initial velocity, and if it could be pointed in the proper direction at the instant of firing, then its ballistic trajectory would be the same as that of an equivalent artillery shell emerging from a gun barrel which has received all of its propulsive force by the time it leaves the gun barrel. Since powered missiles have the characteristics of only developing a small initial velocity, as they travel from the launching apparatus, a guidance system is required. Also, since a ballistic missile's flight history for any given flight trajectory is affected by variables such as water to air angle of emergence, weather conditions, and emergence of the missile through relatively dense portions of the atmosphere and the like, it is difficult, if not impossible, to predict a standard flight trajectory. In addition to the above factors, powered missiles have flight characteristics such that one missile will not perform identically to another. If all missiles could be manufactured to have identical thrust, weight, aerodynamics, etc., and if the atmospheric properties at launch and along a predetermined flight trajectory could be determined, the missile would require only an extremely simple guidance system. Thus, a programmed auto-pilot would be the only essential apparatus necessary to control the launch phase of the flight, and to steer the missile to the optimum pitch angle necessary for the most efficient travel to the target area. Therefore, identical performance of all missiles would permit precalculation of missile position and velocity with respect to time of flight, and the designated time of separation of the re-entry body from the last stage of the missile could then easily be controlled by a time command signal.

However, it is obvious that missile performances will vary from one manufactured missile to another. The position of the non-standard missile is a function of missile velocity and is not predictable; therefore, the non-standard missile will not attain predetermined velocity components at given times along its flight trajectory the same as the velocity components of its standard counterpart. In addition, there is the effect of the velocity of the earth's rotation at launch point. With a non-standard missile, also, the total time of flight will vary, and since there is no east-west relative motion due to the earth's rotation, a variation of time of flight by the various missiles will result in an east-west target error.

In the inertial guidance system of the instant invention, all necessary target direction information is generated by a sensing system which measures acceleration forces acting on the missile structure as it proceeds along its flight trajectory. The sensing system provides information to a self-contained guidance system, in the missile, which further provides correction signals to the flight control system of the missile to achieve flight control. The guidance system directs the missile along the most efficient flight trajectory, and further performs this function without the aid of control signals transmitted to the missile after launching. The concept of the instant guidance system is based upon "correlated velocity." The "correlated velocity" of a projectile of any point in space is defined as the velocity which will carry the projectile by unguided flight to a specific target. For example, it is known that as a missile or projectile traveling through space has, at every point along its flight trajectory, a unique velocity of such a magnitude that the missile can, if it attains that velocity at that point, go immediately into free-fall with a certainty of hitting the target. It should be noted that velocity is a vector quantity having both magnitude and direction, and that when the word velocity is used, both of these words are implied.

Now, assuming that the missile is guided and controlled along its entire flight according to the above-stated principle, if the missile velocity vector happened to be equal to the "correlated velocity" at the point on a flight trajectory under consideration, the thrust could then be terminated and the missile would continue in ballistic free-fall to the target. Consider now, the case of the missile arriving at the predetermined point on a predetermined trajectory where the "correlated velocity" does not equal the missile velocity, then the missile, if it were to maintain the flight on the predetermined flight trajectory path, would have to gain or lose velocity in order to reduce to zero the difference between the actual missile velocity and the "correlated velocity" at the predetermined point on the predetermined trajectory. This difference in velocity will be referred to hereafter as a "velocity-to-be-gained."

The guidance system of the instant invention continuously computes the instantaneous values of the velocity-to-be-gained and uses steering commands to the flight control system, which controls the missile thrust, for reducing the velocity-to-be-gained so that it approaches zero. At the time the velocity-to-be-gained becomes zero, the thrust of the missile is terminated, and the missile is allowed to continue on a ballistic free-fall with a certainty of hitting the target.

An object of the present invention is the provision of an inertial guidance system which may be used in space vehicles and missiles.

Another object of the present invention is to provide an all inertial guidance system for a ballistic missile.

A further object of the present invention is to provide a simple and compact guidance system for a missile.

Yet another object of the present invention is to provide a completely self-contained compact guidance navigation system for rocket-powered missiles.

Another object of the present invention is the provision of a guidance system which automatically modifies the programmed flight of the missile in order to compensate for any variations from standard conditions which the missile may encounter as it proceeds along its flight trajectory to the target area.

Yet another object of the present invention is the provision of a self-contained navigation and control system for a rocket-powered intercontinental ballistic missile which requires little warm-up time, and which may be launched rapidly without substantial loss of missile accuracy.

A further object of the present invention is the provision of an inertial guidance system which is capable of controlling a non-standard ballistic missile to a predetermined target.

A still further object of the present invention is to provide an inertail guidance system for a powered ballistic missile that is guided in the initial stages of flight, and which falls to the target ballistically in the final stage of flight.

Another object of the present invention is to provide an accurate system for guiding a missile wherein the guidance terms are largely replaced by zero or a constant.

Yet another object is the provision of an inertial navigation guidance and control system for a ballistic missile wherein guidance sensing components are arranged to minimize the effects of acceleration on their error performance factor.

Still another object is to provide an inertial guidance system which uses a technique of guiding intermediate-range and long-range missiles along a flight trajectory to a given target without having to provide reference signals to a space positioned trajectory for correction.

A further object of the present invention is to provide an inertial guidance system which does not require any information signals from sources external of the missile to guide it in flight to a predetermined position in space.

Still a further object of the present invention is to provide an inertial guidance system which is immune to enemy jamming techniques.

Another object of the present invention is the provision of an inertial guidance system for a powered missile which will not radiate external signals and will, therefore, preclude detection of the missile by the enemy.

Yet another object of the present invention is the provision of an inertial guidance system that transmits information to the control system of the missile for completely correcting external aerodynamic effects upon the missile's structure caused by variations in atmospheric conditions.

An additional object of the present invention is to provide an inertial missile capable of operating under all types of atmospheric conditions and disturbances.

An object of the present invention is the provision of an inertial navigation system for a missile which will not be affected by ionization of air which may surround the missile as it travels at high speeds through dense portions of the atmosphere.

Still another object of the present invention is to provide an inertial guidance system for a ballistic-type missile using techniques which do not require determination of a predetermined missile position along the missile's flight trajectory.

Another object is to provide a guidance system for a powered missile which does not require apparatus for directly measuring missile velocity.

Another object of the present invention is to provide an inertial guidance system for a powered missile which requires an apparatus for measuring or computing the effects of the earth's gravitation upon the missile.

Yet another object is to provide an inertial guidance system for a powered missile which does not require any measurement apparatus to compute the position of the missile in space.

Another object of the present invention is to provide a navigation system which will navigate and control the missile by sensing the velocity changes of the missile as it travels along its flight trajectory, by calculating the change of velocity from a predetermined trajectory after missile departure from an initial position of the earth's surface.

Another object of the present invention is the provision of an inertial guidance system which controls a missile during its powered flight phase.

Another object of the present invention is providing an inertial guidance system that controls a missile during powered flight, and which activates the warhead apparatus.

Still another object of the present invention is the provision of an inertial guidance system that controls a missile during flight, which programmed flight phase is completed before powered cut-off, so that the missile impact point on the earth's surface coincides with the target area.

Another object of the present invention is to provide an inertial guidance system that controls the missile during flight, arms the missile, and activates apparatus for missile body separation.

Still another object of the present invention is to provide a missile inertial guidance system capable of being used with portable rocket-powered ballistic missiles.

Another object of the present invention is to provide an inertial missile guidance system used in missiles which may be moved from one launching site to another.

Another object of the present invention is to provide a missile inertial guidance system used in missiles which have portable launching sites.

A further object of the present invention is to provide an inertial guidance system for a powered missile capable of being launched from underwater, undergound, or space positions to a predetermined target area.

Still another object of the present invention is to provide an inertial guidance system which does not require the restraint of a fixed time of flight.

Another object of the present invention is to provide an all inertial guidance system for a ballistic missile which requires no airborne computation of the gravitational vector.

A further object of the present invention is to provide a simple and compact inertial guidance system for a ballistic missile that requires no airborne computation of target motion due to earth's rotation.

Yet another object of the present invention is to provide an inertial guidance navigation system for rocket-powered missiles wherein the guidance control of the missile does not constrain the missile to fly along a predetermined path.

Yet another object of the present invention is to provide an inertial guidance system for a ballistic missile which has a minimum number of components for satisfactory missile accuracy.

FIG. 2 is a vector representation of the missile trajectory;

FIG. 3 represents the correlated velocity as a function of time;

FIG. 4 shows the target change due to the earth's rotation;

FIG. 7 represents a functional diagram of the gyro;

FIG. 8 represents a functional diagram of the electrical sensing apparatus for the gyro;

The system set forth herein below is essentially a velocity control system for a ballistic missile's guidance system. Therefore, it is not important to know where the missile happens to be at any moment during powered flight, except insofar as the present time and location influence the velocity required to carry the missile by free-fall to the target.

Figure 1:
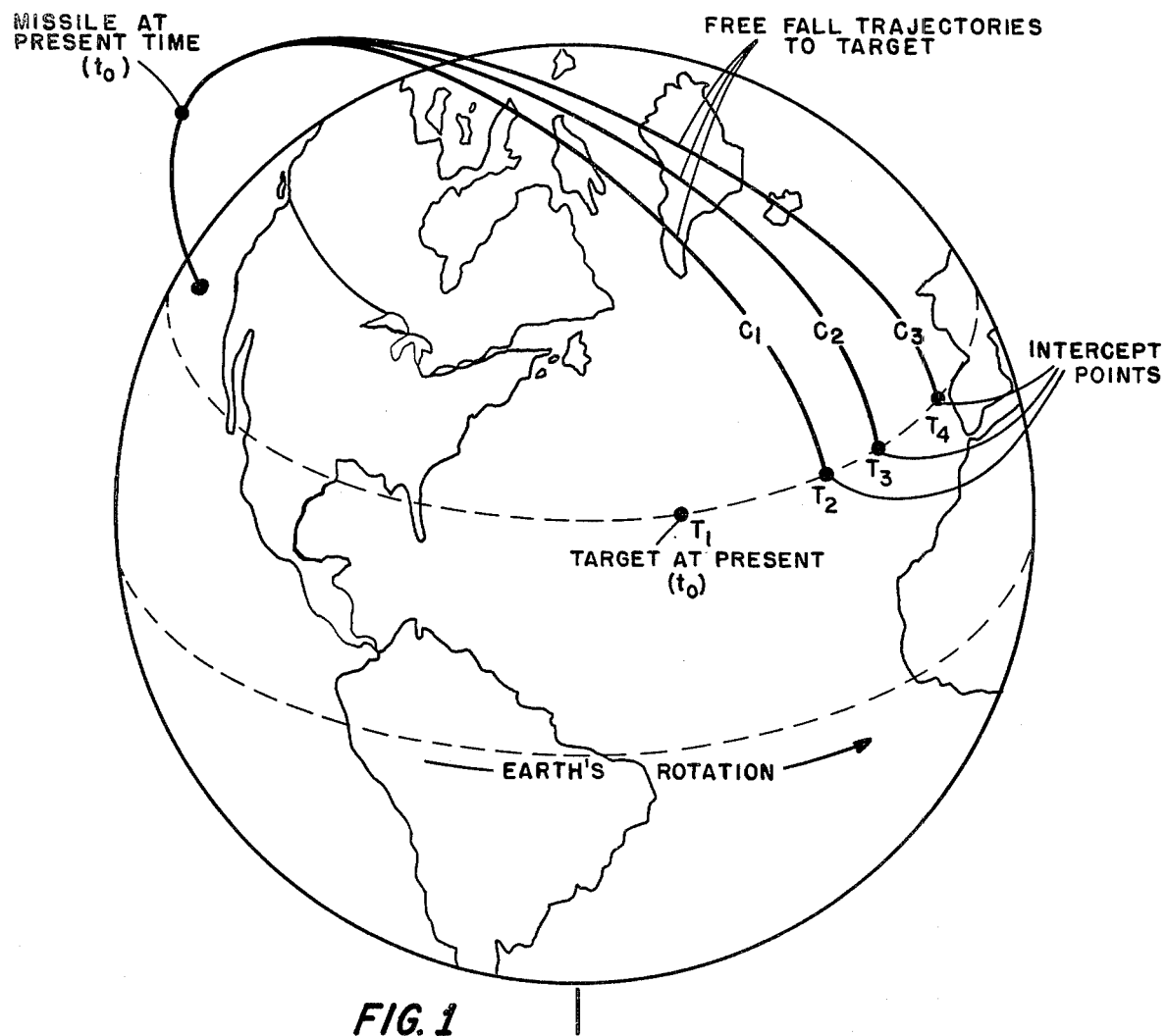
FIG. 1 represents a functional diagram of possible free fall missile trajectories to target.

FIG. 1 of the drawings shows an illustration of free-fall trajectories from an arbitrary point $t_o$ in space and time to a specified target T. Once a target is fixed with respect to earth, at every point in space and time there exists a one parameter family of satisfactory solutions to the free-fall equations. Each member of this family, represented by $C_1$, $C_2$ and $C_3$, produces a trajectory which intersects the path of the target at a different time as the target moves with respect to the surface of the rotating earth from $T_1$ through $T_4$ in a given time. The distance the target moves from $T_1$ to $T_4$ will depend upon its position on the earth's surface.

With reference to FIG. 2 of the drawings, there is shown an illustration of a sector of the earth. A radius vector $\bar{r}$ is drawn from the center of the earth C to a point M that represents the position of the missile at an arbitrary time t after launching. Associated with the position $\bar{r}$ and time t is the "correlated velocity" vector $\bar{V}_c$ referred to in the above description. The vector quantity $\bar{V}_c$ is defined as the velocity vector which would be required by the missile at a specified position and time in order that it might travel thereafter by free-fall in vacuum into a desired terminal condition. The "desired terminal condition" is coincident of the missile impact point and a target T on the earth's surface (neglecting atmospheric effects during re-entry). For applications to ballistic missiles, the vector $\bar{V}_c$ "correlated velocity" is the free-fall velocity which carries the missile to the target at some future time.

Since the missile travels along any one of a number of parameters of velocity vectors, each one of which corresponds to a free-fall trajectory that intersects the path of the target at a different time, a fixed time of flight of the missile from its launcing point to its arrival at the target serves not only to define a single, unique, correlated velocity vector $\bar{V}_c$ but also eliminates the requirement for a target position computer, since the resulting guidance system will control the missile to impact the earth not only at a specified inertial location but also at a specified time, and the inertial location of a target at that time is a fixed vector which is known in advance. For any one flight, the location of the target in an inertial reference frame and a time of arrival at the target are specified constants; thus, the correlated velocity on a given flight is a function of position and time only.

As a further illustration, referring to FIG. 3 which shows a pictorial representation of a missile launch from a launch point, designated as LP, and proceeding to a target $T_F$ at a chosen point P on the missile trajectory, there is shown three different values of correlated velocities $V_{c1}$, $V_{c2}$, and $V_{c3}$ that the missile may have at this point P. Each of these velocities will represent a different time of free flight $t_{ff1}$, $t_{ff2}$ and $t_{ff3}$ needed to impact on the target $T_F$. Assuming a fixed distance between the launch point LP and the target $T_F$ and assuming a fixed total time of flight represented by $t_{tf}$, then $$t_{tf} = t + t_{ff} \tag{1}$$

$t_{tf}$ = time of total flight
t = time elapsed since launch
$t_{ff}$ = time of free flight no matter what combination of position and time is chosen, the only correlated velocity vector $V_c$ allowed is that one associated with the path which permits the missile to impact at the target in the time remaining. Therefore, according to the definition set out above, of correlated velocity $V_c$, the vectors $V_{c1}$, $V_{c2}$, and $V_{c3}$ of FIG. 3 are all correlated velocities, but if the total time of flight equals $t_{TF} = t + t_{ff2}$, only one of these correlated velocities $V_{c2}$ in this example will be permitted by the condition that the total time of flight be constant. This establishes the unique correlated velocity $V_c$ for the chosen point. Thus, with a combination of position and time on the missile trajectory, it is apparent that a different unique correlated velocity exists at each point in the missile trajectory.

In developing the mathematical concept (referring to FIG. 2) of the guidance computation, let the vector $\bar{V}_c$ at point M on the missile trajectory provide a standard of comparison for the actual missile velocity vector $\bar{V}_m$. If equality is attained between $\bar{V}_m$ and $\bar{V}_c$, the missile may fulfill its mission without further application of thrust. If a difference exists between $\bar{V}_m$ and $\bar{V}_c$, then the vector quantity necessary to equalize $\bar{V}_m$ and $\bar{V}_c$ will be a vector defined as $\bar{V}_g$, a "velocity-to-be-gained vector."

$$\bar{V}_g = \bar{V}_c - \bar{V}_m \tag{2}$$

$V_g$ = velocity-to-be-gained vector
$\bar{V}_c$ = correlated velocity vector
$V_m$ = missile velocity vector The vector $V_g$ will then represent the velocity which, if added instantaneously to the present missile velocity $\bar{V}_m$, would permit thrust to be cut off at that instant.

$$\bar{V}_g = 0 \tag{3}$$

$\bar{V}_g$ = velocity-to-be-gained

The above condition is then the desired condition for cut-off of thrust. Also, the direction of $\bar{V}_g$ defines a direction in which the missile thrust vector $V_m$ can be applied in order to drive $V_g$ toward zero. This vector, therefore, may be utilized for use as a guidance and control quantity.

In FIG. 2, the point M represents the missile position at time t. The heavy line through M represents the powered flight path terminating at the cut-off point CO and proceeding in an eliptical free-fall trajectory (shown as a dotted line) terminating at the target position $T_F$. Tangent to the correlated velocity vector $\overline{V}_c$, there is a second elliptical free-fall trajectory (shown as a second dotted line) which also terminates at the target position $T_F$. This trajectory would be the one followed by the missile in free-fall provided that it possessed the velocity $\overline{V}_c$ at point M.

Referring now to FIG. 4, if for given launch points and target combinations on the earth's surface, a desired total time of flight $T_t$ from launch target is predetermined and is fixed, then the instant of launch at LP will determine uniquely the location of the future target position $T_f$ (at the desired instant of impact) with respect to a non-rotating set of coordinates. Consider, if elapsed time since launch is held constant and different positions in space $P_1$, $P_2$, and $P_3$ are considered, with the remaining time of flight now fixed, the correlated velocity depends on how far the missile has yet to go. Thus, a missile arriving at $P_1$ position would require a magnitude of velocity $V_{C1}$ different from that of the same missile having $V_{C2}$ or $V_{C3}$ arriving at point $P_2$ or $P_3$ in order that they may impact on the target $T_F$. The motion of the target T, due to the earth's rotation, must, of course, be taken into account in the initial determination of T. However, this point remains stationary during the flight of the missile, except insofar as the total time of flight may deviate from the predetermined value.

As a result of these considerations at any given time t and position $\bar{r}$ along the flight path of the missile, correlated velocity vector $\overline{V}_c$ is specified uniquely, although explicitly. Assuming, now for the moment, a spherical earth, the vector $\overline{V}_c$ must lie in the plane determined by the radius vectors $\bar{r}$ and $\bar{r}_T$ drawn from the center of the earth to the present missile position and future target positions, respectively. The future property is that the resulting free-fall trajectory shall pass through the target, and that the time of free flight $t_{ff}$ shall take on the value from equation (1) of $$t_{ff} = t_{ft} - t \tag{4}$$

which then serves to determine $\overline{V}_c$ uniquely within this plane. As a result, $V_c$ may be expressed in the functional form $$V_c = V_c(\bar{r}, t) \tag{5}$$

$\bar{r}$ = distance vector from center of earth to point M with a further implied dependence upon the launch and target sites and the assigned total time of flight $t_{ft}$.

It is now possible to develop a matrix Q of variable coefficients. Let an arbitrary set of earth centered non-rotating orthogonal coordinate axes be assigned such as the vectors $\bar{i}x$, $\bar{j}y$ and $\bar{k}z$, with $\bar{i}$, $\bar{j}$ and $\bar{k}$ as unit vectors along the respective axes, then, by vector analysis, it is possible to break the resultant magnitudes of vector $\overline{V}$ and $\bar{r}$ into their component vector magnitudes along their respective axes. Thus, $\bar{r}$ may be written in the form $$\bar{r} = x\bar{i} + y\bar{j} + z\bar{k} \tag{6}$$

and $V_c$ at point M may be written in the form $$V_c = u_{ci} + v_{cj} + w_{ck} \tag{7}$$

$V_c$ = correlated assigned velocity $u_{ci}$ = vector quantity of correlated velocity along x axis $v_{cj}$ = vector quantity of correlated velocity along y axis $w_{ck}$ = vector quantity of correlated velocity along z axis Considering a missile in free-fall, moving under the influence of a gravitational field, which at a particular time instant is located at a vector position determined by equation (6), with a corresponding vector velocity determined by equation (7), is shown in FIG. 1. The coordinate reference system is the earth's center and inertially fixed. The vector position and velocity vector are sufficient to determine a unique point of impact $\bar{r}_T$, and a unique time of flight $t_{ff}$ from present position $\bar{r}$ to $\bar{r}_T$. If the missile position vector $\bar{r}$ is subjected to a differential change $d\bar{r}$ with the time held constant, then it is necessary to determine what corresponding variation $d\overline{V}_c$ in the missile velocity vector that will leave invariant the impact location $\bar{r}_T$ and the time of free flight $t_{ff}$ from the present position to impact. This problem is solved by a matrix of partial derivatives:

$$\left\| \begin{array}{ccc} \frac{\partial u_{wc}}{\partial x} & \frac{\partial u_{wc}}{\partial y} & \frac{\partial u_{wc}}{\partial z} \\ \frac{\partial v_c}{\partial x} & \frac{\partial v_c}{\partial y} & \frac{\partial v_c}{\partial z} \\ \frac{\partial w_c}{\partial x} & \frac{\partial w_c}{\partial y} & \frac{\partial w_c}{\partial z_{23}} \end{array} \right\| = \left\| \begin{array}{ccc} Q_{xx} & Q_{xy} & Q_{xz} \\ Q_{yx} & Q_{yy} & Q_{yz} \\ Q_{zx} & Q_{zy} & Q_{zz} \end{array} \right\| \tag{8}$$

of the components of $\overline{V}_c$ (equation (7)) with respect to the components $\bar{r}$. These components are expressed in a coordinate system which is non-rotating with respect to inertial space and computed under the restriction that $\bar{r}_T$ and $T_{ff}$ remain fixed. In abbreviated notation, Q may now be expressed $$Q = \left\| \frac{\partial \overline{V}_c(\bar{r}, t)}{\partial \bar{r}} \right\|_{(\bar{r}_T \, t_{ff})} \tag{9}$$

Then, the relation between $d\overline{V}_c$ and $d\bar{r}$ may be obtained from equation $$d\overline{V}_c = Q d\bar{r} \tag{10}$$

Since a unique correlated velocity vector $\overline{V}_c$ may be defined for every point in space and time and for a given time of arrival at the location of target T, then for any one flight, the location of the target in inertial reference frame and the time of arrival there are specified constants. Thus, the correlated velocity on a given flight is a function of position and time only. It is then possible to state mathematically $$\overline{V}_c = \overline{V}_c(t, \bar{r}_M, t_A, \bar{r}_T) \tag{11}$$

where t is the current time, $t_A$ is the specified time of arrival at the target, and $r_M$ and $r_T$ are the inertial location, respectively, of the missile and the target. For any one flight, the location of the target and the arrival time are specified constants. Thus, $$V_c = V_c(t, r_M) \tag{12}$$

is defined uniquely for every choice of $t_A$ and $\bar{r}_T$.

In the derivation of the equation for velocity-to-be-gained, it is necessary to take the total derivative of equation (12) with respect to time, thereby giving the following equation:

$$\frac{\partial \bar{V}_c}{dt} = \frac{\partial \bar{V}_c}{dt} + \|Q\| \frac{d\bar{r}M}{dt} \tag{13}$$

$$= \frac{\partial \bar{V}_c}{dt} + \|Q\| \bar{V}_M$$

The symbol Q represents the matrix of partial derivative of the components of $\bar{V}_c$ with respect to the components of $\bar{r}$, where these components are expressed in any coordinate system which is non-rotating with respect to inertial space. Since $\bar{V}_c$ is a function of both time and position, its time rate of change has a direct attendance of time given by the first term of equation (2) and a dependence on the time rate of change of position given by the second term.

Since $\bar{V}_c$ does depend on position, its rate of change depends on the specified rate of change for position which is being considered. In equation (13), the rate of change of position is given as $\bar{V}_M$; thus, the resulting time rate of $\bar{V}_c$ is that which is appropriate to the path the missile flies through space. This is the time rate of change of $\bar{V}_c$ which is important to the missile guidance system.

Again referring to FIG. 2, if a missile body were in a free-fall trajectory intersecting the surface of the earth at a specified time $t_A$ and inertial location $\bar{r}_T$, then, at a particular point in space and time, $\bar{r}$ and $t$, the body by definition has the correlated velocity $\bar{V}_c$ corresponding to its present time and location, and to the target conditions $\bar{r}_T$ and $t_A$. As long as the body remains in free-fall, it will still impact at the same time and position. Thus, throughout free-fall, for example, at any later time and position, the missile velocity remains equal to the correlated velocity necessary to arrive at the target $T_F$. Now, since for this case, missile velocity remains equal to correlated velocity through flight, missile acceleration equals the derivative of the correlated velocity, for both are time derivatives of equal quantity. In free-fall, missile acceleration is just $\bar{G}$ (the gravitational acceleration), so that in this case, the time rate of change of $\bar{V}_c$ is simply $\bar{G}$.

Since the above applies for any $\bar{V}_c$, once a target location and impact time are chosen, the result is universal. The time rate of change of correlated velocity $\bar{V}_c$, along a path for which actual velocity always equals correlated velocity, is just the local gravitational acceleration. This may be stated more simply mathematically by returning to equation (13) which expresses the derivative of $\bar{V}_c$ and substitutes the special value $\bar{V}_M$ equals $\bar{V}_c$ that applied to this special case. The equation then becomes:

$$\bar{G} = \frac{\partial \bar{V}_c}{\partial t} + \|Q\| \bar{V}_c \tag{14}$$

As indicated above, the velocity-to-be-gained $\bar{V}_g$ is the difference between the desired velocity $\bar{V}_c$ and the current missile velocity $\bar{V}_M$. Therefore, $$V_g = V_c - V_M \tag{15}$$

combining equation (15) with equation (13) eliminates $\bar{V}_M$, and simplifying the resulting equation and equation (14) gives the following equation:

$$\frac{d\bar{V}_c}{dt} = \frac{\partial \bar{V}_c}{dt} + \|Q\|\bar{V}_c - \|Q\|\bar{G} \tag{16}$$

$$(16) = \bar{G} - \|Q\|\bar{V}_G$$

From equation (16), it can be seen that the time rate of change $\bar{V}_c$ along any path is equal to the gravitational acceleration $\bar{G}$, plus a correction, proportional to $\bar{V}_G$. This correction quantity is the error velocity $\bar{V}_g$, premultiplied by the matrix of direction derivatives Q which was explained above. Taking the time derivative of equation (15) and combining it with equation (16), eliminates $(d\bar{V}c/dt)$ from equation (16), thus giving equation $$\frac{d\bar{V}_G}{dt} + \frac{d\bar{V}_M}{dt} = \bar{G} - \|Q\|\bar{V}_G \tag{17}$$

The rate of change in missile velocity is the vector sum of the non-field specified force applied to the missile and gravitational acceleration. The acceleration, due to non-field forces, will be hereinafter denoted $\bar{a}_T$, called the thrust acceleration, since these forces are the ones which are dominated by the missile thrust. This term will also account for the aerodynamic and control forces on the missile structure as well. This is the quantity the components of which can be measured directly by physical accelerometers.

$$\frac{d\bar{V}_M}{dt} = \bar{a}_T + G \tag{18}$$

Equation (17) then becomes $$\frac{d\bar{V}_G}{dt} + \bar{a}_T + \bar{G} = \bar{G} - \|Q\|\bar{V}_G \tag{19}$$

or $$\frac{d\bar{V}_G}{dt} = -\bar{a}_T - \|Q\|\bar{V}_G \tag{20}$$

Thus, it can be seen that in combining the equations, the gravitation acceleration has subtracted out from both sides of the equation, and a first order differential equation for the velocity deficit $\bar{V}_g$ is left, which only requires as an input the vector $\bar{a}_T$ as indicated above. This quantity may be directly measured by a triad of accelerometers on a suitably stabilized base.

Thus, from the above deviation and basic equation, there has been developed an equation of target indication which can be used in a guidance system of a ballistic missile. The equation derivative (20) takes accelerometer output as the input, and yields directly as the output, the velocity-to-be-gained $\bar{V}_g$ or the velocity deficit. At no point in the system does the missile velocity, or position, or the target position appear explicitly. The choice of target location and time of arrival appear explicitly in the initial condition of $\bar{V}_g$. The computation, thus, is stripped down to only a consideration of the essentials—the accelerometer output and velocity deficit. This is a target indication system in the sense that if the input $\bar{a}_T$ can be manipulated so that the output $\bar{V}_g$ is to some point driven to zero, then this system indicates that, at that point, a free-fall flight will carry the missile to the specified target at the specified time. This is the point, then, at which missile thrust can be terminated or cut-off and the guidance job is finished.

Now, applying the Q term of the partial derivatives of the correlated velocity components, with respect to a displacement of the missile position along coordinate axes, the vector equation for $(d\bar{V}_c/dt)$ can be expanded into three scaler equations corresponding to three accelerometer input axes:

$$\dot{V}_{GX} = -a_{TX} - Q_{XX}V_{GX} - Q_{XY}V_{GY} - Q_{XZ}V_{GZ} \quad (21)$$

$$\dot{V}_{GX} = -a_{TY} - Q_{YX}V_{GX} - Q_{YY}V_{GY} - Q_{YZ}V_{GZ}$$

$$\dot{V}_{GZ} = -a_{TZ} - Q_{ZX}V_{GX} - Q_{ZY}V_{GY} - Q_{ZZ}V_{GZ}$$

Each of the above Q terms can be shown to be the partial derivative of a correlated velocity component with respect to a displacement of the missile position along a coordinate, thus the $Q_{XX}$, $Q_{XY}$ and in general $Q_{IJ}$ terms may be shown as $$Q_{XX} = \frac{\partial V_{CX}}{\partial X}$$

and $$Q_{XY} = \frac{\partial V_{CX}}{\partial Y}$$

and in general $$Q_{IJ} = \frac{\partial V_{cI}}{\partial R_J}$$

The Q guidance equations take accelerometer output as a function of time and yield at the output, the velocity-to-be-gained. At no point does the missile velocity or position of the target appear explicitly. There is no need to compute the gravity vector. The choice of target location and time of arrival appear implicitly in the initial condition on $\bar{V}_G$.

With the Q guidance it is possible to allow some of the essential physical quantities entering into the solution of the guidance problem to be replaced by zero or a constant, thus permitting a minimum of instrumentation complexity without destroying the accuracy requirements desired. By choosing the Y coordinate axis perpendicular to the plane containing the initial velocity-to-be-gained vector, the terms $Q_{XY}$, $Q_{ZY}$, $Q_{YX}$ and $Q_{YZ}$ are very small and that for ICBM applications the terms $Q_{XZ}$, $Q_{ZX}$ and $Q_{ZZ}$ can be approximated by simple time functions derived along a standard trajectory. The term $Q_{XX}$ is the most sensitive term and not only should be a function of time explicitly, but also should be varied with deviations of the position of the missile from a standard trajectory. Therefore, for IRBM ranges, it is possible to simplify the Q terms of equations 21 to: $Q_{XX}$ and $Q_{ZX}$ equal respectively to a constant (a function of range); $Q_{YY}=Q_{YX}=Q_{XY}=Q_{YZ}=Q_{ZY}=0$; $Q_{ZZ}=Q_{XX}$ and $Q_{XZ}=Q_{ZX}$.

Figure 16:
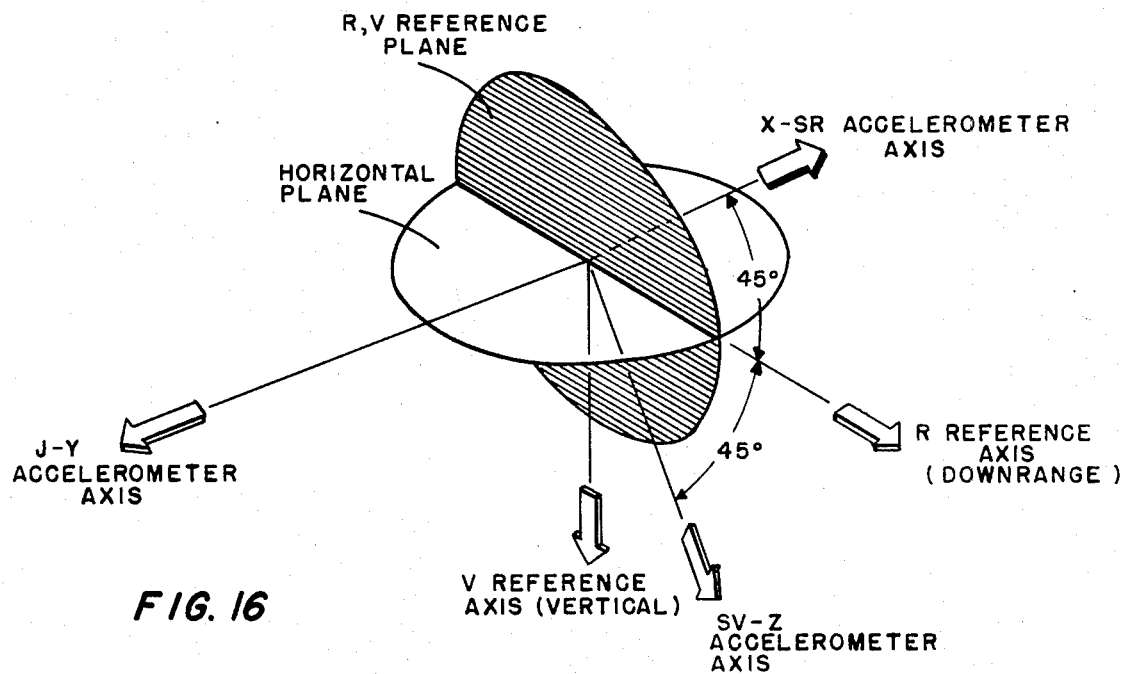
FIG. 16 represents a functional diagram of the accelerometer position with respect to a planar system.

The details of the operation of the guidance equations developed below depend on the orientation of the accelerometer axes to provide the proper acceleration information. With reference to FIG. 16, the $X_{sr}$ and $Z_{sz}$ accelerometer axes define a plane which contains the launch point gravity vector. The X accelerometer lies 45° above the local horizontal, and the Z axis is 45° below the horizontal. This permits prelaunch erection by balancing the output of the X and Z accelerometers. This operation will be explained more fully below. The J accelerometer, being perpendicular to X and Z, points along the horizontal in a sign sense to make X, Y and Z a right-handed set. The X and Z plane is a line to a precomputed azimuth angle, corresponding to the launch point and the desired target point. A guidance computer for the guidance system receives as its primary input the components of the measured acceleration and time. As pointed out above, it will be recalled that the definition of the correlated velocity vector $\bar{V}_c$ constrains the total time of flight of the missile to be constant. This definition eliminates the problem of accounting for the motion of the target due to the earth's rotation. In development of the guidance equation below, the constant time of flight constraint is eliminated, since deviation in time of flight of the missile in most cases is not undesirable in itself. It is only undesirable in proportion to the magnitude of the miss distance that it contributes to striking the target.

In order to simplify the guidance equations which were derived above, another and different velocity-to-be-gained equation will be derived. The simplified scheme of Q guidance correlated velocity will be defined as that velocity contained in the plane normal to the axis that will carry the re-entry body to the target by free-fall. There is no requirement for a fixed time of flight. This parameter is replaced by the requirement that the correlated velocity be contained in the plane normal to the axis.

Therefore, correlated velocity $\bar{V}_c$ is that two-dimensional velocity vector in the X, Y plane, which is required by the missile, that it travels thereafter by free-fall to intersect the target. It is seen immediately that $\bar{V}_c$ is dependent on the magnitude of missile velocity along the Z axis. Furthermore, since there is only one velocity vector in the X, Y plane that will combine with a given missile Z velocity, the correlated velocity is completely defined by this requirement, and cannot be further constrained by any requirement on time of flight. Thus, in the presence of perturbations in the powered trajectory of the missile, this method of guidance must accept resulting time of flight deviations. In other words, the target, fixed on the earth, is treated as a moving target in inertial space.

Stated mathematically, the correlated velocity vector, at a time t in powered flight, is a function of the missile position at that time, the target position at time of launch, the Z velocity of the missile at time t, and t itself.

$$V_c = V_c(\bar{r}, \bar{r}_T, V_{MZ}, t) \quad (22)$$

Where the vectors $\bar{r}$ and $\bar{r}_T$ are position vectors referenced to some inertial point, and $\bar{V}_{MZ}$ is missile Z velocity, for any flight, the target position is known and is eliminated as a variable by precomputation. Therefore:

$$V_c = V_c(\bar{r}, V_{MZ}, t) \quad (23)$$

By differentiating equation (23) with respect to time, there results $$\frac{d\overline{V}_c}{dt} = \left[\frac{\partial \overline{V}_c}{\partial \overline{R}}\right]\frac{d\overline{R}}{dt} + \left[\frac{\partial \overline{V}_{CZ}}{\partial \overline{V}_{MZ}}\right]\frac{d\overline{V}_{MZ}}{dt} + \frac{\partial \overline{V}_c}{\partial t} \quad (24)$$

The symbol $$\left[\frac{\partial \overline{V}_c}{\partial \overline{R}}\right]$$

represents the matrix of partial derivatives of the components of $\overline{V}_c$ with respect to change in missile position. The quantity $$\left[\frac{\partial \overline{V}_c}{\partial \overline{V}_{MZ}}\right]$$

is the partial derivative relating change in correlated velocity to changes in missile Z velocity.

$$\left[\frac{\partial \overline{R}}{dt}\right]$$

is missile time rate of change of position, and can be broken down into its three missile velocity components, $\overline{V}_{MX}$, $\overline{V}_{MY}$, and $\overline{V}_{MZ}$. The term $(d\overline{V}_{MZ}/dt)$ is missile acceleration in the Z direction, which can be expressed as the output of an (ideal) accelerometer, $A_{TZ}$ plus that component of gravity along Z. From equation (24) may be written $$\frac{d\overline{V}_c}{dt} = \left[\frac{\partial \overline{V}_c}{\partial \overline{R}}\right]\begin{Bmatrix} V_{MX} \\ V_{MY} \\ V_{MZ} \end{Bmatrix} + \quad (25)$$

$$\left[\frac{\partial \overline{V}_c}{\partial \overline{V}_{MZ}}\right](\overline{A}_{TZ} + \overline{G}_Z) + \frac{\partial \overline{V}_c}{\partial t}$$

Equation (25) is a correct representation of $(d\overline{V}c/dt)$ for a missile not only during powered flight, but also after cut-off. A missile that has obtained $\overline{V}_c$ and then cut-off will continue to have a velocity of $\overline{V}_c$ during its free-fall trajectory. This is true from the definition of $\overline{V}_c$. The missile will continue to have, during its free-fall, the property that it will hit the target. During free-fall, only gravity is acting on the missile. Thus, the time rate of change of correlated velocity for a missile that maintains correlated viscosity is the gravity vector. Therefore, from equation (25) and the above argument, the following equation may be written:

$$\begin{Bmatrix} G_x \\ G_y \end{Bmatrix} = \left[\frac{\partial \overline{V}_c}{\partial \overline{R}}\right]\begin{Bmatrix} V_{CX} \\ V_{CY} \\ V_{MZ} \end{Bmatrix} + \left[\frac{\partial \overline{V}_c}{\partial \overline{V}_{MZ}}\right]\overline{G}_Z + \frac{\partial \overline{V}_c}{\partial t} \quad (26)$$

Now the vector $\overline{V}_G$ may be defined as the difference between the correlated velocity vector and actual missile velocity in the X, Y plane $$\begin{Bmatrix} V_{GX} \\ V_{GY} \end{Bmatrix} = \overline{V}_c - \begin{Bmatrix} V_{MX} \\ V_{MY} \end{Bmatrix} \quad (27)$$

and its time derivative is $$\begin{Bmatrix} \dot{V}_{GX} \\ \dot{V}_{GY} \end{Bmatrix} = \dot{\overline{V}}_c - \begin{Bmatrix} \dot{V}_{MX} \\ \dot{V}_{MY} \end{Bmatrix} \quad (28)$$

$\dot{V}_{MX}$ and $\dot{V}_{MY}$ may be expanded into the ideal output of accelerometers and gravitic acceleration:

$$\dot{V}_{MX} = A_{TX} + G_X \quad (29)$$
$$\dot{V}_{MY} = A_{TY} + G_Y$$

Substituting equation (29) into equation (28):

$$\begin{Bmatrix} \dot{V}_{GX} \\ \dot{V}_{GY} \end{Bmatrix} = \dot{\overline{V}}_c - \begin{Bmatrix} A_{TX} + G_X \\ A_{TY} + G_Y \end{Bmatrix} \quad (30)$$

By re-arranging equation (30)

$$\frac{d\overline{V}_c}{dt} = \begin{Bmatrix} \dot{V}_{GX} \\ \dot{V}_{GY} \end{Bmatrix} + \begin{Bmatrix} A_{TX} + G_X \\ A_{TY} + G_Y \end{Bmatrix} \quad (31)$$

is obtained.

Now substitute equation (31) and equation (27) into equation (25) to obtain the following equation:

$$\begin{Bmatrix} \dot{V}_{GX} + A_{TY} + G_X \\ \dot{V}_{GY} + A_{TY} + G_Y \end{Bmatrix} = \left[\frac{\partial \overline{V}_c}{\partial \overline{R}}\right]\begin{Bmatrix} V_{CX} - V_{GX} \\ V_{CY} - V_{GY} \\ V_{MZ} \end{Bmatrix} + \quad (32)$$

$$\left[\frac{\partial \overline{V}_c}{\partial \overline{V}_{MZ}}\right](A_{TZ} + G_Z) + \frac{\partial \overline{V}_c}{\partial t}$$

Now subtract equation (26) thereform to obtain $$\begin{Bmatrix} \dot{V}_{GX} + A_{TX} \\ \dot{V}_{GY} + A_{TY} \end{Bmatrix} = \left[\frac{\partial \overline{V}_c}{\partial \overline{R}}\right]\begin{Bmatrix} -V_{GX} \\ -V_{GY} \\ 0 \end{Bmatrix} + \left[\frac{\partial V_c}{\partial V_{MZ}}\right](A_{TZ}) \quad (33)$$

Re-arranging equation (33), noting that one component of the vector multiplying the matrix $$\left[\frac{\partial \overline{V}_c}{\partial \overline{R}}\right]$$

is zero will give the following equations:

$$\frac{dV_{GX}}{dt} = A_{TX} - \left(\frac{\partial V_{CX}}{\partial X}\right)V_{GX} - \quad (34)$$

-continued $$\left(\frac{\partial V_{CX}}{\partial Y}\right) V_{GY} + \left(\frac{\partial V_{CX}}{\partial V_{MZ}}\right) A_{TZ}$$

$$\frac{dV_{GY}}{dt} = A_{TY} - \left(\frac{\partial V_{CY}}{\partial X}\right) V_{GX} -$$

$$\left(\frac{\partial V_{CY}}{\partial Y}\right) V_{GY} + \left(\frac{\partial V_{CY}}{\partial V_{MZ}}\right) A_{TZ}$$

These are the fundamental equations to be solved by the guidance computer. If missile thrust is terminated when both $\dot{V}_{GX}$ and $\dot{V}_{GY}$ are zero, the warhead will impact at the selected target. It will do so no matter what velocity the missile happens to have along the Z coordinate, and no matter what the time history of Z acceleration happens to be. These equations, as they stand, are no more desirable than the original constant time of flight Q equations (equations 21). However, the Z velocity steering equation, by making the Z acceleration and velocity time history independent of trajectory perturbations, renders the last terms in both equations to be fixed functions of time. This immediately suggests the following simplification. The integrated effect of terms $$\left(\frac{\partial V_{CX}}{\partial V_{MZ}}\right) A_{TZ} \text{ and } \left(\frac{\partial V_{CY}}{\partial V_{MZ}}\right) (A_{TZ}) \quad (35)$$

might be approximated by a change in the initial value of $\dot{V}_{GX}$ and $\dot{V}_{GY}$. The equations are then simplified to $$\frac{dV_{GX}}{dt} = -A_{TX} - \left(\frac{\partial V_{CX}}{\partial X}\right) V_{GX} - \left(\frac{\partial V_{CX}}{\partial Y}\right) V_{GY} \quad (36)$$

$$\frac{dV_{GY}}{dt} = -A_{TY} - \left(\frac{\partial V_{CY}}{\partial X}\right) V_{GX} - \left(\frac{\partial V_{CY}}{\partial Y}\right) V_{GY}$$

When these approximations are made, the quantity $V_{GX}$ and $V_{GY}$ will not be the actual velocity-to-be-gained as defined in the derivation until Z acceleration goes to zero, which happens only after completion of the atmospheric portion of the trajectory. Also, since the $\overline{V}_g$ components are non-analytic, the components of the $$\left[\frac{\partial \overline{V}_c}{\partial \overline{R}}\right]$$

matrix must change from their analytic value.

The alignment of the platform at launch is chosen so that the $\overline{V}_g$ vector is contained along X. That is, the computer axis system is chosen so that the initial condition on $V_{GY}$ is zero. In that case, there is great computational advantage in using a steering equation that continues to null $V_{GY}$ throughout flight, for this eliminates two more terms from the computation of the guidance equations. They are then simplified to $$\frac{dV_{GX}}{dt} = -A_{TX} - \left(\frac{\partial V_{CX}}{\partial X}\right) V_{GX} \quad (37)$$

-continued $$\frac{dV_{GY}}{dt} = -A_{TY} - \left(\frac{\partial V_{CY}}{\partial X}\right) V_{GX} \quad (38)$$

These equations form the basis for the simplified Q guidance system. From this point on, the correction terms $$\left[\frac{\partial V_{CX}}{\partial X}\right] \text{ and } \left[\frac{\partial V_{CY}}{\partial X}\right]$$

will be referred to as Qxx and Qyx, as they are equivalent to the Q terms in the original description of the Q guidance concept.

The two guidance equations (37) and (38) are further modified as follows:

$$\frac{dV_{GX}}{dt} = -A_{TX} - \left[\frac{\partial V_{CX}}{\partial X}\right] V_{GX} - \left[\frac{\partial V_{CX}}{\partial Z}\right] V_{GZ} \quad (39)$$

$$\frac{dV_{GY}}{dt} = -A_{TY} - \left[\frac{\partial V_{CY}}{\partial X}\right] V_{GX} \quad (40)$$

As pointed out above, $$\frac{\partial V_{CX}}{\partial X} = Q_{XX}$$

this Q term corrects for variations of thrust profile which may exist between individual missiles. The Qxx term is instrumentated as a linear function of time; Qxx=Qxxo+KQt (Qxxo represents the initial value of Qxx at launch). The Qxxo term is read into the computer by the digital section in the fore control system. The KQ term is a constant which is wired into the guidance computer. An additional term has been added to equation (37) in the form of:

$$\frac{\partial V_{CX}}{\partial Z} = Q_{XZ}$$

This term did not result from the mathematical derivation of the guidance equations. However, it is necessary to compensate for highly non-standard launch conditions, and $Q_{XZ}$ is used to correct for the non-standard launch conditions of the missile. The $Q_{XZ}$ term is a constant for all flights, and is also wired into the guidance computer in much the same way as the KQ constant above.

Equation (40) is the same as equation (38) with the exception of:

$$\frac{\partial V_{CY}}{\partial X} = Q_{XY}$$

This Q term of equation (40) is instrumented with a plus signal instead of the minus sign which came out of the mathematical derivation (see equation (38)). However, the $Q_{XY}$ term read into the computer by the digital section of the fire control has a sign associated with it, and this selected sign determines the polarity of the quantity $Q_{YX}(V_{GX})$ which may be positive or negative.

$Q_{YX}$ is a constant read into the guidance computer by the digital section of the fire control system.

To the above equations are added the following additional equations:

$$\frac{dV_{GZSK}}{dt} = -A_{TZSK} = -(A_{TZ} + [SKU]A_{TX}) \quad (41)$$

and $$V_{GX} = [V_{GX0}] + \int_0^t \frac{dV_{GX}}{dt} dt \quad (42)$$

$$V_{GY} = [V_{GY0}] + \int_0^t \frac{dV_{GY}}{dt} dt \quad (43)$$

$$V_{GZSK} = [V_{GZ0}] + \int_0^t \frac{dV_{GZSK}}{dt} dt + [V_{GZ1}] \quad (44)$$

The equation (41) is the velocity-to-be-gained equation along a skewed Z axis, hereinafter referred to as Zsk axis. The Z velocity control equation causes the missile to orient its velocity vector perpendicular to the Z axis late in powered flight. However, for maximum range, the missile velocity vector should be aligned along an axis inclined less than forty-five degrees above the launch horizontal. The Z axis acceleration indication used for generating pitch steering commands is obtained by adding a fractional part of the X accelerometer output to the Z accelerometer output. This results in a sum output which is sensitive to accelerations along an axis displaced from the Z axis by an amount determined by the skew constant, SKU. This action accomplishes the same effect as physically re-orienting the Z accelerometer on the stabilized member. The term SKU carries a given polarity when read into the computer. A negative polarity SKU will cause the missile to fly at an angle lower than 45 degrees.

The $V_{GX0}$, $V_{GY0}$, $V_{GZ0}$, in equations (42), (43), and (44), are signals read into the guidance computer from the digital section of the fire control system. The integrals of these equations are evaluated according to equations (39), (40), and (41). The term $V_{GZ1}$ added to equation (44) is a negative step function which is added just prior to staging. This term reduces the transient during and following staging and renders the desired velocity profile along the Z axis.

Figure 12:
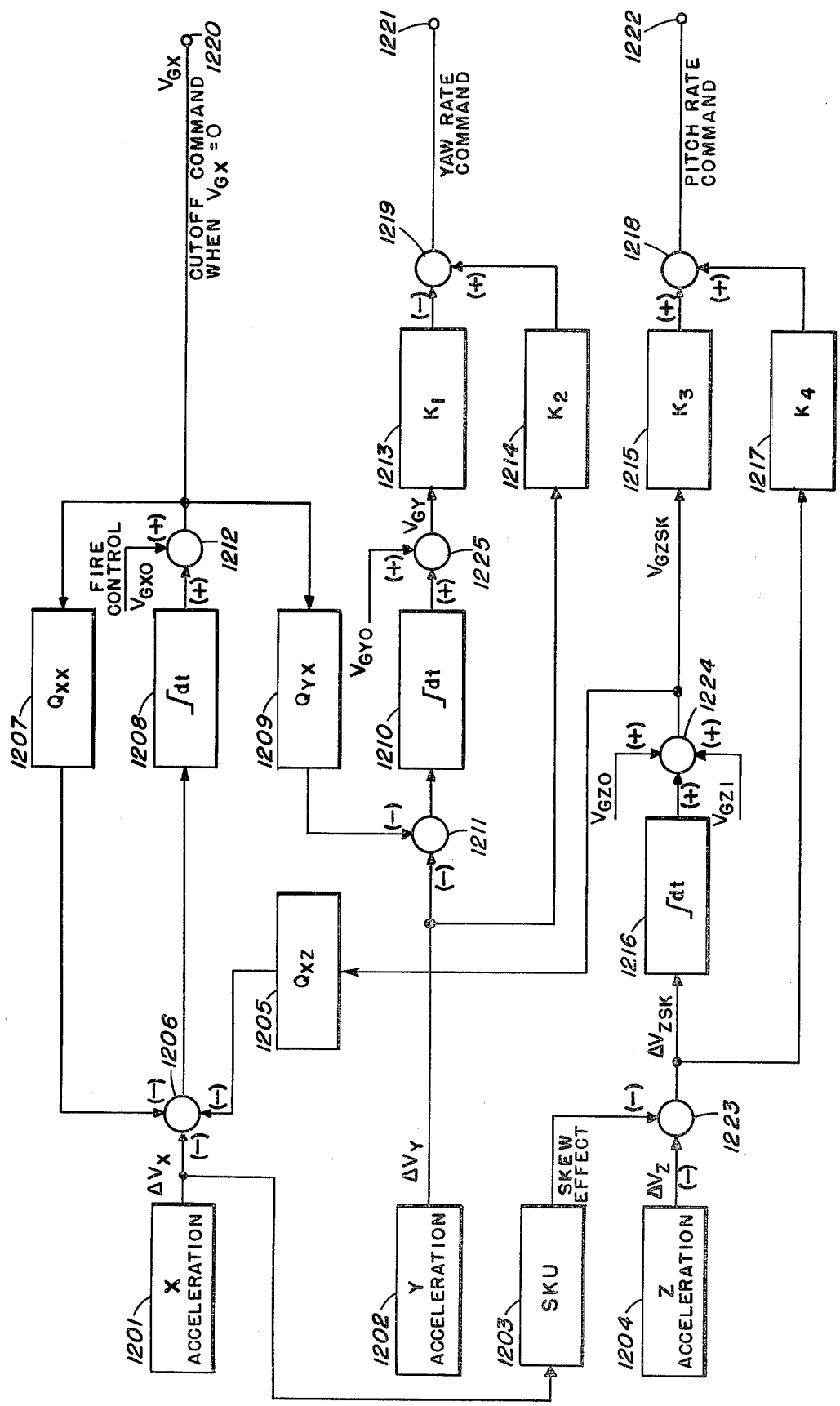
FIG. 12 represents a functional schematic diagram of the Q computational circuit.

With reference to FIG. 12, there is shown a simplified functional diagram of the Q guidance instrumentation of the guidance system. Acceleration information is obtained along the X axis, Y axis, and Z axis, respectively, from acceleration blocks 1201, 1202, and 1204, respectively. Outputs from the respective acceleration blocks produced signal outputs labeled $\Delta V_X$, $\Delta V_Y$, and $\Delta V_Z$, respectively. The $\Delta V_X$ output along the X axis from accelerometer block 1201 is fed into a combining junction 1206. Coupled to the combining element is block 1208 which integrates ($dV_G/dt$) in accordance with the equation (39). The output of block 1208 is fed to another combining junction 1212. Also, tied to junction combining point 1212 is an input signal $V_{GX0}$ which is taken from the fire control computer. This signal represents the initial value of $V_{GX}$ when the missile is sitting in its launch tube. The combined result of the signals from block 1208 and the $V_{GX0}$ signal from the fire control are fed back to the combining junction 1206 through the $Q_{XX}$ block 1207. Also fed to combining junction 1206 is a signal taken from combining junction 1224. This signal is fed via the $Q_{XZ}$ block 1205. These signals are combined with $\Delta V_X$, and the composite signal is coupled to the input of integral block 1208. The output signal $V_{GX}$ is fed to output terminal 1220.

The Y acceleration block has an output signal $\Delta Y$ coupled to a combining junction 1211. Also fed to combining junction 1211 is a signal from $Q_{YX}$ block 1209 which has its input coupled to combining junction 1212 to receive signal $V_{GX}$. Combining junction 1211 combines the signal $\Delta V_Y$ with the positive signal from the block 1209, representative of the $Q_{YX}$ terms. This combined output is coupled to block 1210. The function of block 1210 is to solve in accordance with equation (40). The output of this block is fed to a combining junction point 1225 that combines the $V_{GY0}$ signal from the fire control which is representative of the velocity to be gained of the missile along the Y axis at launch time. A composite signal of the combined signals at junction 1225 is further fed to block 1213 that is representative of constant $K_1$ which is part of the steering equation. The output from this block is a negative quantity and is fed into combining junction 1219. A by-pass circuit is coupled to feed the $\Delta V_Y$ signal around the equation solving circuit and through second constant block 1214 and into the combining circuit 1219. A composite signal of the two inputs to the combining circuit is coupled to output terminal 1221, this signal being representative of the yaw rate command signal.

The Z acceleration block 1204 produces an output signal $\Delta V_Z$ which is fed to junction combining point 1223. Also fed to this junction point is a signal $\Delta V_X$ which is taken from the acceleration block 1201 and coupled through SKU block 1203. This block represents the skewed constant referred to above. The skew effect signal from block 1203 is combined with $\Delta V_Z$ to give a composite signal from the combining junction 1223 which is representative of $\Delta V_{ZSK}$. This signal is coupled to integrating block 1216 which solves ($dV_{GSK}/dt$) in accordance with equation (41) and the signal output electrically coupled to combining junction 1224. Two additional signals $V_{GZ0}$ and $V_{GZ1}$ from the fire control are also fed to this combining junction. $V_{GZ0}$ is an initial condition on the integrator. $V_{GZ1}$ is an increment added prior to staging. These signals permit attainment of a desired Z velocity profile during the pitch maneuver. Prior to launch, an initial Z velocity value or bias command signal $V_{GZ0}$ is received by the guidance computer. Just after launch, the control system generates a pitch command according to equation (46) and the missile obtains a predetermined expotential Z velocity profile. Upon completion of this programmed phase of the maneuver, the final value factor or bias $V_{GZ1}$ neutralizes the remainder of the command signal thereby nulling the net Z velocity command.

Similarly, initial value terms $V_{GX0}$ and $V_{GY0}$ provide the initial commands to produce the desired velocity characteristics in the missile. Eventually these too are nulled out by operation of the control system as the missile follows the intended trajectory. The three signals are combined and fed to constant block 1215. The output of block 1215 is fed to junction combined point 1218. A loop is established around the calculating section by feeding the $\Delta V_{ZSK}$ signal from the output of combining junction 1223 to the input of the constant block 1217 representative of the constant $K_4$. The output of $K_4$ couples a signal to junction combining block 1218. The two signals are combined and fed to junction terminal 1222. This signal is representative of the pitch rate command signal.

An output is taken from the output side of combining block 1224 to feed a $V_{GZSK}$ signal to block 1205 which represents the $Q_{XZ}$ function. The output of the $Q_{XZ}$ block is fed into combining junction 1206. This combining junction combines the signals from the block 1201, block 1205 and block 1207, and the combined signal is fed into the input of block 1208 which solves the equation (39) as pointed out above.

MISSILE CONTROL EQUATION

Generally, there are two basic requirements that must be satisfied by the steering control system of a ballistic missile. The control system first must satisfactorily control the missile during the highly critical period of high aerodynamic pressure which occurs as the missile passes through and climbs out of the atmosphere at high velocity, and second it must steer the missile to a proper cut-off condition so that the velocity-to-be-gained is nulled to zero ($\bar{V}_g = 0$).

The solution to this dual requirement for missile control is to ignore the second problem and concentrate on the accomplishment of the ascent trajectory until the missile is out of aerodynamic danger. Once this is accomplished, then the second control mode may be switched in to achieve the proper terminal conditions.

One technique for the accomplishment of the missile ascent trajectory through the atmosphere is to employ a computed pitch program designed to provide a pitch time history which has the desirable characteristics of low angle of missile attack during periods of high aerodynamic pressure. For a non-perturbed ascent trajectory; that is, a trajectory which results from standard predicted values of missile thrust, weight, lift, and drag, and which experiences no wind velocity, the standard pitch program produces standard time histories of missile position and velocity as a function of time. For a perturbed missile, however, this technique is not feasible, since non-standard time histories of missile velocity and position occur along each coordinate of the guidance system; that is, missile velocity along the X axis ($V_{MX}$), missile velocity along the Y axis ($V_{MY}$), and missile velocity along the Z axis ($V_{MZ}$) exhibit non-standard time histories in the presence of missile perturbations, although the elevation and heading angles of the missile remain essentially unperturbed because they are controlled by feedback principles.

The steering technique in the instant invention is to control the velocity history along the Z and Y axes. This method of control uses the empirical observation that the characteristic time history of the integrated output of the Z accelerometer during a desirable ascent trajectory can be very closely approximated by an exponential function of time. By controlling the time constant of the servomechanism that drives Z velocity to its final value, the desired exponential time history in velocity, corresponding to a desirable ascent through the atmosphere is generated. The differential equation whose solution exhibits the desired characteristic is constructed as follows:

$$\frac{d\theta_c}{dt} = K(V_{ZC} - [\tau A_{TZ} + V_Z]) \tag{45}$$

$V_{ZC}$ = final velocity along Z axis
$\tau$ = time constant $A_{TZ}$ = acceleration increment from accelerometer on Z axis
$V_Z$ = instantaneous velocity along Z axis
$V_Z$ is the integral of $A_{TZ}$ with a zero initial condition at launch. This equation may be rewritten as $$\frac{d\theta_c}{dt} = -K[\tau A_{TZ} + V_{GZ}] \tag{46}$$

Where the term $V_{ZC}$, the Z velocity to be approached exponentially at the time constant of equation (45), is eliminated from the equation by placing an initial condition on $V_Z$ at launch equal to the negative value of $V_{ZC}$. The time constant and the initial value of $V_Z$ are used to design the desired ascent trajectory. For example, since the missile must leave the launch pad vertically, the value of $\tau A_{TZ}$ must be substantially of equal and opposite magnitude to $V_Z$ at launch, in order that equation (46) generates no pitch rate command. The Z velocity steering mode is set to take place after a predetermined time of launch because of the critical balance requirement on the Z acceleration at the time of launch. As indicated by equation (46), the velocity-to-be-gained in the Z direction, $V_{GZ}$, is driven to zero by the control system. The acceleration term, $A_{TZ}$, functions to add stability by preventing excessive pitch rates and angles of attack early in the pitch maneuver when the missile is driving through relatively dense atmosphere. Also an alternative pitch control technique may be used that has two phases of pitch control; the initial phase being the same Z velocity phase defined by equation (46) followed by cross product control defined by the following equation $$\frac{d\theta_c}{dt} = K(\bar{A}_T \times \bar{V}_G) \tag{46a}$$

where
$\bar{a}_T$ = thrust acceleration
$\bar{V}_G$ = velocity to be gained

The second phase may occur at a desired predetermined time after ignition of the second stage of the missile.

The missile, in the process of attaining the commanded Z and Y velocity, will align its thrust vector perpendicular to the Z and Y axes; for example, along the X axis 45° above the horizontal. The Z velocity can therefore accomplish not only the task of guiding the missile out of the atmosphere, but can be used for the entire trajectory.

SKEWED COMPUTING COORDINATE

From the above explanation, it is seen that a characteristic of Z velocity steering is that the missile tends to align its thrust vector perpendicular to the Z accelerometer axes late in the powered flight trajectory. For the coordinates used, see FIG. 16. This means that the missile pitches over to an angle of 45° above the launch point horizontal. Greater ranges can be obtained from a given missile configuration by causing it to pitch over from vertical at launch to an angle at cut-off considerably lower than 45°.

For predetermined ranges, this angle may be controlled by choosing an optimum angular value above the horizontal. One technique of accomplishing this could be by physical re-orientation of the accelerometer axes; for example, fixing the Z accelerometer physically by this criteria. The method used in the instant invention achieves the same result by feeding a fractional part of the output of the X accelerometer into the Z velocity steering equation along with acceleration information along the Z axes ($A_{TZ}$), see FIG. 12. This essentially skews the Z computing coordinate down from the Z accelerometer axes, the amount being determined by the requirement for a maximum range. The equation for pitch rate command then becomes $$\frac{d\theta_c}{dt} = K \left[ \frac{\pi}{\cos \alpha} (A_{TZ} - (\tan \alpha) A_{TX}) + V_Z \right] \quad (47)$$

and now $$V_Z = \int_0^t [A_{TZ} - (SKU) A_{TX}] + V_{ZC} \quad (48)$$

where $A_{TX}$ = the value of acceleration along the X axis and $\alpha$ is the angle below the elevated or $X_a$ axis 45° that yields maximum missile range. This is fixed by the design of the missle, and would not ordinarily be changed for different flights.

TRACK VELOCITY CONTROL

Another factor necessary for control in the presence of missile perturbations is control of the missile along its yaw axis. Instead of controlling yaw angle to zero, the technique in the instant invention is to control Y velocity-to-be-gained $V_{GY}$, to zero. For example, instead of feeding back a signal proportional to deviations in missile yaw angle, the signal to be controlled would be $V_{GY}$. Then, in the presence of thrust perturbations and winds, Y velocity-to-be-gained remains nulled while missile yaw angle adjusts itself to achieve this condition. To maintain a zero value for the velocity-to-be-gained along Y, an yaw rate command of the following form is used:

$$\frac{d\Psi_c}{dt} = K[\tau A_{TY} - V_{GY}] \quad (49)$$

This method of yaw control commands a yaw rate proportional to $V_{GY}$ in such a sense as to reduce $V_{GY}$. The purpose of the $A_{TY}$ term is to provide the lead which is required to stabilize the yaw guidance loop.

CROSS-RANGE YAW (Trajectory Control)

In the paragraph to follow under this heading, a more detailed explanation is given of equation (49), and the combining of this basic equation with equation (40) and equation (43) to give the final yaw rate equation which is instrumentated by the computer sub-system block FIG. 12.

The stabilized member is aligned prior to launch such that $V_{GY}$ is properly zero for the target chosen. Equation (49) controls the vehicle to maintain $V_{GY}$ equal to zero throughout flight including the instant of cut-off. This is important in terms of the simplification leading to equation (37).

Because winds can carry the missile cross-range without disturbing its heading, thus introducing errors which the control system cannot detect or correct, the initial aim of the missile must be altered to compensate for cross-winds. As pointed out above, the trajectory control concept, or yaw, is based upon nulling the J velocity-to-be-gained ($V_{GY}$) rather than heading. Equation (49) is expanded as follows:

$$\text{Yaw rate} = -\text{Constant} \times J \text{ Acceleration} + \quad (50)$$

$$\text{Constant} \times J \text{ velocity-to-be-gained}$$

A positive yaw rate will turn the missile to the right, along the J axis; whereas a negative yaw rate turns the missile to the left. The J velocity-to-be-gained term ($V_{GY}$) steers the missile to correct the initial track error which the vagrancies of the launch process generally produce, and subsequently steers the missile to prevent any accumulation of track error during the flight. The J acceleration term provides yaw rate control when the J velocity-to-be-gained term is nulled and thus stabilizes the yaw control loop.

Figure 17:
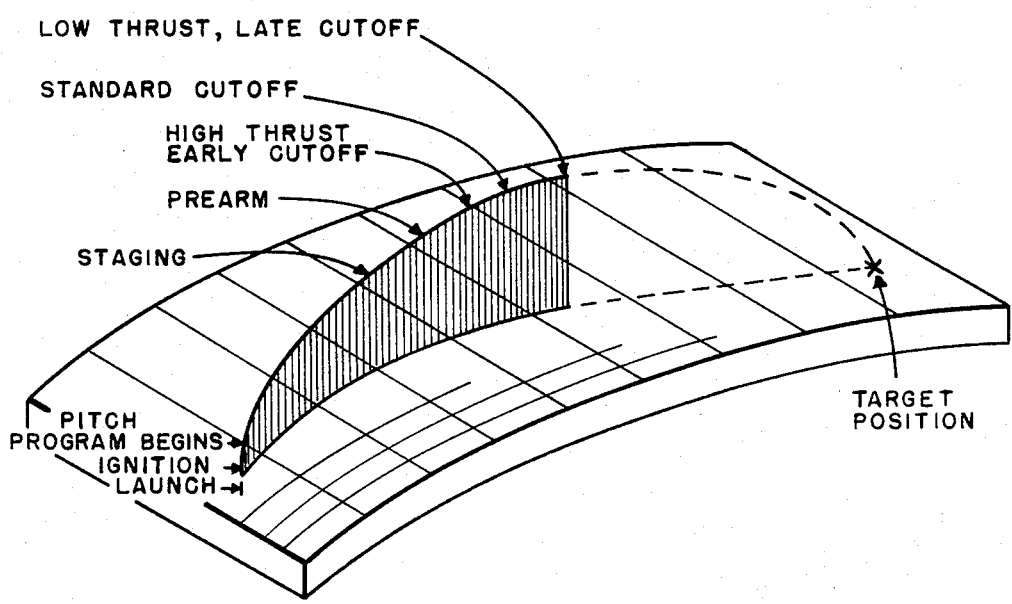
FIG. 17 represents a trajectory program of a missile fired from launch point to target position.

With reference to FIG. 17, it can be seen that the yaw trajectory is complicated by the fact that the earth is rotating. This means that each point on the surface of the earth is moving eastward at a velocity dependent upon its distance from the earth's polar axis, and is calculable from the geographical latitude of the point. Unless the missile's launch and target points are at the same latitude, they are moving at different velocities, and this may be viewed as the target moving relative to a fixed launch point. The target's motion is always eastward, and in the general case, will have components in the down-range and cross-range directions. For the standard missile, target motion could be taken into account by aiming the missile ahead of the target, at the point which the target will occupy when the missile arrives. However, the non-standard missile of the instant invention is subject to variations in time of flight, so that the point the target will occupy when the missile arrives cannot be exactly specified before launch. Consequently, the missile must be re-aimed during flight, according to the particular missile's long or short time-of-flight; this being predictable from the missile's performance during the powered portion of the flight. Since the yaw rate equation acts to null the J velocity-to-be-gained ($V_{GY}$), a yaw rate, such as that required to re-aim the missile during flight, can be generated by modifying the J velocity-to-be-gained during the missile flight. The J velocity-to-be-gained term is: Following the basic velocity-to-be-gained equation and equation (40), the equation is written:

$$\text{Velocity-to-be-gained} = \text{Initial Value Constant} + Q \text{ Quantity} \times \quad (51)$$

$$\text{Velocity-to-be-gained} \times \text{Time Interval} - \text{Missile Velocity}$$

The terms in the equation are self-explanatory, except for the Q quantity. The Q quantity for the J vector-to-be-gained equation, $Q_{jsr}$ or $Q_{YX}$, is a constant chosen according to the geography of the particular missile flight. The velocity-to-be-gained components ($V_{GX}$) multiplied by the $Q_{jsr}$ ($Q_{YX}$) quantity is the component in the SR direction, the time history of which is the best illustration of missile thrust. Referring to FIG. 17, it can be seen that a missile with high thrust will reduce the SR velocity-to-be-gained more rapidly than a standard missile. Thus, the product of $Q_{jsr}$ and SR velocity-to-be-gained will be smaller than standard at each time interval, and the sum of these products during powered flight is shorter than standard. The SR velocity-to-be-gained is relative small, late in powered flight, and the products being added are small. Thus, the variations between a standard and non-standard Q quantity term is largely determined early in powered flight. This means that the missile is grossly re-aimed early in powered flight, and does not have to fly an excessively curved inefficient path. By substituting the equation J velocity-to-be-gained ($V_{GY}$), the yaw rate equation now may be written as follows:

$$\text{Yaw rate} = -\text{Constant} \times J \text{ Acceleration } \frac{Q_{jsr}}{\text{Constant}} + \text{Constant} \times SR \text{ Velocity-to-be-gained} \times \text{Time Interval} - \frac{\text{Missle } J}{\text{velocity}} \quad (52)$$

Initially, all terms are zero. The Qjsr quantity term summation process begins with the missile launch command, and once the launch curvations are corrected, this term dominates the yaw rate equation. The yaw rate generated by the Qjsr quantity term produces missile J velocity which subtracts from the Qjsr summation, so that the J velocity-to-be-gained will tend to be nulled. However, since the Qjsr quantity term continually increases throughout the powered flight, the missile must continually accumulate J velocity in order to keep J velocity-to-be-gained close to the nulled condition. Thus, the missile flies a curved yaw trajectory which continually re-aims the missile. The greater the missile's thrust, the smaller the angle to the target will be at which the missile is re-aimed, and the less the Qjsr term will be.

Referring to FIG. 17, it can be seen that the relation between missile-powered performance and total time-of-flight is opposite to that which might be supposed at first. A high missile thrust, which gives a short time of powered flight, results in a long total time-of-flight. A low missile thrust, which gives a long time of powered flight, results in a short total time-of-flight. Because of this relationship, the missile must be aimed ahead of the point at which a standard missile would be aimed, and curved back against the earth's rotation. The Qjsr summation, during a standard missile flight, will re-aim the missile to the standard target position. The Qjsr summation, during a high thrust missile flight, will be smaller than standard and will re-aim the missile through a smaller angle, compensating for the fact that, during the longer than standard total time of flight, the earth will rotate past the target position of a standard missile. Correspondingly, the Qjsr summation, during a low thrust missile flight, will be larger than standard, and will re-aim the missile through a greater angle, compensating for the fact that, during the shorter than standard total time of flight, the earth will not rotate as far as the target position of the standard missile.

SR VELOCITY-TO-BE-GAINED ($V_{GX}$) CORRECTIONS

In the above paragraphs, it has been explained how the missile is controlled to its optimum pitch angle by the pitch program equation, and how it is aimed in the direction of the target by the yaw program equation. The remaining function of the guidance system is to measure the increasing magnitude of the missile's X axis velocity, and to command cut off and separation of the re-entry body when the correlated velocity ($V_{CX}$) is attained. For a standard missile, this magnitude could be predicted before launch, and the SR velocity-to-be-gained equation or ($V_{GX}$) would include only initial value and missile velocity terms. Equation (39) is further modified to include the two Q quantity terms.

As pointed out briefly above, the $Q_{XZ}$ term is a value which is chosen empirically by flight simulation studies.

The distance that the missile travels downrange before attaining its correlated velocity varies with missile thrust. With referenc to FIG. 17, there is shown a missile trajectory path over the surface of the earth. A standard missile will travel a certain distance; a high thrust missile will travel less far, and a low thrust missile will travel further. Therefore, the distance remaining to be traveled, after re-entry body separation, varies with missile thrust, and this means that the correlated velocity must also be varied.

The $Q_{XX}$ quantity term corrects the initial value term for correlated velocity variations attributable to thrust variations. In order to approximate the variations with efficient accuracy, $Q_{XX}$ is instrumented as a function of time. The launch value of $Q_{XX}$ is chosen according to the geography of the flight, and during the flight $Q_{XX}$ is increased as a function of time The $Q_{XX}$ quantity term is sensitive to missile thrust because the product sum includes velocity-to-be-gained ($V_{GX}$) components. A high missile thrust will yield a smaller than standard $Q_{XX}$ term to subtract from the initial value term, thus leaving a larger than standard correlated velocity-to-be-attained. This is in accordance with the longer distance remaining to be traveled by the separated high thrust missile re-entry body.

GUIDANCE EQUATIONS

The $Q_{SR}$, SR or $Q_{XZ}$ quantity term is sensitive to non-standard Z velocity time history, and corrects the cut off equation for correlated velocity variation attributable to launch permutations. $Q_{SR}$, SV or $Q_{XZ}$ is a constant of the same magnitude for all flights. Since launch perturbations affect only the early portions of the pitch program, the $Q_{XZ}$ summation process ceases to be implementated after a predetermined time.

GUIDANCE EQUATIONS

All the equations derived and necessary for the guidance computations are written as follows:

The implementation of these guidance equations that takes place in the computer sub-system block 1124, FIG. 14, are essentially a functional block diagram of the guidance system computer. The guidance system computer which does not form a part of this invention, but which is a co-pending case, will be more fully explained below. The form of the equations derived are written below in incremental form. This form is used to conform with the output of the accelerometers which are used on the stable platform in the guidance system. The accelerometers are of the type which measure velocity increments (velocity meters) rather than acceleration.

$$\frac{d\theta_c}{dt} = K[V_{gz} + SKUV_{gx}] - K[V_{gz}] - \Sigma V_{MZ} + SKUV_{MX} V_{gz}]T \quad (53)$$

$$\frac{d\Psi_c}{dt} = KA_{TY} + K[\Sigma Q_{YX}V_{GX}T - V_{MY}] \quad (54)$$

$$V_{gx} = V_{gxo} - V_{MX} = \Sigma Q_{XX}V_{gx}T - \Sigma Q_{ZX}V_{GZ}T \quad (55)$$

INERTIAL MEASUREMENT UNIT

The heart of the inertial guidance system is the inertial measuring unit hereinafter shortened to IMU. Its purpose is to provide increments of measured thrust velocity which may be resolved into components of a desired coordinate system. Conventional IMU's are devices which contain a plurality of subcomponents; accelerometers and gyros mounted on a stable element, which is maintained stable in a predetermined space reference frame. Basically, the IMU usually takes the form of a platform supported by a gimbaling system to isolate it from external disturbances caused by any maneuvers of the vehicle which carries it. Once the platform is set to a planned or accidental predetermined reference, gyros positioned along predetermined axes on the platform hold the platform at the predetermined reference by the integrated rate error signals nulled by a stabilization servo. The basic components of the IMU's and their functional operation as it pertains to an inertial guidance system is paragraphed below as to subcomponent.

Stabilized Platform

Fundamental to any inertial guidance system is the establishment and subsequent maintenance of a nonrotating attitude reference for the sensing accelerometers. In order to obtain the proper information necessary to solve the above derived guidance equations, the guidance system herein described uses a gimbal supported, gyro-stabilized component to which the sensing accelerometers are rigidly attached. A more detailed explanation of the positioning of the accelerometers and gyros on the stable platform may be had with reference to a co-pending application Ser. No. 534,552 filed Oct. 22, 1965.

The means used for providing stabilization are gyros mounted on the stabilized component along predetermined axes. In order to minimize the effect of acceleration on the respective error performances of the accelerometers and gyros, it is desirable to arrange the output axis of each so that it is aligned in the direction experiencing the highest acceleration. Normally, due to packaging difficulties and other factors it is necessary to compromise this type arrangement, therefore, the optimum arrangement is to align some of the instrument's output axis parallel to the SR axis and the rest of them in the plane of the trajectory (SR-SV plane). If the respective error performance of the instruments is not a critical factor then other arrangements may be provided as long as the arrangement supplies a stable reference frame. These gyros are used to provide a three-axis space reference for stabilization along three desired axes. Usually, the three axes are mutually perpendicular thereby covering the three independent angular degrees-of-freedom of the universe. To achieve a three-axis reference, the instant system uses three single degree-of-freedom gyros.

Figures 5, 6:
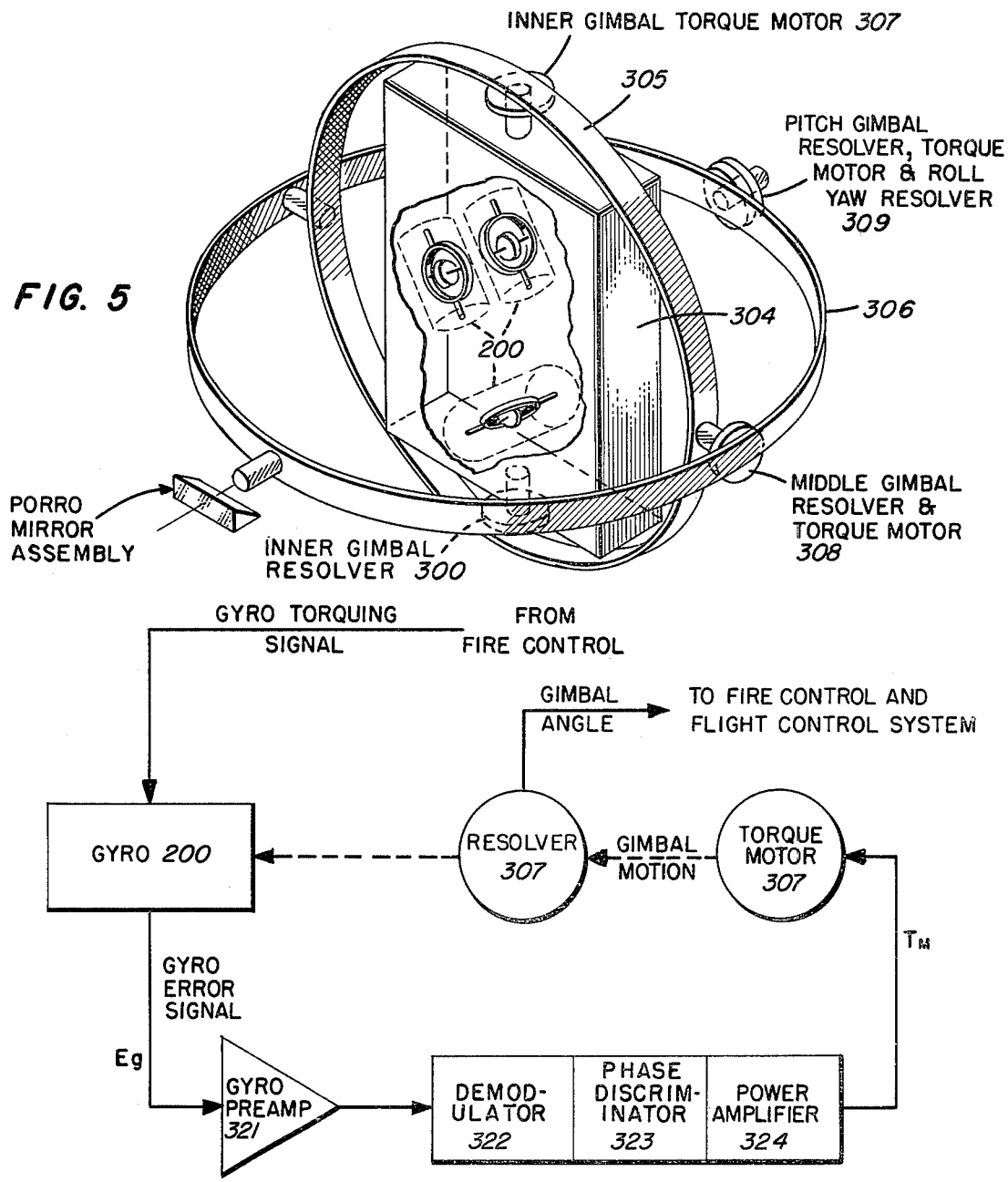
FIG. 5 represents a functional diagram of the stable platform.
FIG. 6 represents a functional block diagram of the gyro feedback system.

With reference to FIG. 5, there is shown a functional diagram of a stabilized platform member 304 mounted within a gimbaling system. The stable platform 304 has mounted thereon three single degree-of-freedom gyro assemblies 200 (FIG. 7). Each of the gimbals 305 and 306, respectively, is supported in rotary relationship with one another. Mounted at the rotary points are gimbal resolvers and torque motor assemblies 308 and 309, respectively; these units being of the type well-known in the gyroscopic art. The inner gimbal unit resolver assembly and torque motor is split into the inner gimbal torque motor 307 and resolver 300. The resolver section of the resolver and torque motor assembly 300, 307 and 308, respectively, are mounted on their respective gimbal axes for providing electrical indications to external circuitry (not shown) which indications are proportional to the angular differences between the respective gimbals.

FIG. 6 shows a functional diagram which illustrates the essential features involved in providing stabilization along one axis of a three-axis stabilized platform. Only the technique of stabilizing the stabilized platform 304 along one of its axes will be explained, since the stabilization along the other two axes uses essentially the same technique. Assuming the platform of FIG. 5 has been aligned to a desired reference by appropriate techniques and it is desired to maintain this reference, angular displacements of the gyro system 200 about its sensitive axis will cause generation of an electrical error signal $E_g$ which activates a servo loop to reduce the angular displacement to zero. The gyro error signal $E_g$ is boosted in amplitude by gyro preamplifier 321 and is processed through the electronic demodulator 322, phase discriminator 323, and power amplifier 324. The output, designated as electrical signal $T_m$, is used to control and power the gimbal torque motor, in this case 307, which acts about the sensitive axis of the gyro assembly 200. The torque motor section of assembly 307 restores stable platform 304 to the original gyro orientation along that particular axis, thus, maintaining this axis at its predetermined angular relationship with the predetermined established reference position. The process carried out about each axis by each servo loop of the three signal degree-of-freedom gyro assemblies 200 maintain the stable platform 304 at whatever orientation the gyro assemblies 200 originally possessed. Thus, a spatula reference is obtained by using gyro assemblies 200 as the primary reference element on a stabilized platform. Any disturbances which tend to move the platform from its predetermined space oriented reference are overcome by the combined effect of the gyroscopic reaction torques and the servo developed torques activated by the respective gyro error signal assemblies, FIG. 6.

In operation, the platform 304 is stabilized about three axes simultaneously by mounting the three gyro assemblies 200 with their input axes mutually perpendicular to each other. For example, when a disturbance tends to rotate the inner gimbal, which is represented by the stable platform 304, one or more of the gyro assemblies 200 will produce an electric signal output in proportion to the amount of disturbance generated along the axes. An error signal $E_g$ is produced to activate a servo system or systems to return the gyro assembly or gyro assemblies disturbed to their pre-aligned positions. Thus, always maintaining the stable platform 304 to its originally aligned space reference axes.

An electrical output may be taken from the resolver 307 which is representative of the gimbal angle. This output may be transmitted to the fire control system and the flight control system to be used as intelligence control signals. The input torqueing signal to the gyro 200 is an electrical signal from the fire control system which is used to rotate the gyro to its predetermined reference position. This technique is known as erection and alignment. Both of these techniques will be further explained below. The porro mirror system as indicated in FIG. 5 is used in optical alignment of the gimbal system. This technique forms no part of the instant invention and only will be explained where necessary in order to provide an understanding of the invention.

Inertial Reference Integrating Gyro

The component that provides the basis for the inertial reference for the non-rotating, space oriented axis is the inertial reference integrating gyro assembly 200, hereinafter referred to as IRIG. Major portions of the IRIG assembly, designated as assembly 200, are shown in the simplified schematic of FIG. 7. The IRIG has a case 201 within which is mounted a spherical float gimbal 204 which is surrounded by a fluid 206 of carefully controlled predetermined density and viscosity; fluid 206 also aids gimbal support through floatation. The float gimbal 204 is restrained to rotation about only one axis, the output axis designated as OA, hence, the IRIG assembly 200 is a single degree-of-freedom gyro. A float shaft 202 is attached at one end to the spherical float 204. Also attached to shaft 202 is a signal generator microsyn 203. The other end of shaft 202 extends through the case 201 on jeweled bearing 207. The spherical float gimbal 204 is supported at its other end by a similar shaft, designated also as 202, and this shaft has mounted thereon a torque generator microsyn 209. Shaft 202 further extends from one side of the torque generator microsyn 209 through the case via jeweled bearing 207. The two microsyns 203 and 209, respectively, in addition to serving as a torque generator and a signal generator, respectively, provide magnetic suspension and centering of the spherical float assembly 204. The torque generator and the microsyn 209 act as a motor for applying a torque to rotate the shaft 202 within its mounting to turn the spherical float gimbal 204 to any predetermined position. The signal generator microsyn 203, acts as a pick-off device for developing electrical signals which are a measure of the amount of angular movement of the shaft within its mounting.

Mounted in the spherical float 204 is a gyro wheel 205 which has a gyro spin reference as shown in FIG. 7. The interior of the spherical float is filled with helium and is represented as number 208.

Basic gyro units of this general type are well-known to those in the gyroscopic arts and more detailed details of the gyro described above as to structure and operation may be had by reference to the gyroscopic arts or appropriate textbooks.

Figure 7A:
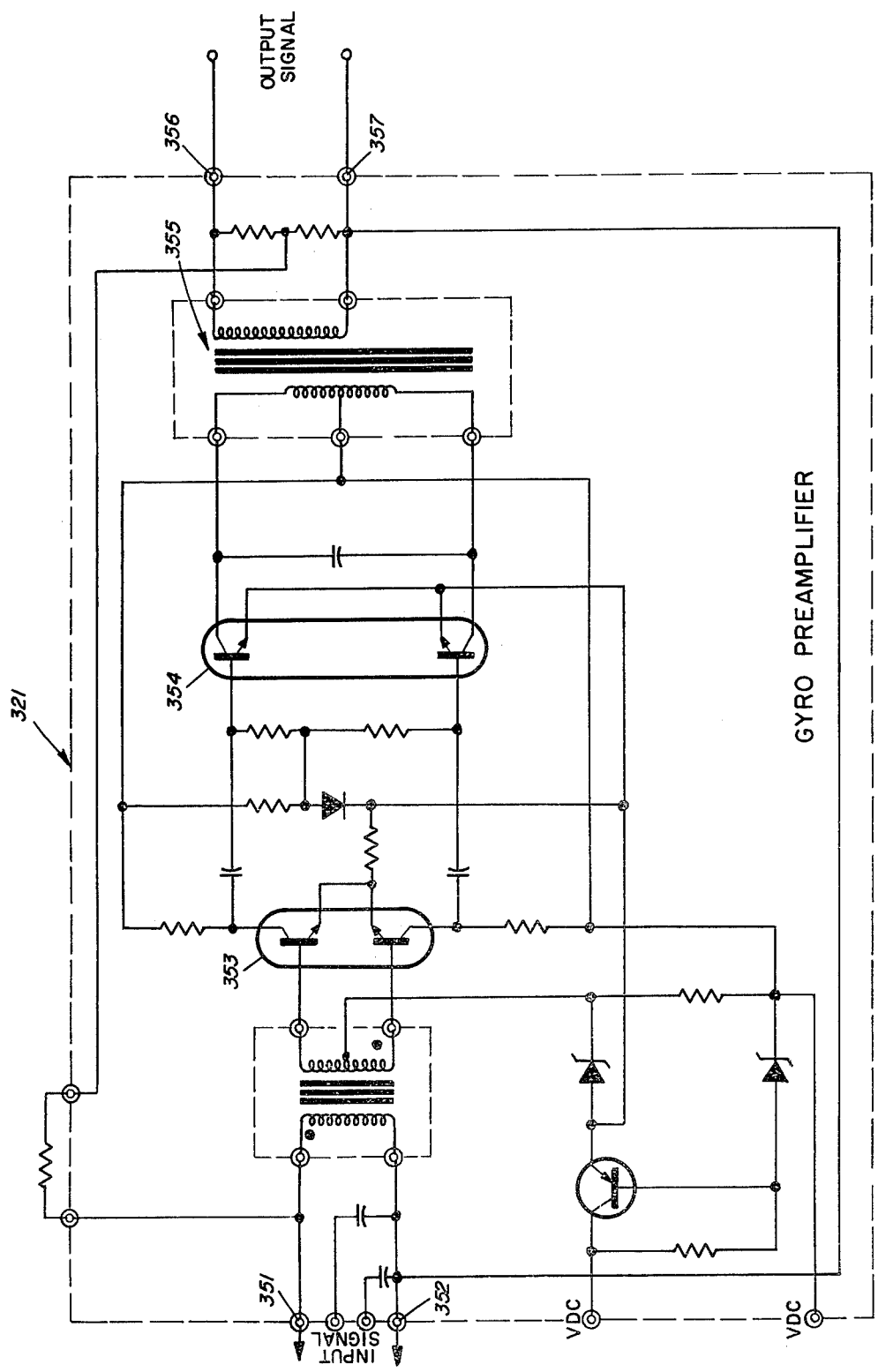
FIGS. 7a through 7c represent schematic diagrams of the units of the gyro feedback system.
Figure 7B:
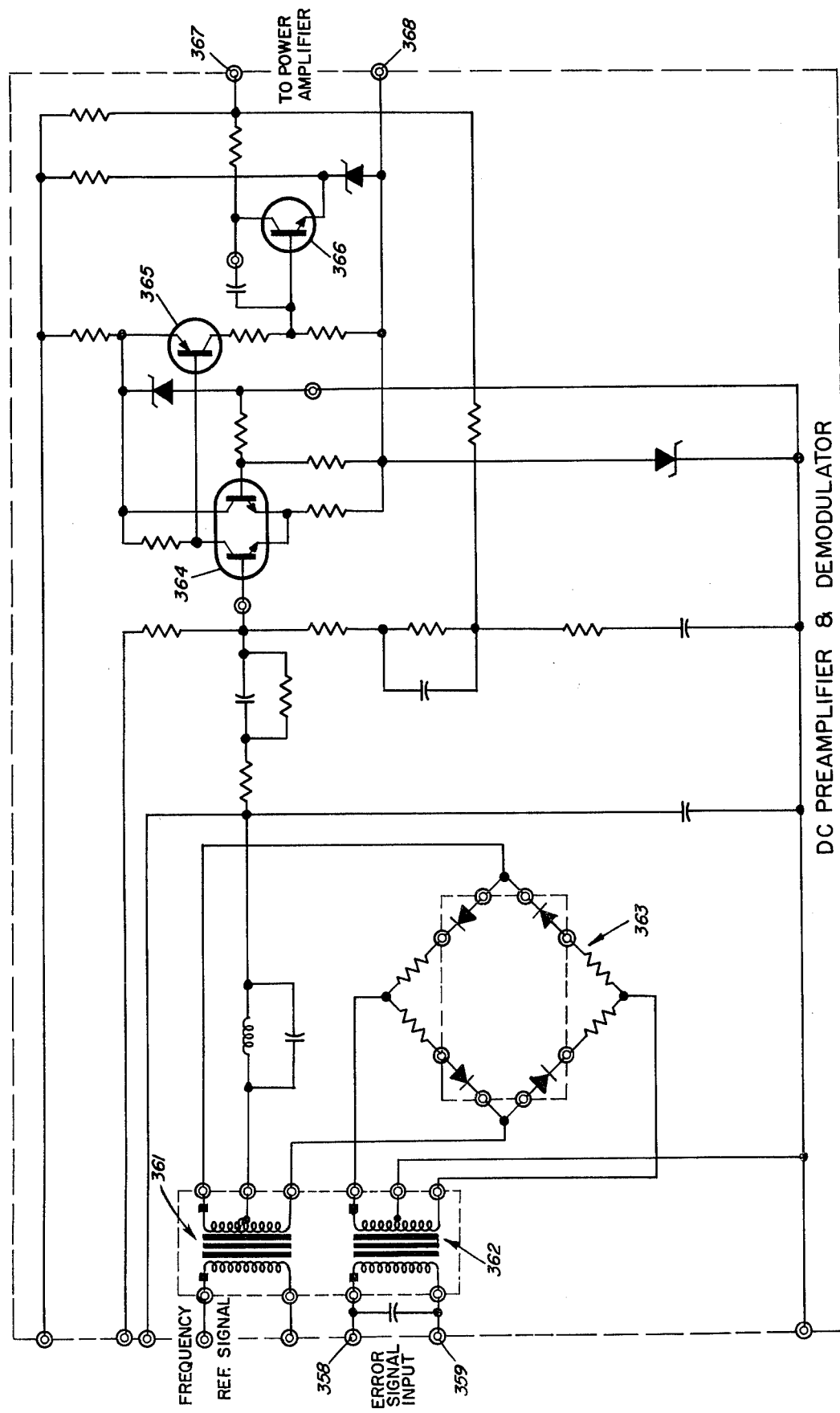
Figure 7C:
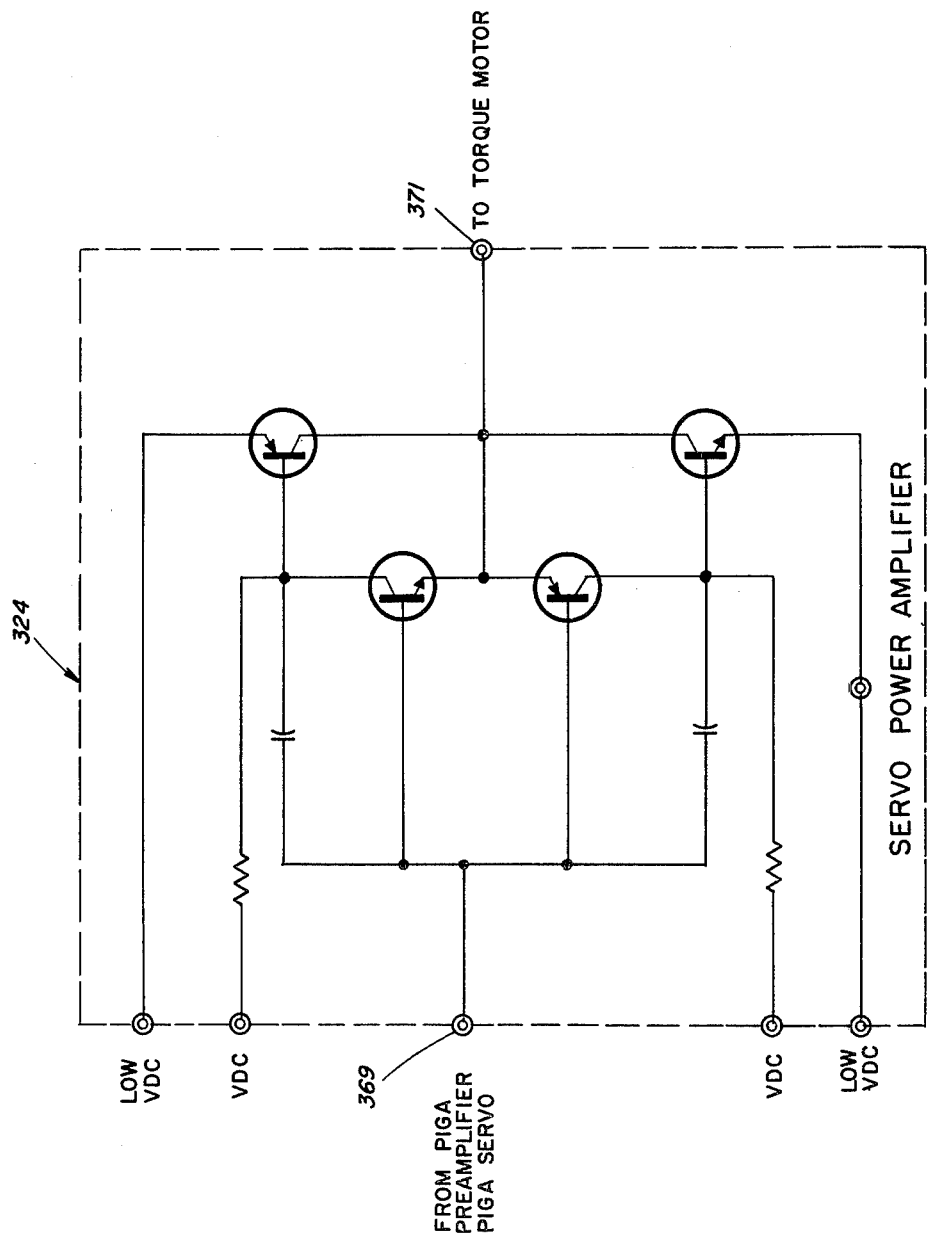

A detailed description of the IRIG electronic circuitry as shown in functional block schematic of FIG. 6 may be had with reference to FIGS. 7a, 7b and 7c. FIG. 7a shows a schematic diagram of a transistorized preamplifier stage 321. The gyro preamplifier used in the IRIG is a high-gain operational amplifier which is used to amplify the inertial components output signal.

In operation, the output from the microsyn signal generator, best shown in FIG. 7, is electrically coupled to input signal terminals 351 and 352, respectively. This error signal represented as $E_g$, in FIG. 6, is amplified by the two differential amplifier stages 353 and 354, respectively, and coupled to the input circuitry of D.C. preamplifier and demodulator circuitry.

The D.C. preamplifier demodulator and phase discriminator circuitry is best shown with reference to FIG. 7b. The amplified $E_g$ error signal output from the gyro preamplifier 321 is electrically coupled to input terminals 358 and 359, respectively. Generally, the demodulator and phase discriminator circuitry, 322 and 323, are shown as a full wave rectifying bridge circuit 363 that is fed by a pair of input transformers 361 and 362, respectively. The error signal from the gyro preamplifier 321 is applied through transformer 362, and a predetermined reference frequency signal is applied through the other transformer input shown as 361 to the bridge arms (not numbered). Generally, the bridge circuit consists of a matched diode quad and four precision resistors. In operation, the bridge circuitry 363 determines the polarity of the output voltage by comparing the predetermined reference signal and the error signal $E_g$ to determine if the error signal is in phase or 180° out of phase with the predetermined reference frequency signal. If these two signals, the reference frequency signal and the error signal, are in phase, the output voltage of the demodulator is positive. If it is out of phase, the output of the demodulator is negative.

The demodulator output is fed to a three-stage transistorized preamplifier, numbered generally as 364, 365 and 366, respectively. These D.C. amplifier stages amplify the positive or negative output voltage of the demodulator circuit and feed this signal to the servo-power amplifier circuitry via output terminals 367 and 368, respectively.

The servo-power amplifier circuit 324, best shown by FIG. 7c, has the output from the D.C. preamplifier and demodulated circuitry coupled to its input terminal 369. The signal input is power amplified by a conventional power amplifier transistorized stage and the output from this stage is fed to output terminal 371. This amplified output signal voltage represented as $T_m$ in FIG. 6 is fed to the torque motor 307 to drive the gimbaling on the stable platform back to its null position.

The electronic circuitry of the IRIG has been very generally explained with reference to FIGS. 7a, 7b and 7c, since the operation of these circuitry components is apparent from a perusal of the associated sub-module schematics.

Microsyn Assembly

A microsyn of the type used in the gyro assembly 200 is shown in FIG. 8. Referring now to this figure, there is shown a typical microsyn assembly 400 of the four-pole type although other types having other multiples of poles may be used in this application. The solid metal rotor 405 is surrounded by a stator of four poles 401, 402, 403 and 404, respectively. Each of the stator poles has a primary winding, wires 406 and 407, and a secondary winding, wires 408 and 409 wound thereon. The primary windings on adjacent poles are wound in opposite directions while the surrounding windings are wound on each pole in the same direction and are series connected; wire 408 being one side of secondary winding and wire 409 the other.

In operation, assuming a primary circuit through wires 406 and 407 whenever they are connected to a source of alternating current power (not shown), if the rotor is in the null position as shown in FIG. 8, the oppositely wound primary coils of adjacent poles will induce equal but opposite voltages in the series connected secondary coils. The signals from the adjacent secondary windings will cancel each other out, and there will be no net signal output at wires 408 and 409. However, movement of rotor 405 will bring flattened portions of the rotor 405 opposite two of the poles, and the increased gap in the magnetic circuits of these poles will decrease their effectiveness. The signal induced in the secondary coils will be reduced and will fail to completely cancel the signal from the adjacent poles which are not opposite flat portions of the rotor and a signal output proportional to the rotor angle will result.

In order to use the microsyn assembly 400 as a torque generator, a constant current source (not shown) is applied to the primary windings 406 and 407, respectively. The secondary winding wires 408 and 409 are used as control windings. If there is no signal in the secondary, the flux will flow from pole 401 to pole 404 and from pole 402 to pole 403 and no torque will develop. If there is a signal in the secondary wires 408 and 409 of the same polarity (or phase) as that in the primary, it will aid the primary coil in poles 401 and 403 and reduce the effects of the primary coils in poles 402 and 404. This provides a counterclockwise torque on the rotor 405 while an opposite polarity signal across the secondary wires 408 and 409 will create a clockwise torque on rotor 405. Therefore, due to this action, the torque generator may be used to supply command signals to the gyro to rotate and/or hold the gyro to any predetermined desired position.

Pendulous Integrating Gyro Accelerometer

The accelerometer component that is mounted on the stable platform and which measures the accelerations in the reference coordinate system with respect to free-fall are known as pendulous integrating gyro accelerometers. The measurement of acceleration along the axis of the accelerometer is accomplished by a feed back loop using an inertial component that is very similar in construction to the IRIG (see explanation above).

The inertial component of the accelerometer is a pendulous integrating gyro, hereinafter referred to as PIG. The PIG, indicated generally as numeral 500 in function schematic diagram of FIG. 9a, has a case 501. Mounted in case 501 is a spherical float 504 which is surrounded by fluid 508. This fluid has a carefully controlled predetermined density and viscosity. The float gimbel 504 is restrained to rotation about only one axis; the output axis designated as OA. A float shaft 502 is attached to one side of a signal generator microsyn 503 and to one side of the spherical float 504. The other side of the float shaft 502 is attached to the other side of the spherical float 504, extends through a microsyn torque generator 507 and through the end of casing 501. At either end of the casing are jeweled bearings (not shown) which provide substantially frictionless support to float shaft 502. Inside the spherical float 504 and attached thereto is a gyro wheel 505. Attached to one side of gyro wheel 505 is an unbalanced mass 506. The two microsyns 503 and 507, respectively, in addition to serving as a signal generator and a torque generator, also serve to provide magnetic suspension and centering of the spherical float assembly 504.

Figure 9A:
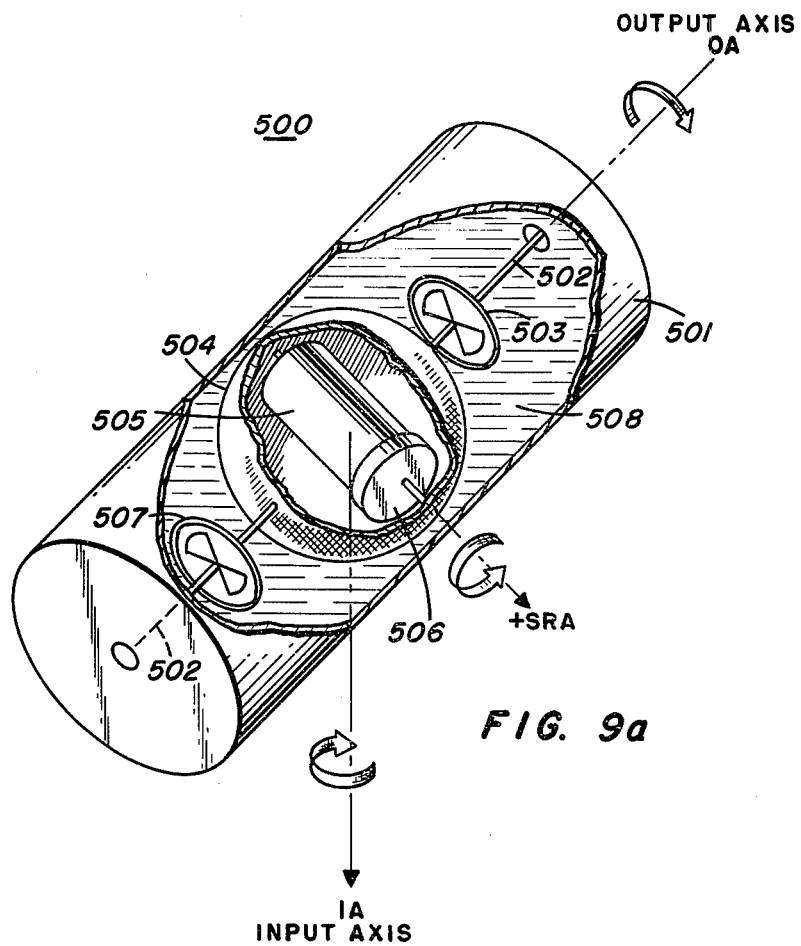
FIG. 9a represents the pendulous integrating gyro schematic diagram.

This technique of suspension provides for substantially frictionless rotation of the spherical float 504 to reduce friction errors in the PIG. The PIG is different in construction from the IRIG (which was explained above) only in the construction of the gyro wheel 505. The PIG wheel 505 has the unbalanced mass 506 along the spin axis that moves the center of the mass of the wheel off the axis of the float output shaft. When a net force component along the input axis of the PIG is applied to the PIG case, it acts uniformly on the spherical float through the fluid 507. The force is thus applied on, and accelerates, the float axis. The float mass (off-center) then sets up a torque about the float axis, rotating it and developing a signal generator output from the microsyn 503. The pendulous integrating structure, as explained herein, is a basic unit for measuring accelerations. In order to convert the PIG to an accelerometer, the PIG is assembled in a case which may take the structural form, such as shown in FIG. 9a and the electrical form, such as shown in FIG. 9c.

Figure 9B:
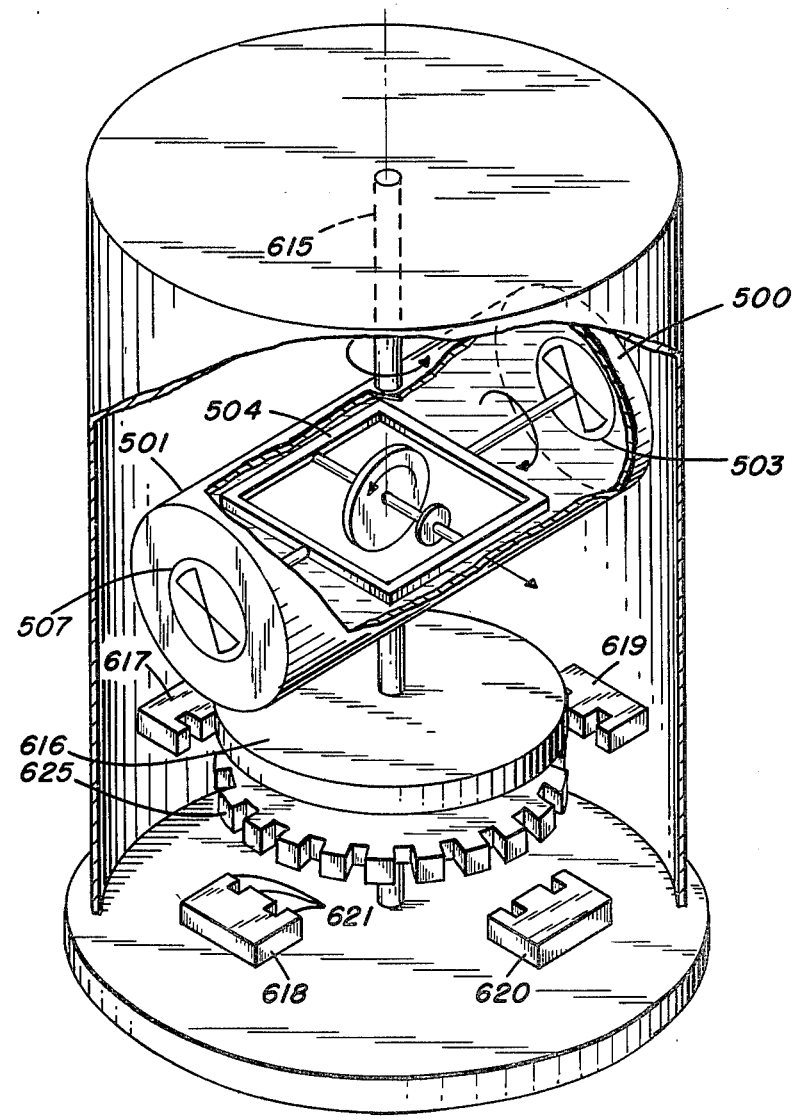
FIG. 9b represents a functional diagram of the pendulous integrating gyro accelerometer.
Figure 9C:
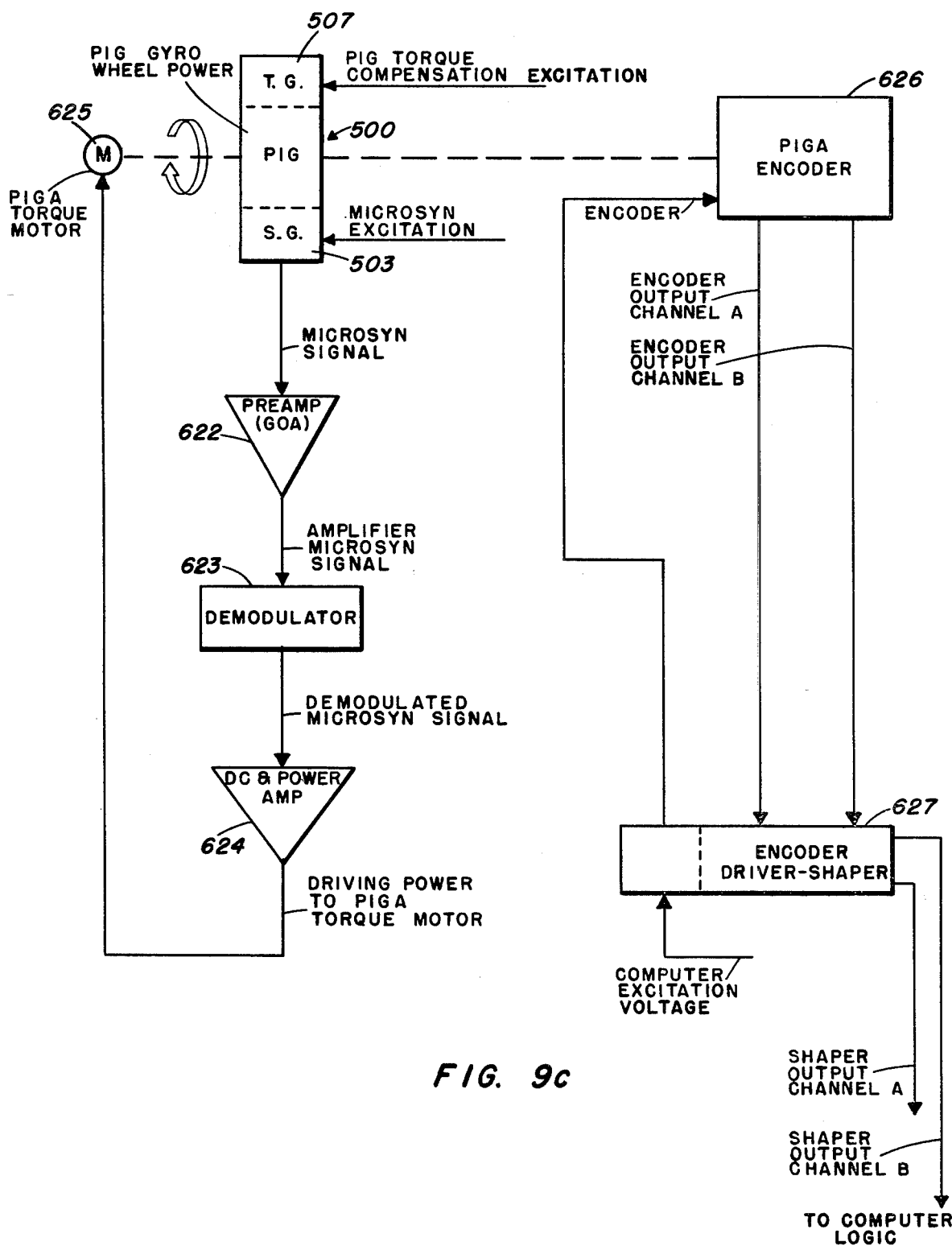
FIG. 9c represents a functional schematic diagram of the PIGA servo loop.

The PIG 500, simplified from that assembly shown in FIG. 9b, is held in a yoke, not shown, and a trunnion shaft 615 that is aligned with the PIG input axis. When a force on the PIG 500 develops a signal at the signal generator 503, due to a force acting as described above, this signal is coupled via electrical means, best shown in FIG. 9c, and into preamplifier 622. The signal is amplified by preamplifier 622, demodulated in demodulator 623 and amplified in amplifier 624 to a control signal for a torque motor to drive the yoke and shaft. The output of the amplifier is coupled to feed the control signal to the torque motor rotor 625 by a commutating means.

The amount of angular rotation of the yoke and the shaft 615 with respect to the PIG case 501 will then be the measure of the integrated accelerations. The accelerometer assembly is functionally completed by providing an accurate measure of this angular rotation. Since the displacement is an analog quantity, it must be converted, not only to an electrical signal, but also to digital form before it can be interpreted by the guidance computer. This is accomplished by the encoder assembly which is attached to one end of shaft 615 (FIG. 9b). The encoder is a variable reluctance magnetic device which has a notched or toothed wheel 616 extending through and fastened to the trunnion shaft 615 to rotate as the trunnion shaft rotates. Positioned adjacent to the toothed wheel 616 are four stationary toothed pickup-drivers 617, 618, 619 and 620, respectively. The pickup-drivers are positioned ninety degrees from one another. Associated with the pickup-drivers are electrical windings, which are not shown.

In operation, the center pole of each pickup-driver of 617, 618, 619 and 620, respectively, excites or drives the encoder and may be considered the primary of a transformer. The center pole or driver pole is excited by a pulsed predetermined frequency (best shown in FIG. 9c) usually taken from the computer subsystem. The driver pole is constructed so that it has a width equal to a full-toothed wheel 616 tooth pitch; therefore, the magnetic path of the excitation field does not vary as the encoder wheel rotates.

The two outer poles of each pickup-driver do not have the same pole-to-wheel gap air gap. The pole with the smaller air gap transmits most of the magnetic flux generated by the driver pole and may be considered the secondary of a transformer that has the driver pole for the primary. The magnetic coupling between the driver pole and the pickup pole varies in an approximately sinusoidal fashion if the encoder wheel rotates at a constant rate. Hence, the voltage pulse induced in the pickup coil are sinusoidally amplitude modulated.

The encoder has two output circuits, channels A and B, one from each set of pickup poles. This output is transmitted to a shaper circuit in the computer subsystem (see FIG. 9c) and generates corresponding pulse trains with a square wave variation. Each cycle of sinusoidal or square waves pulse train modulation indicates an encoder wheel movement of one tooth pitch and the frequency of the modulation is proportional to the linear acceleration experienced by the unit.

Generally, the shaper circuit 627 consists of a Schmitt trigger which is set for the midpoint level of the sinusoidally modulated encoder pulse train from an output circuit. When an incoming encoder pulse exceeds the triggering level of the circuit, an output pulse is generated. When an incoming encoder pulse is below the triggering of the circuit, no output pulse is generated. The output of the shaper channels is gated into the computer PIGA decoder logic which will be further explained later with reference to FIGS. 14a, b, c and d.

With reference to FIG. 9c, there is shown a functional schematic diagram of the PIGA servo loop. Like numbers for the same components are used with reference to the three respective drawings of the PIGA unit; drawings numbered FIGS. 9a, 9b and 9c. The servo feedback loop best shown in FIG. 9c starts with the generation of a signal from the generator microsyn 503 in the PIG unit. This signal is transmitted via preamplifier 622, demodulator 623, DC and power amplifiers 624 to the PIGA torque motor 625. The torque motor 625 is mechanically coupled to rotate the PIG assembly 500 in response to the error signal fed back through the feedback loop. Also, mechanically coupled to the PIG assembly 500 is the PIGA encoder; mechanical details of which are best shown in FIG. 9b. The PIGA encoder block 626 is representative of the pickup-driver units 617, 618, 619 and 620, respectively, and the toothed wheel 625. Two outputs, channels A and B, are electrically coupled to the encoder driver shaper block 627. An excitation voltage coupled from the computer subsystem to the PIGA encoder 626 via the encoder driver shaper circuitry 627.

A more detailed arrangement of the servo loop and output signals from the two channels may be better understood with reference to FIGS. a, b, c and d. Also, a detailed explanation of the component parts of the servo loop components, preamplifier 622, demodulator 623 and DC and power amplifier 624 may be had with reference to the section of the specification dealing with the IRIG units, since these electronic sub-modules are of substantially the same design.

With respect to the encoder shaper and driver circuitry, the purpose of these circuits is to supply an output that is amplified and shaped in accordance with the frequency modulated pulse envelopes produced at the encoder output. One driver section of the encoder functions to couple the computer excitation voltage or interrogation signal from the computer subsystem into the driver windings (referred to above as primary) of the encoder.

Figure 14A:
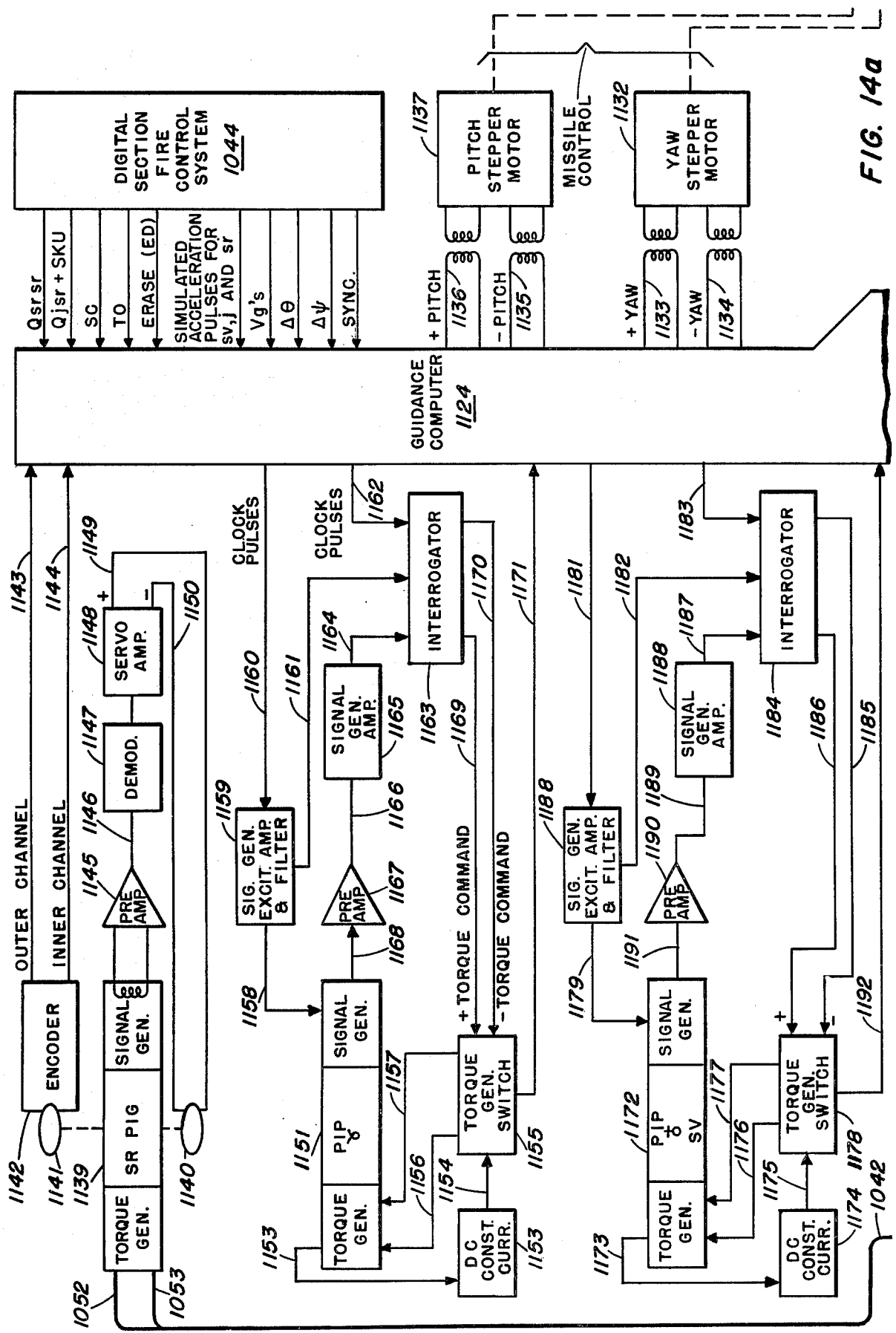
FIGS. 14a through 14d represent a functional block diagram of the guidance system.

The shaper section of the encoder circuit consists of two identical circuits; one shapes the pulses of the first channel, and the second shapes the pulse of the second channel. These two channel outputs are identical, except that the two wave forms are 90° out of phase with one another. These two wave form signals are proportional to the accelerations measured by the PIGA system. Reference to FIGS. 14a, b and c will further clarify how this particular subsystem fits into the overall guidance system of the instant invention.

Pulse Integrating Pendulum Accelerometer

Another type of accelerometer component that is mounted on the stable platform 304 and which measures acceleration in a reference coordinate system with respect to free-fall is known as pulse integrating pendulum accelerometer; hereinafter referred to as PIPA. The PIPA is also used in much the same manner as the PIGA; that is, to sense and measure acceleration along a single desired axis. The inertial component of the accelerometer is a pendulous integrating pendulum, hereinafter referred to as PIP.

A more detailed explanation of the operation and structure of the PIPA system may be had with reference to co-pending application, Ser. No. 543,552 filed Oct. 22, 1965.

Figure 10A:
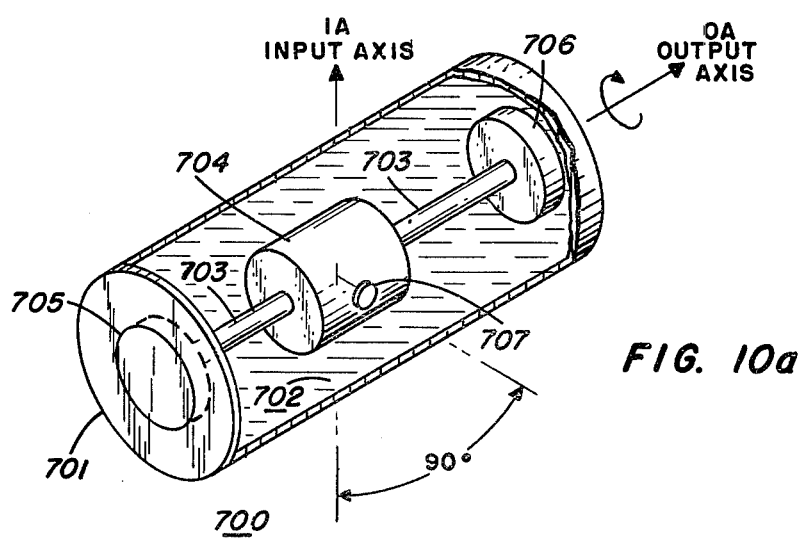
FIG. 10a represents a functional schematic diagram of the pendulous integrating pendulum.

Referring now to FIGS. 10a and b, there are shown functional diagrams of a PIP and a PIPA subsystem. The PIP, generally designated as 700, has an enclosed outer case 701. Suspended between either end of case 701 is shaft 703 which has affixed at its center an unbalanced cylindrical mass 704. Positioned on the surface of the cylindrical mass 704 is an additional mass 707 to cause cylindrical mass 704 to be unbalanced. The unbalanced cylindrical mass 704 is floated in dampening fluid 702 which fills the interior of the case 701. Shaft 703 extends from either end of the unbalanced mass 707 through the parallel sides of the cylindrical case. At the parallel side are located two microsyns, 705 and 706, respectively. One of these microsyns serves as a torque generator 705 while the other serves as a signal generator 706. In addition, both microsyns provide magnetic suspension for the cylindrical unbalanced mass 704.

Figure 10B:
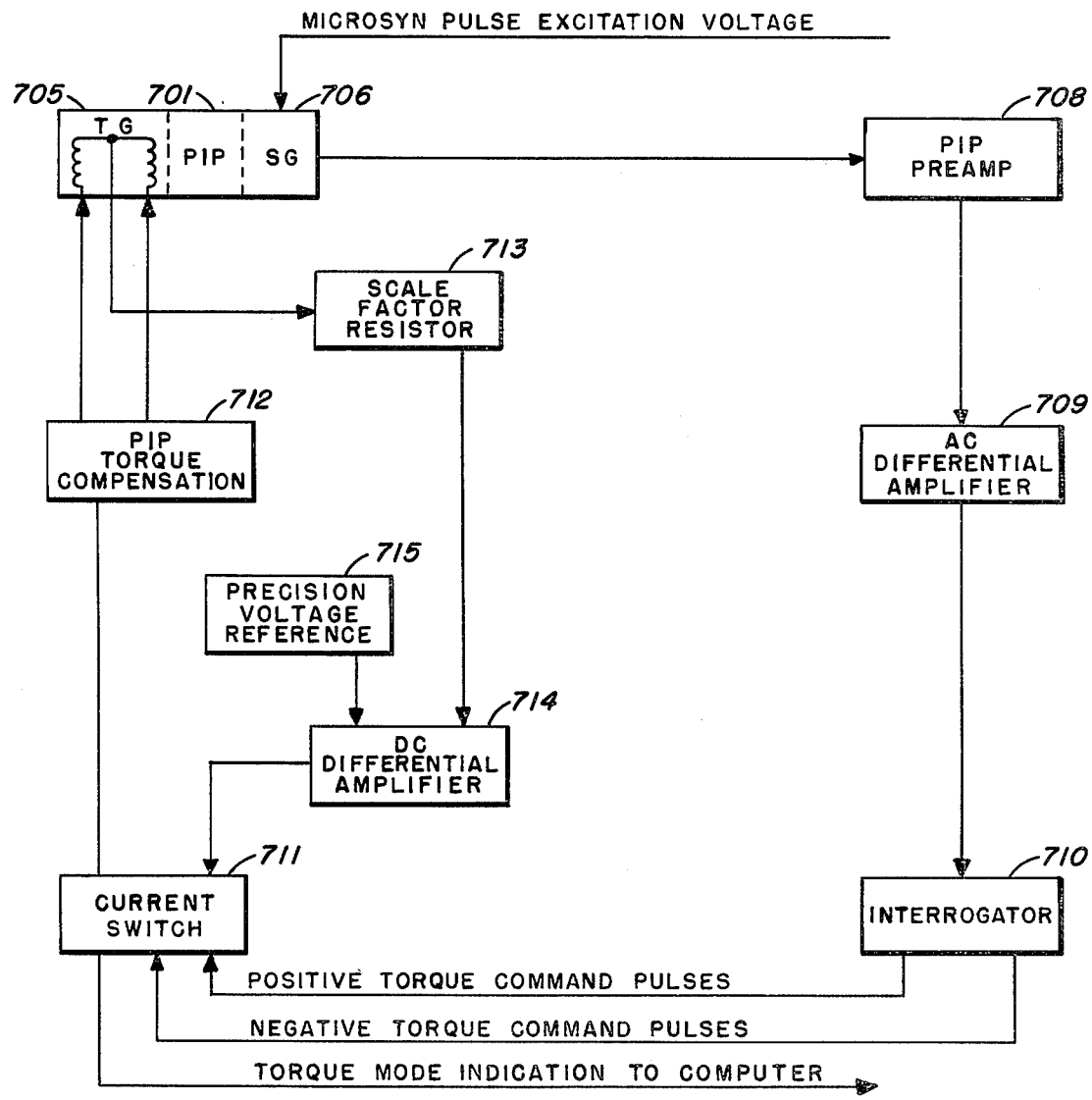
FIG. 10b represents a functional diagram of the PIPA subsystem.

A simplified version of the PIP and its electronics is shown in FIG. 10b. The PIPA electronics monitor the deflection angle data of the PIP and control the direction of an applied moment so that the pendulum mass 704 is always driven toward its zero position.

The figure showing the PIPA subsystem functional block diagram, FIG. 10b, shows generally the PIP case 701 having at its either end the torque generator 705 and the signal generator 706, respectively. The signals from the signal generator 706 are fed through a PIP preamplifier 708. Electrically coupled to receive the output of the PIP preamplifier 708 is an AC differential amplifier 709. The output of this differential amplifier 709 is coupled to the input circuit of an interrogator 710. The interrogator has two signal outputs; one, the positive torque command pulses, and the other, the negative torque command pulses. These command pulses are fed to current switch 711. Coupled to the current switch 711 is a PIP torque compensation network 712. This torque compensation network 712 has two outputs which are coupled to the torque generator windings in the case 701. An electrical signal output is taken from torque generator windings 705 through scale factor resistor 713 to DC differential amplifier 714 to current switch 711. A precision voltage reference source 715 is coupled to the DC differential amplifier 714 for providing a voltage reference which is compared against the voltage coming from the scale factor resistor 714. The DC differential amplifier 714 generates an output signal to the current switch 711 which is proportional to the voltage difference between the scale factor resistor output 713 and the precision voltage reference 715. An output from the current switch 711 torque the PIPA float assembly. A torque mode indication signal is transmitted to the guidance computer as an indication of actual sensed PIPA acceleration in digital form.

Computer Subsystem

The computer subsystem is a very important part of an inertial guidance system, since this subsystem applies the intelligence necessary to guide the missile during flight along a path in space so that, at flight termination, the missile will follow a free-fall trajectory to a predetermined target. Generally, the computer functions can be broken down into three operational areas which are designated as navigation, guidance and control.

The navigation function of the computer subsystem is the acceptance of the output of an accelerometer or accelerometers which sense the acceleration of the stabilized platform along predetermined axes and the formation of velocity signals referenced to some inertial coordinate system. In guidance, the function of the computer subsystem involves the generation of required velocity parameters, together with preset initial velocity conditions, whereas the control function of the computer subsystem compares the parameters determined by the navigation function and the guidance function and generates from these parameters vehicle control signals which cause the difference between the navigation and guidance quantities to approach zero. In essence, the control function of the computer calculates control commands from the received parameters to direct the missile on course along its pitch and yaw axes.

The guidance computer subsystem used in the instant invention solves the velocity and steering equations which were derived above by means of a basic digital differential analyzer technique. The computer, prior to missile launch, stores the initial values of velocity-to-be-gained, $V_G$. These values are reduced during flight by the $V_G$ computing section until the missile acquires the correlated velocity, $V_c$. Signal pulses that represent incremental values of thrust velocity from the accelerometer subsystem, the PIGA and the PIPA, are accepted by the computer. These signal pulses are used to reduce the value of velocity-to-be-gained. Whenever the velocities-to-be-gained along the predetermined accelerometer axes are finally reduced to predetermined chosen values, a pre-arm signal is generated to arm the warhead of the missile. When the velocity-to-be-gained along the accelerometer axis in the X or SR (slant range) direction is reduced to zero, a cutoff signal is generated to separate the motor from the missile warhead and the missile warhead then proceeds to the target by free-fall.

In addition, the computer subsystem also furnishes reference frequencies, supplies accelerometer erection impulses and control functions to the autopilot.

A detailed description of the computer may be had with reference to co-pending application Ser. No. 502,689 filed Oct. 22, 1965. Only so much of the computer subsystem will be explained below as is necessary for a complete understanding of the instant invention.

Figure 11:
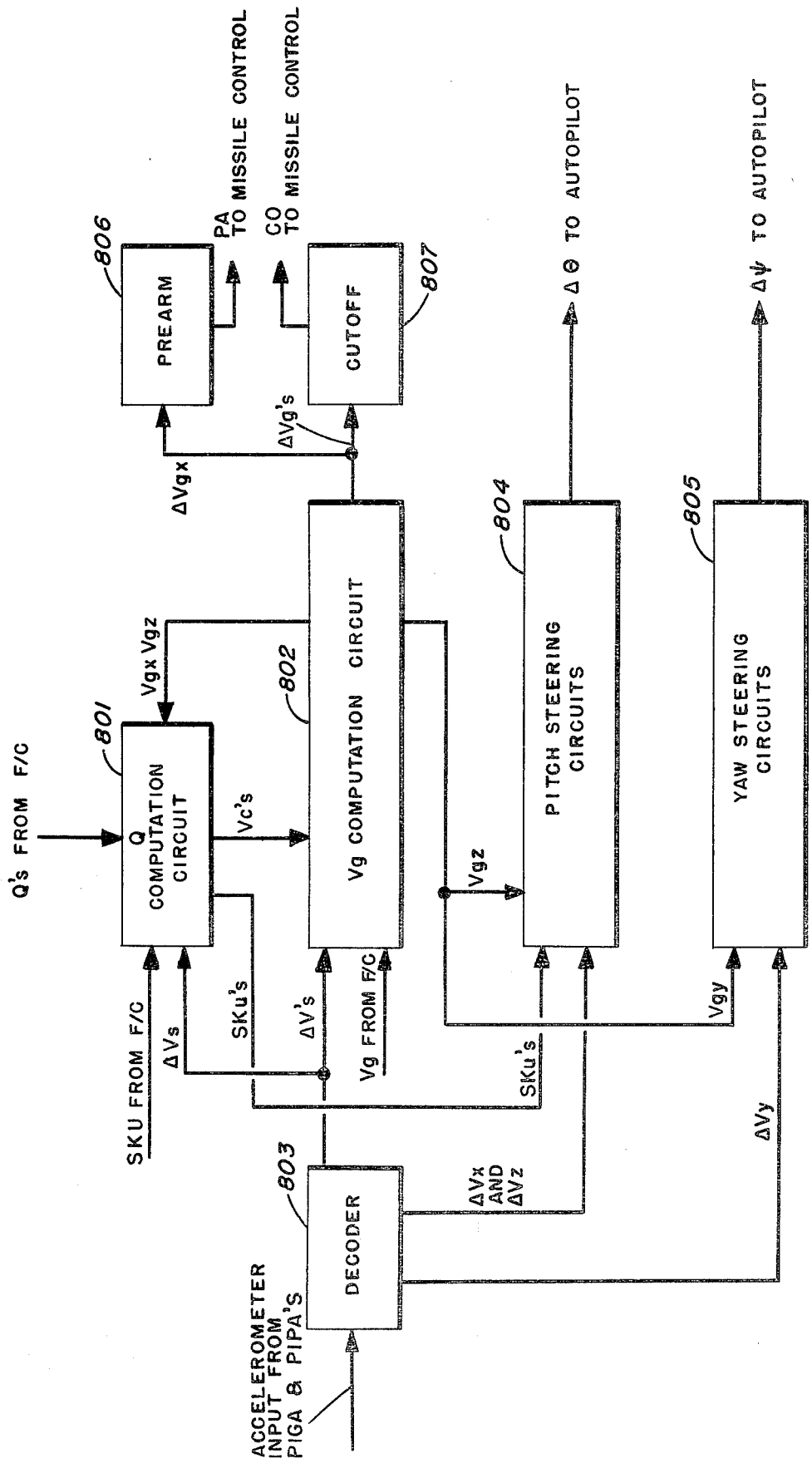
FIG. 11 represents the computer subsystem functional diagram.

Generally, the computer subsystem may take a form such as shown in the functional block diagram of FIG. 11. Accelerometer inputs from the PIGA and the PIPA positioned on the stable platform transmit their velocity signals to decoder circuitry 803. These velocity input signals are represented by the velocity along the axes $\Delta V_x$, $\Delta V_y$ and $\Delta V_z$. An output from the decoder section 803 couples all of the $\Delta V$'s to the Vg computation circuit 802. Also coupled to the Vg computational circuit 802 predetermined stored velocity-to-be-gained voltages from the fire control system. The $\Delta V$'s and the stored velocity-to-be-gained values from the fire control system are combined in the computation circuit 802 and the output values which are coupled to the Q computational circuit 801 are modified in accordance with changes in the $\Delta V$'s. Also fed into the Q computational circuit 801 are $\Delta V$'s from decoder 803 and the SKU values from the fire control system. Outputs from the Q computational circuit 801 are coupled to the Vg computational circuit 802 and the pitch steering circuit 804. An output from block 802 feeds $\Delta V_{gx}$ to the pre-arm and cutoff control sections 806 and 807, respectively.

These two sections generate pre-arm and cutoff signals to the missile system. The pre-arm signal activates the warhead arming mechanism just prior to cutoff and the cutoff signal transmits a cutoff signal to the missile control whenever a predetermined condition has been satisfied. The functional block 802 also feeds a $V_{gz}$ signal to the pitch steering circuit 804 and the yaw steering circuit 805. Two additional outputs are taken from the decoder 803 and fed to the yaw steering circuits and the pitch steering circuits. These circuits generate steering commands in the form of pulses, each pulse representing a predetermined radian. The $\Delta V_x$ and $\Delta V_z$ signals along with the SKU signals from the Vg computational circuit 802 are combined in the pitch steering circuit in accordance with the $\Delta \theta$ guidance to given an electrical output representative of $\Delta \theta$ to the autopilot.

The yaw steering circuits 805 which are electrically coupled to receive at its input $\Delta V_y$ and $V_{gy}$ electrically combine these quantities in accordance with the $\mu$ equation. An electrical output that is representative of $\mu$ is then transmitted to the autopilot.

A timing circuit (not shown) connects to each of the individual functional blocks shown in FIG. 11 to provide synchronization and timing impulses for the various component functional blocks.

For an additional understanding as to the Q computational circuit 801 and the operational effect of the SKU signals on the missile may be had with reference to FIG. 12 and that portion of the specification which refers to FIG. 12. FIG. 12 was used to generally illustrate a type of theoretical computer which would be necessary to solve the guidance equations developed in the specification.

Figure 13:
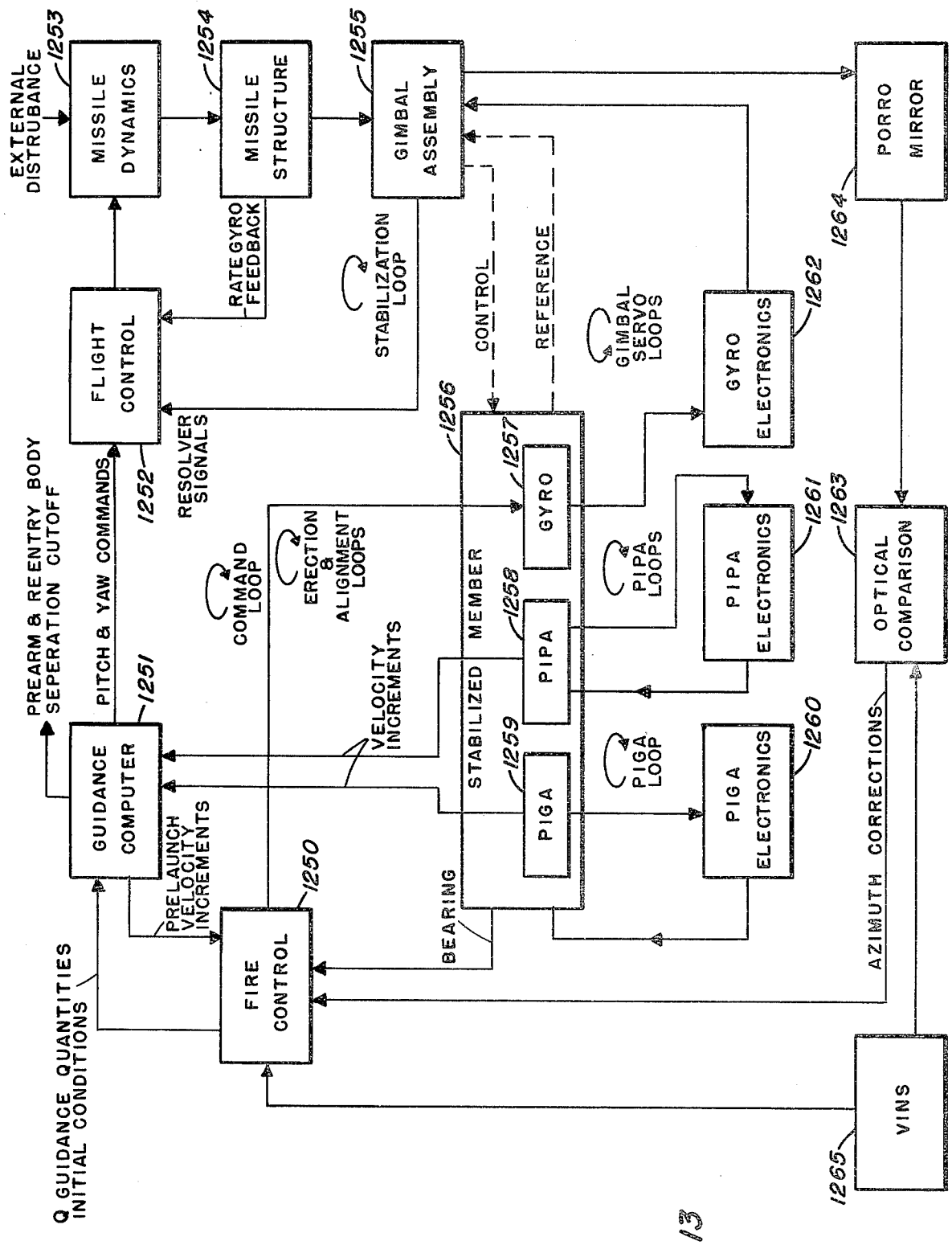
FIG. 13 represents a functional block diagram of the instrumentation of the guidance system.

Referring now to FIGS. 13 and 14, there are shown complete functional block diagrams of the instrumentation of the guidance system. The guidance system functions may be broken up into a number of servo loops, this being best shown in FIG. 13. Also shown in FIG. 13 are components such as fire control functional block 1250, inertial navigation system functional block 1265, optical comparison system function block 1263, and porro mirror functional block 1264 which form no part of the present invention. These component functional blocks are included in the drawing and description merely to facilitate an understanding of how the instant invention operates and where the instant invention obtains the initial conditions referred to in the specification. FIG. 14, on the other hand, shows a complete functional block diagram of the overall guidance system. Included in FIG. 14 are only that portion of the fire control system which is necessary to the disclosure of the instant invention. It should be noted that the components shown in FIGS. 14a-d correspond to the detailed description given above. Therefore, in order to provide a clear understanding of the system shown in FIGS. 14a-d, FIG. 13 and prior figures will be referred to throughout the following description.

Positioned on the stabilized member 1256 (FIG. 13) are gyro units 1257 which are electrically coupled to the gyro electronics block 1262. The gimbal assembly 1255 is also electrically coupled to the gyro electronics block 1262 and mechanically coupled to the stabilized member. The stabilized member 1256 is maintained in a space-fixed orientation by three gimbal servo loops. Shown in greater detail in FIG. 14 are the three gyros and their respective servo loops. Mounted on the stabilized member (not shown in FIG. 14) are three single degree-of-freedom inertial reference integrating gyros, 1001, 1002 and 1003, respectively, which respond to angular displacement. These three gyros stabilize the platform completely from all external disturbances. The three IRIG's will be referred to hereinafter as the X or (SR, slang range) IRIG, Y or J (horizontal) IRIG and the Z or (SV, slant vertical) IRIG. These designations correspond to three mutually perpendicular reference coordinate axes to which the input sensitive axes of the IRIG's are aligned (see FIG. 16). The structure and operation of the IRIG unit was completely explained above under the subtitle IRIG.

The inertial reference subsystem has the function of providing a non-rotating attitude reference. The stabilized member of the inertial reference subsystem is supported by gimbals best shown in FIG. 5 and by rotating about the three gimbal axes the stabilized member may remain in an unchanging attitude while the missile which carries it assumes the various attitudes, planned and accidental, which can occur before, during, and after the launch process.

The primary purpose of this inertial subsystem is to hold the accelerometers positioned on the stabilized platform on the particular orientations as required by the guidance concept. To perform this, the inertial reference must not only be non-rotating, but also be correctly oriented for correct acceleration measurement. This requires the processes called erection and alignment, which orient the inertial reference to a predetermined position. These techniques will be further explained later.

With reference to FIG. 14, the (SV)IRIG stabilization loop may be traced from block 1003. This functional block has its output electrically connected by means of lead 1004 to preamplifier 1005. The preamplifier 1005 amplifies the output accelerations as produced by the unit as shown in FIG. 7 and which operation is explained with reference thereto.

Referring to FIG. 7a, there may be seen a typical circuitry arrangement of the preamplifier 1005. In operation, the output of the preamplifier is electrically connected by lead 1006 to demodulator circuit 1007. The demodulator circuit 1007 detects the signal from the IRIG and feeds the detected signal through electrical lead 1008 to servo amplifier 1009. The schematic diagrams of the demodulator circuitry 1007 and servo amplifier 1009 are shown with reference to FIGS. 7b and c. The servo amplifier 1009 amplifies the demodulated signal to give a positive and negative output which is connected to inner gimbal torque motor 1012 by leads 1010 and 1011, respectively. The servo amplifier 1009 is essentially a power amplifier stage for increasing the signal output so that enough power is generated to drive the inner gimbal torque motor 1012 to correspond to the error signal.

The inner gimbal torque motor 1012 is mechanically coupled to drive error gyro resolver 1016. The gyro error resolver 1016 has two inputs; one from the (J)IRIG 1002 and one from the (SR)IRIG 1001. The output from the (J)IRIG 1002 is shown as electrically coupled by lead 1013 to the input of preamplifier 1014 which is similar in construction to preamplifier 1005. The output of preamplifier 1014 is coupled to the gyro resolver 1016 by means of electrical conductor 1015. Outputs from the resolver are connected to feed electrical signals by means of leads 1017 and 1018, respectively, to the input circuitry of demodulator 1017. The output of demodulator 1019 is fed to servo amplifier 1022 by means of electrical leads 1020 and 1021 and the output of servo amplifier 1022 is coupled to the middle gimbal torque motors 1025 and 1026 by means of electrical leads 1023 and 1024.

The (SR)IRIG block 1001 has its output coupled to preamplifier 1037 by means of electrical conductor 1038. Preamplifier 1038 is of the same general construction as the two previous preamplifiers 1005 and 1014. The output from preamplifier 1037 is coupled to gyro error resolver 1016 by means of electrical lead 1039. Outputs are taken from the gyro error resolver 1016 and fed to demodulator 1029 by means of electrical leads 1027 and 1028. The output of the demodulator is fed to servo amplifier 1032 by means of electrical conductors 1030 and 1031, respectively. The servo amplifier 1032 has its output fed to outer gimbal torque motors 1035 and 1036 by means of electrical conductors 1033 and 1034.

The respective gyros 1001, 1002 and 1003 give gyro indications which are used to develop control signals. When no external disturbances are present, the input sensitive axis of the IRIG is always at right angles to both the spin axis and its output axis. However, when any rotation around the input sensitive axis IA of an IRIG is sensed, the rotation causes float rotation, called precession, around the gyros output axis. The signal generator on this axis develops a voltage proportional to this angular displacement; this is the error signal Eg (see FIG. 6) sent to the gyro servo amplifier which drives the gimbal system in the proper direction to correct for motion around the input sensitive axis of the IRIG, thus stopping the precession. These restoring actions take place quickly, keeping the precessional movement of the float unit small. By use of three IRIG's mounted on the aximuth gimbal with mutually perpendicular input sensitive axes, this unit can be stabilized accurately in all three dimensions.

The three IRIG blocks 1001, 1002 and 1003, respectively, have three electrical inputs from the fire control (see FIG. 13, erection and alignment loop). The first electrical input for the (SV)IRIG block 1003 comes from the analog section of the fire control block 1044. Coupled to this block is a transformer 1043 connected to two electrical leads 1040 and 1041, respectively. These leads are coupled to input leads 1048 and 1049 via cable 1042; (SV) gyro torque signals are fed by this means to the (SV)IRIG during erection and alignment. When it is desired to reposition the azimuth gimbal, the IRIG torque generator microsyn is energized with electrical signals from fire control to deliberately create float precession about the SV gyro output axis. The signal generator microsyn of the IRIG unit again produces error signals, which after amplification and conversion to DC torqueing signals, drive the inner gimbal torque motor 1012 to drive the necessary gimbals until the desired position is reached. When the torque generator microsyn is de-energized, the platform will be stabilized in its new position. The microsyn units carry both primary and secondary windings. Movement of the signal generator microsyn rotor varies the reluctance of the magnetic circuit and causes a variation of the magnetic field induced by the primary winding. The secondary winding responds to this flux variation and develops a signal voltage at a given scale factor of millivolts of signal generator output per milliradians of gyro input axis rotation.

Operation of the microsyn as a torque generator is initiated by applying external signals from the analog fire control block 1044 via electrical leads 1040 and 1041 to the secondary winding of the torque generator microsyn in the (SV)IRIG; this signal will aid the primary winding in building up the magnetic field at one pole and oppose the primary winding action on the adjacent pole. The results will cause the magnetic field to be asymmetrical and the rotor will be repositioned to re-establish a symmetrical distribution of the magnetic flux. The direction in which the magnetic field will shift, and therefore the direction in which the gyro output axis will shift, depends on the phase of the voltage applied to the secondary windings. This torqueing action also may be used to minimize the effects of gyro drift.

As explained above, the microsyn is also used as part of the magnetic suspension circuitry. If the rotor is radially displaced, it effects the inductance of all the windings which, in turn, controls the current through these windings. The resulting magnetic field will increase on the side of increased air gap and decrease on the side of decreased air gap; thereby causing the rotor to reposition itself in the center of the magnetic field. By this means, a symmetrical air gap is maintained around the rotor. A more detailed explanation may be had with reference to FIG. 8 and the portion of the specification describing the microsyn subcomponent.

The (J)IRIG and the (SR)IRIG have torqueing signals coupled to their respective torque microsyns from analog section of the fire control block 1044 in the same manner as the (SV)IRIG. Transformer 1045 and electrical conductors 1046 and 1047 couple signals to the J block 1002. The (SR)IRIG also has torqueing signals connected to it via a transformer 1050 and electrical leads 1048 and 1049. These electrical leads pass through a cabling 1042 to connect to the input circuit of the IRIG.

The gimbal torque motors 1012, 1025, 1026, 1035 and 1036 are mechanically coupled to drive five resolvers located on the gimbal assembly in accordance with the signals received from their respective IRIG's. The interconnection of these resolvers with the gimbaling system is best shown in FIG. 5. The azimuth gimbal resolver 1054 has two electrical outputs. This resolver is located between the middle gimbal and the lower J accelerometer end of the azimuth gimbal and develops an electrical analog of the azimuth gimbal angle. Its output represents the sine and cosine of the relative angle between the R reference axis and the middle gimbal axis. The null position is represented by the R reference axis and the middle gimbal axis corresponding to each other. The outputs of the azimuth gimbal resolver are fed via electrical lines 1059 and 1060, 1061 and 1062, respectively, via cabling 1042 to the analog section of the fire control section 1044 which has positioned therein a resolver 1193. These outputs are used by the fire control for pre-launch and alignment procedures.

Two electrical leads 1072 and 1073, respectively, are coupled to take an output from the azimuth resolver 1054 either directly coupled or may be coupled through an isolation amplifier 1058 as shown. The isolation amplifier 1058 is of the type generally known to those skilled in the electronic arts. Outputs from isolation amplifier 1058 are coupled into roll yaw resolver 1057 via electrical leads 1074 and 1075, respectively. After launching, the sine output is resolved by the roll yaw resolver 1059 and coupled via and used by the missile flight control as the missile roll yaw added to reference.

The middle gimbal resolver 1055 is driven by middle gimbal torque motor 1025 in conjunction with the signals received from the (J)IRIG and (SR)IRIG units. The middle gimbal resolver 1055 has four outputs coupled via electrical leads 1063 and 1064, 1065 and 1066 via cable 1042 to a corresponding resolver 1194 in the analog fire control section 1044. The middle resolver is located between the outer and middle gimbals and is best shown with reference to functional FIG. 5. The middle gimbal resolver 1055 develops an electrical analog signal that is proportional to the middle gimbal angle. Its output represents the sine and cosine of the relative angle between the middle gimbal and the outer gimbal. The null position is represented by the middle gimbal being normal to the outer gimbal. The middle gimbal resolver outputs fed to the fire control 1055 are used in missile pre-launch and launching procedures. After launch, the sine output is coupled to the roll yaw resolver 1057 via electrical leads 1076 and 1077 and the sine output is resolved by the roll yaw resolver and used by the missile flight control as the missile roll yaw attitude reference.

The roll yaw resolver 1057 is coupled mechanically to outer gimbal torque motors 1035 and 1036 via pitch resolver 1056. The roll yaw resolver 1057 is located on the pitch gimbal axis opposite the porro prism mirror end and is best shown in functional FIG. 5. The electrical sine output of the middle gimbal resolver and the sine output of the azimuth gimbal resolver are applied to this resolver. The resolver resolves these inputs through the missile pitch angle to obtain the true missile roll and yaw coordinates for the flight control system. There are two outputs from the roll yaw resolver 1057. One of these is representative of the roll angle and the other is representative of the yaw angle. The roll angle signal is conducted via electrical leads 1084 and 1085 to amplifier 1088 via cabling 1071. The other signal out from the roll yaw resolver that is representative of the yaw angle is coupled to yaw amplifier 1087 via cabling 1071.

Pitch Resolver

The pitch resolver 1056 is mechanically driven by outer gimbal torque motors 1035 and 1036 in conjunction with electrical signals received from the gyro error resolver 1016 controlled by the output, from the (J)IRIG 1002 and the (SR)IRIG 1001. The pitch resolver 1056, best shown in functional FIG. 5, is located at the porro prism end of the outer gimbal axis. This resolver develops an electrical analog of the missile pitch angle. Its output represents the sine and cosine of the relative angle between the outer gimbal and the missile's longitudinal axis. The null position is represented by a vertical missile. A pitch resolver output is used by the fire control for pre-launch checkout and alignment procedures. There are two such outputs fed to the fire control section. The first is fed to fire control resolver 1195 via electrical leads 1067 and 1068 via cabling 1042. The second electrical output signal is fed to the resolver 1195 via electrical leads 1069 and 1070 via cable 1042. After launch, the first signal is coupled to a resolver 1086 via electrical leads 1080 and 1081 via cabling 1071. The other output is also coupled to resolver 1086 via electrical leads 1082 and 1083 via cabling 1071.

As pointed out above, the primary purpose of the inertial reference system is to hold the accelerometers in the particular orientations required by the guidance concept. To perform this, the inertial reference must not only be non-rotating, but also correctly oriented for acceleration measurement. This requires a process called erection and alignment, which orients the inertial reference.

The erection and alignment loops involve equipment external to the missile. This equipment is represented functionally in FIG. 14c as the analog section of the fire control 1044 and the digital section of the fire control 1044. The gimbal assembly is erected through special utilization of the accelerometers which are used for in-flight acceleration measurements. This technique will be further explained later. Generally, because of the particular accelerometer orientation required by the guidance concept (see FIG. 16), erection is complete when gravity induced accelerometer indications are; SR and SV indications equal an opposite, and J indication equals zero. The fire control system receives coded accelerometer outputs and develops signals which reposition the inertial reference until the required erection conditions exist.

Alignment is accomplished by the use of a specially accurate gimbal angle resolver 1016 which measures bearing when the guidance system is erected. The output of this resolver is matched to the output of a resolver in fire control which is set to the desired target bearing. Any discrepancy between the two resolver outputs constitutes a signal which is used to reposition the inertial reference until the required alignment condition is achieved. However, the alignment resolver is only capable of positioning the inertial reference with respect to the gimbal assembly. It is inevitable that the gimbal assembly, and the entire missile, will be misaligned with respect to the vehicle's inertial navigation system, which is the source of target-bearing information. Furthermore, this misalignment cannot be measured once and forgotten, because, during operation of the vehicle, flexure of its structure is sufficient to cause significant alignment errors. For this reason, an optical comparison system is used to measure the misalignment between the guidance gimbal assembly and the vehicle's inertial navigation system while the alignment process is underway, and to transmit an appropriate bearing correction to fire control. This optical system is known as the porro mirror and is further explained in a copending application to an Angular Alignment Error Measuring System, Ser. No. 220,926, filed Aug. 29, 1962.

Signals from the inertial reference system are also used for missile attitude control. Since the stabilized member is non-rotating, the angles which the gimbals must assume to maintain this condition will be an indication of missile attitude. The resolvers 1054, 1055, 1056 and 1057, respectively, mounted on the gimbal axes measures these gimbal angles and transmit proportional signals to the missile flight control subsystem. These signals are transmitted to pitch channel resolver 1086, yaw amplifier 1087 and roll amplifier 1088, respectively, via electrical leads 1080 and 1081, 1082 and 1083, 1084 and 1085, and 1078 and 1079, respectively.

With reference to FIG. 14, the action of the gyro error resolver 1016, located on the azimuth gimbal, resolves preamplified position error command from the (SR) and (J) gyros through the gimbal angle before applying these commands to the middle and outer gimbal servo amplifiers. It is necessary to do this during the erection process before launch, and also after missile launch, in order to stabilize the platform properly. It is apparent that the input sensitive axes of the (SR) and (J) IRIG's will change their positions relative to the middle and outer gimbal axes whenever the azimuth gimbal is repositioned in azimuth; for example, as in alignment.

At special azimuth gimbal positions, the (SR) gyro error signals will move only the middle gimbal and the (J) gyro error signals will move only the outer gimbal. And at other angular positions of the azimuth gimbal, the (SR)IRIG gyro error signals will only move the outer gimbal and the (J)IRIG error signal will move only the middle gimbal. At intermediate settings, in azimuth, as shown, components of the (SR) and (J)IRIG error signals along the middle gimbal axis are applied to the middle gimbal servo amplifier while components of the (J) and (SR)IRIG error signals along the outer gimbal axis are applied to the outer gimbal servo amplifier. Stabilization is obtained when these gyro error signals are nulled by the response of the outer and middle gimbals.

FIG. 6 shows a basic gimbal servo loop which corresponds to a single axis measurement. There are three gimbal servo loops in the instant guidance system; one for each gimbal. Angular displacement of the respective IRIG's about their sensitive axes causes them to generate electrical gyro error signals. These signals are boosted by the individual gyro preamplifiers, demodulators and power amplifiers to give output error signals which control the gimbal torque motor 307. The torque motor operates to restore the original gyro IRIG orientation, thus nulling the gyro error signals. The process, carried out about one axis by each servo loop, maintains the inner gimbal at whatever orientation the gyros may originally possess.

Repositioning of the gimbals is accomplished by signals applied to the IRIG gyros through their respective fire control circuits which causes them to generate error signals. These error signals act through the servo loops in the normal manner, and the torque motors move the gimbals and the gyros to reduce the error signal to zero.

Acceleration Measurement

With reference to FIG. 13, there is shown two accelerator blocks, PIGA 1259 and PIPA 1258, respectively, positioned on the stabilized member 1256. It should be noted that FIG. 13 only represents a very simplified functional diagram of the guidance instrumentation and is used merely to clarify FIGS. 14a-d with respect to the interconnections of the various subcomponents of the overall system. The PIPA 1258 has a feedback loop, designated as the PIPA loop. This loop conducts an output from the PIPA 1258 and electrically couples this output back to the PIPA via electronics block 1261. Outputs, from the PIPA, which are representative of velocity increments, are electrically coupled to the guidance computer 1251. The other accelerometer system, the PIGA 1259, is also positioned on the stable platform 1256. This sybsystem also has a feedback loop, designated as PIGA loop, which couples an output from the PIGA 1259 back to the PIGA 1259 via an electronics functional block 1260. The signal output from the PIGA 1259, which is representative of velocity increments, is electrically coupled to transmit these signals to the guidance computer 1251.

Referring again to FIG. 14, there is shown in the preferred embodiment of the system; three accelerometers positioned along the three guidance axes X or (SR), Y or (J) and Z or (SV), respectively. The acceleration measurement subsystem is part of the missile steering guidance loop, and as pointed out above, acceleration measurements are the basis of the Q guidance computations which lead to the steering commands. The steering commands represent angular increments that modify the pitch and yaw angles which the attitude control loops cause the missile to assume. Thus, missile steering is accomplished through modifying the null conditions of the attitude control loop, and the missile steering guidance loop is controlled by the input of predetermined Q guidance quantities from fire control which occurs before missile launching.

The acceleration measurement subsystem in the preferred embodiment has one accelerometer sensitive along each of the X or (SR), Z or (SV) and Y or (J) axes, respectively. Two types of accelerometers are used; the pendulous integrating gyro accelerometer, hereinafter referred to as PIGA and the pulse integrating pendulum accelerometer, hereinafter referred to as PIPA.

In the preferred system, shown by FIGS. 14a–d, a PIGA is positioned so that it measures the velocity increments along the (SR) axis while two PIPA's are used to measure the velocity increments along the (J) and (SV) axes. The two types of accelerometers are of the integrating types, otherwise known as velocity meters, and they yield information in the form of discreet velocity increments. Both of these types of accelerometers as to operation and structural details were explained above under their respective subheadings.

Now looking again at FIGS. 14a–d, the PIGA may be traced from (SR)PIG functional block 1139. This unit, shown in greater detail in FIG. 9, produces an electrical signal output from its signal generator side which is coupled to an input on preamplifier 1145. The output of the preamplifier is coupled to a demodulator stage 1147 via electrical lead 1146, and the output signal from the demodulator is electrically coupled to the input of servo power amplifier 1148. Servo amplifier has two outputs; one positive and the other negative. The positive output is coupled by means of an electrical conductor 1149 to the wheel 1140. The negative side of the servo amplifier output is coupled to the wheel 1140 via electrical lead 1150. The gyro wheel 1140 is mechanically coupled to wheel 1141 to cause it to rotate as the error signal turns the unit of the PIG and energizes an encoder circuit 1142. The output of the encoder is coupled to the guidance computer 1124 by means of electrical conductors 1143 and 1144, respectively. This accelerometer operates to sense accelerations along the (SR) axis and to transmit these accelerations as velocity increments to the guidance computer 1124. An additional input is coupled from the fire control section 1044 to the torque generator side of the PIG unit via transformer 1051 and electrical leads 1052 and 1053. The function of this signal, labeled PIGA dither signal, is to prevent the gyro unit from sticking by transmitting an electrical signal to the torque generator to cause the PIG unit to rotate in a haphazard manner.

The other two accelerometer axes, the (SV) and (J) axes, have a PIPA unit to measure accelerations along their respective axes. Referring to FIG. 14a, there is shown a functional block diagram of the pulse integrating pendulum accelerometer, or PIPA, subsystem tied into the overall guidance system. The basic PIP unit for the (J) axis is represented as block 1151. On one side of the PIP unit is the torque generator section and on the other is a signal generator section. The PIP unit's construction and operation is best shown and described under the subsystem under this section. The output of the signal generator is electrically coupled to preamplifier 1167 by means of electrical lead 1168. The PIP preamplifier 1167 merely amplifies the signal generator output and then couples it to the signal generator amplifier 1165 via electrical lead 1166. The primary function of block 1165 is to amplify and filter the PIP signal generator microsyn signal. In addition, circuitry is included to provide an accurately regulated voltage supply for the rest of the PIPA electronic subsystems. The output of the amplifier 1165 is electrically coupled to the interrogator circuit 1163 by means of lead 1164. The circuitry of this submodule performs several functions. Note that two other inputs are fed to the interrogator circuit 1163. One of these inputs comes from the signal generator excitation amplifier and filter 1159 and is coupled to the interrogator 1163 by means of lead 1161. The other input is coupled to electrically receive clock pulses from the guidance computer subsystem 1124. The clock pulses are transmitted to the interrogator 1163 by means of lead 1162. The first stages of the interrogator circuit form a highly non-linear amplifier which squares off the signals received from the amplifier 1165. The resultant square wave is sampled at a predetermined rate and is time compared with that of the clock pulses received from the computer subsystem 1124. If the square wave signal is positive when sampled (in phase with reference), a pulse is generated on the positive torque command line 1169; otherwise a pulse is generated on the negative torque command line 1170. The two torque command signals positive and negative, respectively, are conducted over leads 1169 and 1170 to torque generator switch 1155. The torque generator current switch drives the PIP torque generator according to the incoming torque command pulses. These pulses are fed to the torque generator section of block 1151 by means of the two leads 1156 and 1157. The current which drives the microsyn torque generator is fed through, and is regulated by, a feedback loop consisting of lead 1152 DC constant current, block 1153 and lead 1154. This feedback loop permits the adjustment of the PIP torqueing current and thus controls the PIP scale factor. The DC servo loop formed is called the PIPA constant current loop. Clock pulses from a signal generator in guidance computer 1124 are fed to the signal generator section of the PIP unit via signal generator excitation amplifier and filter 1159 via lead 1160. Output from the signal generator excitation amplifier and filter block 1159 is coupled to signal generator microsyn in block 1151 by means of electrical lead 1158. The acceleration indicating output is fed from the torque generator current switch via line 1171 to the guidance computer subsystem block 1124. The acceleration output is a square wave signal which indicates the torque mode existing at any time by the PIPA. A more detailed description of the operation and structural form of the sub-modules in the PIPA subsystem may be had with reference to the portion of the specification dealing with this subsystem.

The (SV)PIPA is interconnected to the guidance system in substantially the same way as the (J)PIPA. Shown in FIGS. 14a–d is block 1172 which represents the PIP section and the signal generator and torque sections, respectively. Electrically coupled to receive clock pulses via lead 1181 from the computer subsystem 1124 is the signal generator excitation amplifier and filter 1180. An output lead 1179 couples a signal from the signal generator 1188 via lead 1179 to the input of the signal generator side of PIP block 1172. The output signals from the signal generator are coupled to preamplifier 1190 via electrical lead 1191. The amplified output from preamplifier 1190 is fed to amplifier and voltage regulator block 1188 via lead 1189. An output is taken from amplifier and voltage regulator 1188 and is coupled to interrogator circuit 1184 by means of lead 1187. Two other inputs are fed to the interrogator circuit 1184. One of these electrically couples clock pulses from the computer subsystem 1124 via electrical lead 1183 to interrogator block 1184. The other input is coupled from signal generator excitation amplifier and filter block 1188 via electrical lead 1182 to the input of interrogator 1184. The interrogator has two outputs positive and negative, respectively. These outputs are electrically coupled to torque generator current switch 1178 by means of leads 1185 and 1186, respectively. Outputs are taken from the torque generator switch 1178 and fed to the torque generator section of the PIP block 1172 by means of leads 1176 and 1177, respectively. A DC constant current loop is fed back to the torque generator current switch 1178 by means of lead 1173, DC constant current network 1174 and lead 1175. The acceleration indication signal output is fed from the torque generator current switch 1178 to the guidance computer subsystem 1124 by means of electrical lead 1192.

Referring again to FIG. 13 with respect to the guidance computer 1251 and fire control block 1250, initial conditions for the guidance computer are coupled from the fire control 1250 to the guidance computer 1251. These initial conditions are stored in the computer and they are continuously checked by the fire control until missile launch, in order to ascertain that the correct initial values of Q's, SKU constant and Vg's (velocity-to-be-gained) are stored in the computer at launch. The fire control functional block 1250, as shown, has an input from functional block 1265 (vehicle inertial navigation system). This input to the fire control is necessary, since the effects of the vehicle's motion which carries the missile must be considered at time of launch. At time of launch, the vehicle has both angular and linear velocities. The angular velocities are caused by the vehicle's roll, pitch and yaw while the linear velocities may be caused by the vehicle's speed, heave and sway. All of these velocities are continuously measured by the vehicle's inertial navigation system and are converted into fire control velocity vectors at launch. Thus, corrections are made to the initial values of velocity-to-be-gained, Vgxo, Vgyo and Vgzo by taking into account the effects of the vehicle's, motion vectors along each of the velocity-to-be-gained axes.

Referring now to FIG. 14a with respect to digital section of fire control subsystem 1044, there is shown a number of inputs from this subsystem that are fed to the guidance computer subsystem 1124. There are nine signals received by the guidance computer subsystem 1124 from the fire control subsystem 1044. Each of these inputs are received by circuitry that pulse, shape and convert the fire control signals into computer logic pulses. Five of these inputs are common to many computer systems while the other four inputs are signals which are used in the guidance computations. The first five signal inputs are the SC, T0, ED, SYNC and simulated acceleration pulses, respectively. The SC signal (start computation) and the T0 (time zero) signals when received by the guidance computer from the fire control system prevent any further information inputs from the fire control to enter the computer logic.

The ED (erase signal) which is issued from the fire control causes any information stored in the computer to be shifted out. Thus, this signal is used to clear the computer subsystem.

Simulated acceleration pulses for the X, Y and Z axes are coupled from the digital fire control subsystem 1044 to the guidance computer 1124. The simulated acceleration signals are programmed into the computer to be used to check the operation of the entire missile subsystem under simulated flight conditions, thus providing a means to check out the missile guidance system whenever the missile is still in its launching tube.

The SYNC pulses from the fire control are coupled to the computer so that these pulses may be compared to the pulses generated by the computer clock circuitry. If a difference of frequency exists, the clock oscillator, in the computer will be changed to correspond to the frequency in the fire control system. Thus, the guidance computer clock and the fire control clock are always in synchronization with one another.

The other signals which are used in the guidance computation are: two Q quantities and one SKU quantity. These signals are programmed into the computer from fire control. These signals are the Qsr (Qxx) and the Qjsr (Qyx) quantities. These two Q quantities are Q's which are not generated within the computer subsystem.

The Vg's fed from the digital section of the fire control subsystem to the guidance computer 1124 are velocity-to-be-gained terms. These velocity-to-be-gained terms are along the three acceleration axes and are continually changed in accordance with the initial vehicle's motion.

Also coupled to the guidance computer 1124 from the digital fire control system 1044 are signals representative of $\Delta\theta$ and $\Delta\mu$. These signals are used in checking out the computer subsystem section which functions to generate the yaw and pitch steering command outputs.

Thus, it can be seen that the primary function of the guidance computer is to cause the missile to fly such a trajectory that, at cutoff, it will have a velocity which will permit the warhead to free-fall to the pre-selected target. The guidance computer subsystem 11124 combines into one unit all the electronic logic circuitry needed for velocity-to-be-gained computations and other vital guidance functions. Before a missile flight, trajectory data is computed by the fire control unit, then read in or transmitted in digital form through an umbilical cable to the missile and finally to the guidance computer. Here the data is stored and acknowledged by being sent back to fire control 1044 for comparison. This programming, which is subject to constant revision by the fire control subsystem 1044, establishes the initial condition; namely, the velocities-to-be-gained (Vg's), the Q quantities and the value of SKU for a particular launch and target point combination. After missile launching, actual in-flight acceleration and performance data are obtained from the acceleration units and are processed within the guidance computer. The guidance computer of the instant invention is capable of receiving and storing the necessary predetermined geoballistic information for the guidance trajectory and pre-selected target. It combines this information with missile velocity changes, acceleration pulses from the acceleration units along the (SR), (J) and (SV) axes, respectively, in a fashion which is dictated by the guidance equations (53), (54) and (55).

Another function of the computer is to produce steering commands in accordance with the solution of the guidance equations in order to produce the desired missile trajectory.

Figure 14B:
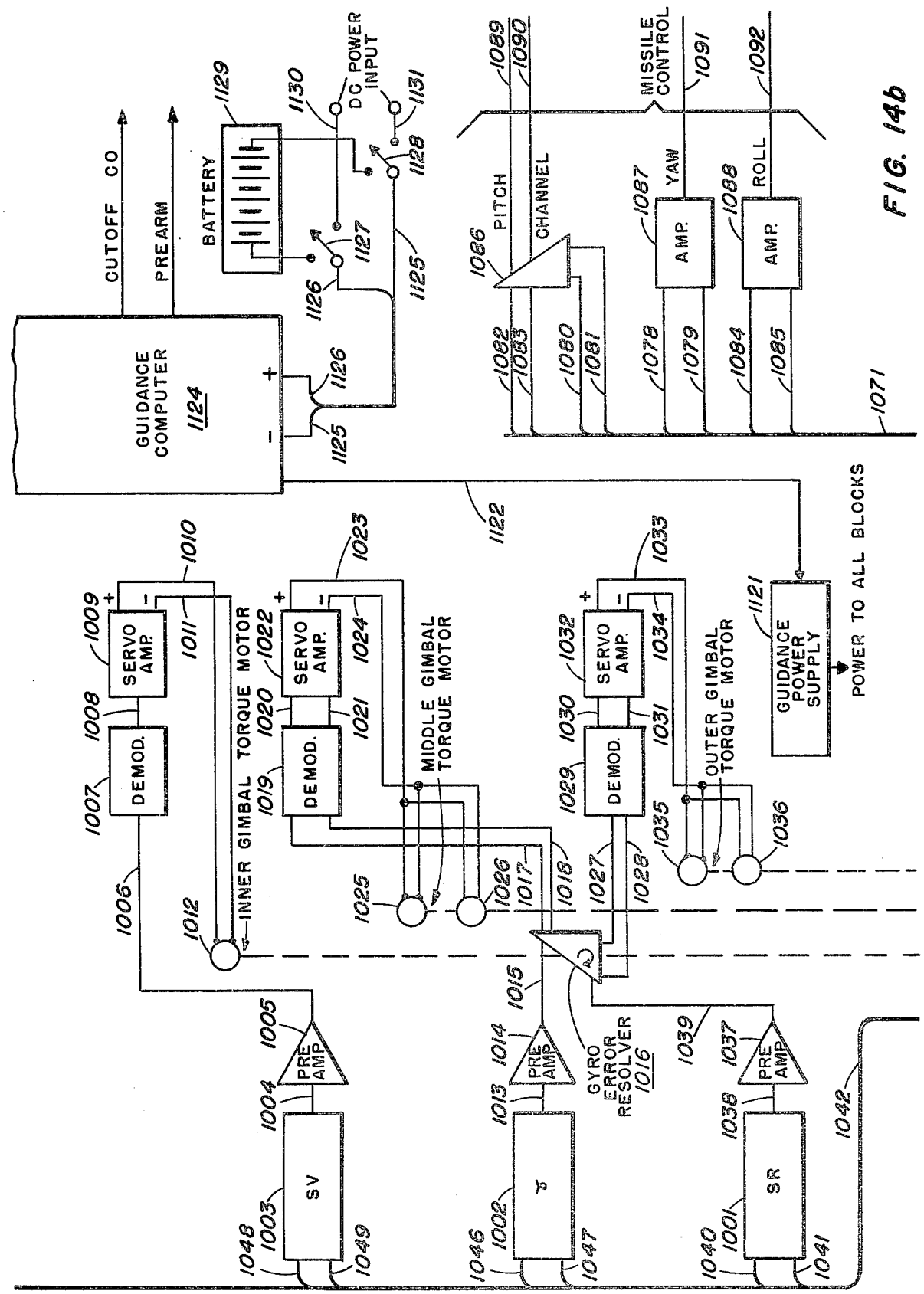
Figure 14C:
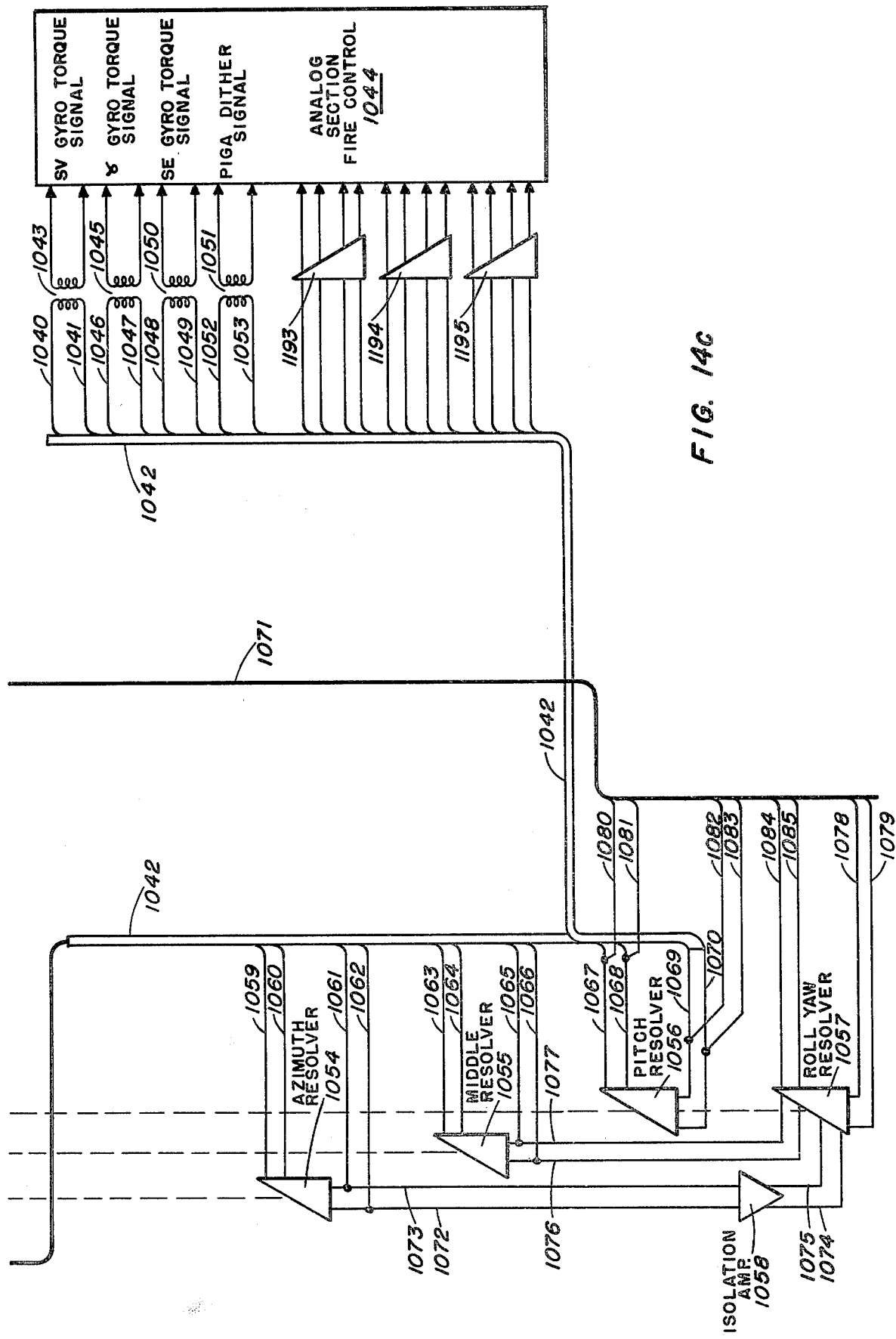
Figure 14D:
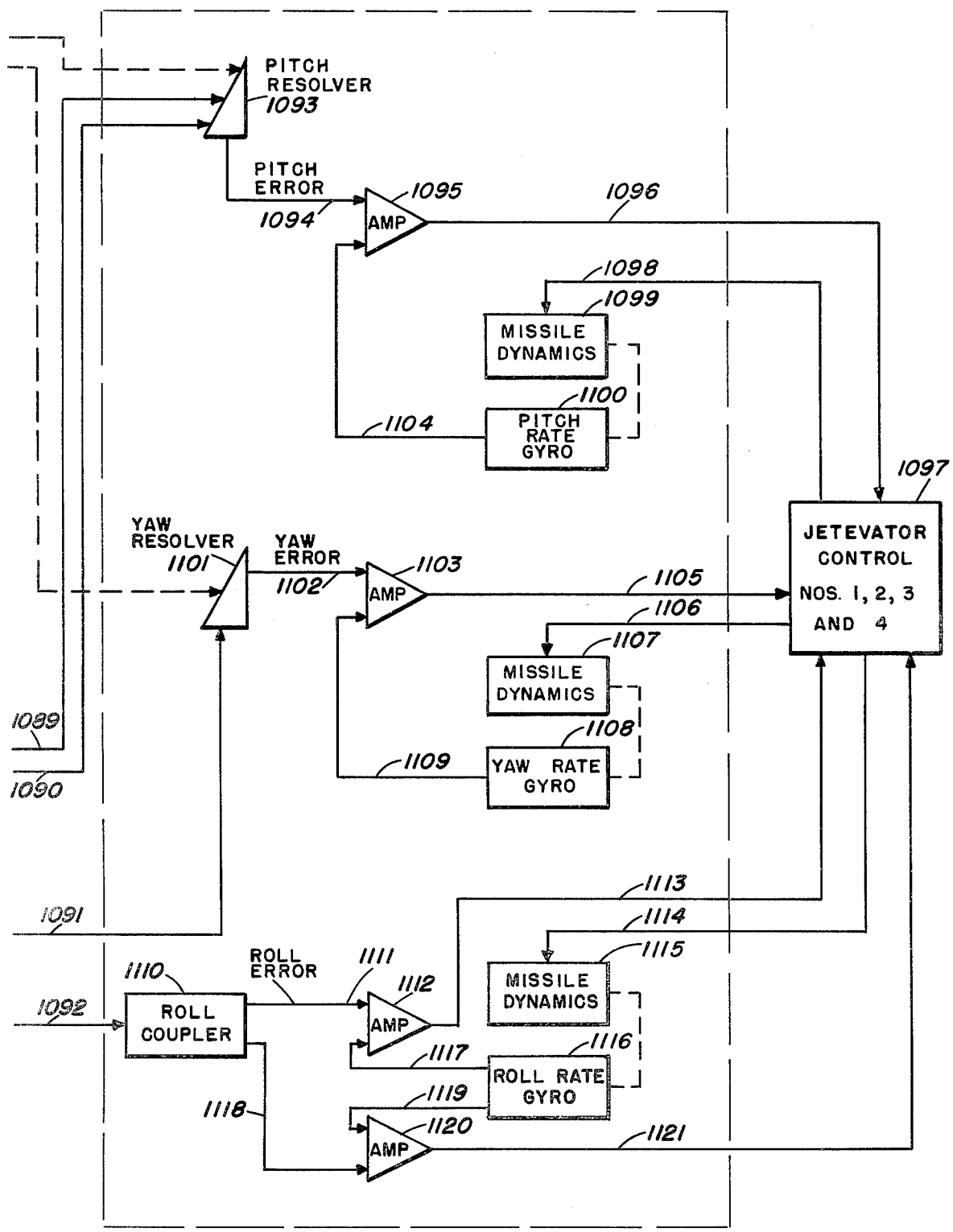

This combined information is transmitted from the guidance computer 1124 to the autopilot section via pitch stepper motor 1137 and yaw stepper motor 1132. Once the missile velocity has very nearly reached the predetermined correlated velocity, a safe-to-arm signal, called pre-arm, PA, is generated. This signal is used to arm the warhead. Thus, if any part of the missile malfunctions so that the conditions for PA are not satisfied, the warhead cannot be armed. The pre-arm signal is generated in the guidance computer 1124 and transmitted via an electrical lead to the pre-arm circuitry (not shown). This is best shown in FIG. 14*b*. Another signal which is generated by the guidance computer upon reaching a predetermined condition is the cutoff or CO signal. The guidance computer issues a thrust termination command whenever the missile has obtained a velocity which will enable the warhead to impact at a specific target by falling in a ballistic path from the point of cutoff. The cutoff circuitry is activated via a cutoff circuit from the guidance computer 1124. The cutoff circuitry forms no part of the instant invention and is not shown.

Autopilot

With reference to FIG. 13, there is shown a simplified schematic of a function block diagram of the flight control servo loops. The guidance computer 1251 feeds yaw and pitch command signals to flight control unit 1252. The flight control unit has two feedback loops. One loop may be traced from flight control output to missile dynamics functional block 1253, missile structure block 1254 and finally back to the flight control functional block 1252. This signal is referred to as the rate gyro feedback signal. Generally, the function of the rate gyro feedback loop is to prevent the missile from maneuvering too quickly to its commanded position. This action is accomplished by providing rate gyro in each of the command loops; roll, pitch and yaw. These rate gyros introduce damping signals in the missile flight control subsystem that attenuate very high frequency signals to the thrust vector controls, thus preventing erratic missile control and providing smooth missile flight maneuvering.

The other loop (stabilization) accepts information from the missile structure functional block 1254 and transmits this information to the gimbal assembly 1255. An output from the gimbal assembly (resolver signals) is fed back to the flight control block 1252. Generally, it is the function of the stabilization loop to stabilize the missile against external disturbances as referred to the stable platform. As explained above, this function is accomplished through missile attitude feedback that is part of the missile command loop. Control signals generated in the feedback path correct missile yaw and pitch angles, if they should be perturbed to angles other than those commanded by the computer functional block 1251. Missile control in roll is always via this stabilization loop because the commanded roll is always zero. Any roll angle detected by the resolvers in the gimbal assembly is nulled by control of the missile attitude.

The pitch steering signals from the computer are fed to pitch stepper motor 1137 or to a counter and digital-to-analog converter (not shown) via electrical lines 1136 and 1135, respectively. These lines carry positive and negative pitch command signals which cause the pitch stepper motor to rotate. The pitch stepper motor 1137 is mechanically coupled to pitch resolver 1093 to cause an input that is representative of the magnitude of pitch stepper motor rotation. Signals coming from the pitch resolver on the gimbal are taken off of resolver 1086 and electrically coupled to pitch resolver 1093 via electrical leads 1089 and 1090, respectively. These signals are combined by pitch resolver 1093 and, the output from the resolver 1093 is electrically coupled to amplifier 1095 via lead 1094. The amplifier amplifies the pitch error signal and is coupled to the jetevator control block 1097 via electrical lead 1096. A feedback loop from jetevator 1097 feeds back a signal to missile dynamic block 1099 via lead 1098. The missile dynamics block 1099 is mechanically coupled to pitch rate gyro 1100, and the pitch rate gyro output is electrically coupled to amplifier 1095 via lead 1104. The pitch rate gyro functional block 1100, shown in FIG. 14*d*, supplies an output signal which is used for dampening missile motion about the pitch axis. The rate gyro consists of a gyroscopic wheel mounted on a spring restrained gimbal (not shown). Three of these rate gyros are used to measure turning rate about each missile axis; yaw, pitch and roll. Generally, the rate gyro operates in such a manner that when a turning rate is applied about the gyro input axis, the gyro will percuss and apply a force to a spring restraint which is proportional to the input turning rate. The spring applies a restraining force proportional to the distance it is stretched. Therefore, a given precessional torque, corresponding to a given input turning rate, rotates the gimbal through a given angle. An electrical pickoff is arranged to produce an output signal, which amplitude is proportional to this angle. This output signal is fed to the input of amplifier 1095 via lead 1104. Rate gyros of this type are well-known in the art, and a more detailed description may be had with reference to the gyroscopic arts.

The yaw steering signals are fed to the yaw stepper motor 1132 or to a counter and digital-to-analog converter (not shown) via lines 1133 and 1134, respectively. The plus and minus yaw signal increments are obtained from the guidance computer system 1124. The yaw stepper motor is mechanically coupled to drive the yaw resolver 1101 in proportion to the yaw signals received. Electrical signals from the gimbal resolvers are transmitted from amplifier 1087 to yaw resolver 1101 via lead 1091. The combining of the input signals to the resolver with mechanical movement of the yaw resolver 1101 gives a resultant output yaw error signal which is fed into amplifier 1103 via lead 1102. The output of amplifier 1103 is fed to jetevator control block 1097 via lead 1105. An output from jetevator control block 1097 is fed back to the input of amplifier 1103 via a feedback loop consisting of lead 1106. Missile dynamic block 1107 is mechanically coupled to yaw rate gyro 1108. Electrical lead 1109 couples the output of the yaw rate gyro to the amplifier 1103. This loop operates in a similar manner to the pitch error loop, as explained above. Roll signals are taken from the gimbal resolver 1057 via amplifier 1088 and electrically coupled to roll coupler circuitry 1110 via lead 1092. The output of the roll coupler circuit 1110 feeds both amplifier 1112 and amplifier 1120. Amplifier 1112 couples the roll error signal to amplifier 1112 via line 1111. The output of amplifier 1112 is coupled to jetevator control block 1097 via lead 1113. A feedback network from jetevator control block 1097 couples the jetevator control block to the input of amplifier 1112 by means of lead 1114, missile dynamics block 1115, roll rate gyro block 1116 and lead 1117. The output taken from the roll resolver is fed to amplifier 1120, and is coupled to this amplifier via lead 1118. The output of amplifier 1120 is electrically coupled to jetevator control via line 1121. A feedback loop is established from the jetevator control block 1097 to the input of amplifier 1120 by means of lead 1114, to missile dynamics block 1115, to roll rate gyro block 1116 and to lead 1119.

Figure 15:
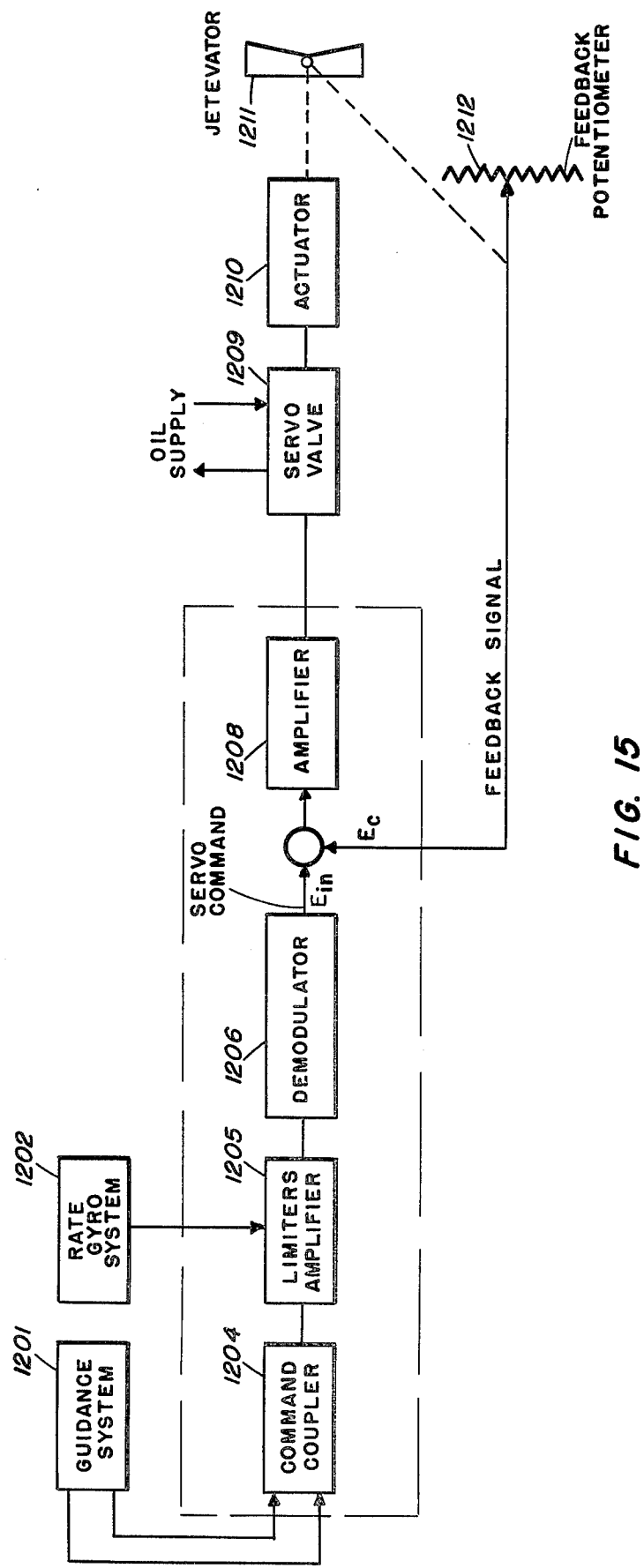
FIG. 15 represents a functional block diagram of the jetevator feedback system.

With reference to FIG. 15, there is shown an overall functional block diagram of the guidance system and rate gyro system as tied into the jetevator control. Signal pulses proportional to missile deviation about its yaw, pitch and roll axes are coupled from the guidance system 1201 to the input side of the command coupler 1204. A resolver not shown in the command coupler 1204 receives these pulses and produces an electrical output signal, which amplitude is proportional to the net difference between the number of forward pulses and the number of reverse pulses received at the input. For example, if one hundred forward pulses and ninety-five reverse pulses have entered the coupler up to a given time, the resolver would produce an output signal, which amplitude corresponds to a change in missile attitude, and this change would correspond to a predetermined number of milliradians with respect to the pulses.

The command coupler resolver output is applied to limiter and amplifier circuits 1205. These circuits mix the resolver output signal and the turning rate signals from the rate gyro system 1202 which is also fed to the limiter. Mixing of these two signals allows the missile to correct large errors at a constant rate. This action prevents the missile from approaching the commanded position with such momentum that the jetevators cannot stop each rotational motion without considerable overshoot and possible instability. As the missile changes its position, the rate signals oppose the deviation signals, therefore, when the rate and deviation signals are equal, the jetevator command signal is zero, the jetevators are no longer accelerating the missile about its axis, and the turning rate remains constant.

After the mixing of the two signals, the resultant signal is fed to the demodulator 1206, where it is converted into its equivalent DC signal for use by an electro-hydraulic servo system. The servo amplifier 1208 receives the equivalent DC signal from the demodulator, herein represented as (Ein), when there is no error, the input signal Ein and the feedback signal, herein represented as (Ec), are equal, the difference between them is zero, the actuator 1210 is not moving and the servo system is at rest. When the input and feedback signals are not equal, an error exists. The servo amplifier 1208 computes the difference between this input signal and the feedback signal to obtain the differential error signal Ec. This error signal Ec is amplified and applied to operate the servo valve 1209. The servo valve 1209 opens an amount proportional to this differential signal Ec, permitting hydraulic fluid to flow from the oil supply (not shown) to the actuator unit 1201, which is mechanically coupled to operate the jetevator 1211. A feedback potentiometer 1212 mechanically linked to the jetevator produces the output signal EC that is fed back through the input to servo amplifier 1208. When this feedback signal equals the input signal, the error becomes zero, and pressure differential no longer exists to cause actuator motion, the servo system comes to rest. Thus, when the jetevators are commanded, they will move to the position commanded and will deflect the exhaust gases in such a way as to bring the missile back to its prescribed flight path.

Jetevators

Figure 18A:
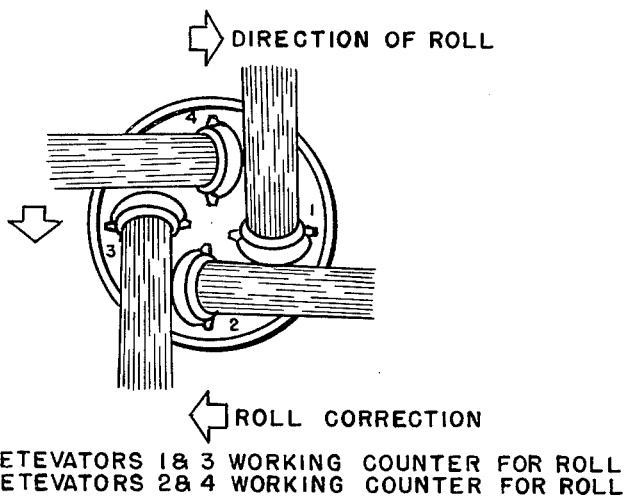
FIGS. 18a through 18b illustrate jetevator operation.
Figure 18B:
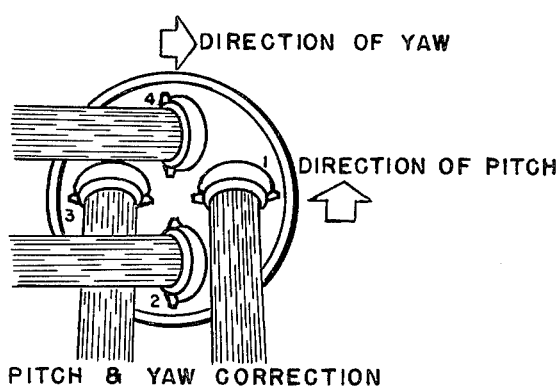

The jetevators are constructed to deflect the motor gases in such a way that the resultant change in missile attitude compensates for any deviation and maintains the missile on the desired flight path. Each motor contains four jetevators mounted concentrically with the motor exhaust nozzle (see FIG. 18). The jetevators receive motive power proportional to the error signal Ec generated, as explained above. The jetevator is mechanically moved by the actuator unit and, as a result, the jetevators deflect the rocket exhaust and change its direction in a plane tangential to the missile body. In this manner, the thrust vector of each nozzle is varied in a direction to control missile movements about any of its three axes as follows (see FIG. 18): jetevators 2 and 4 work in coordination for yaw correction; jetevators 1 and 3 work in coordination for pitch correction; and all four jetevators work in pairs; 1 and 3, and 2 and 4 counter to each other for roll correction.

Figure 19A:
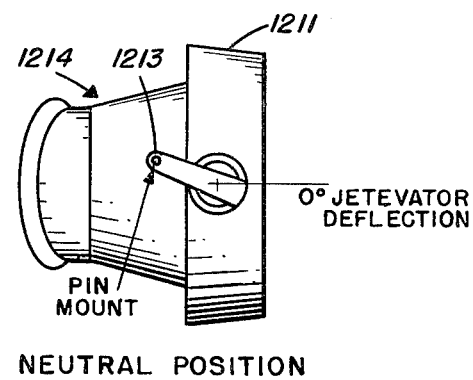
FIGS. 19a through 19b show jetevator deflection positions.
Figure 19B:
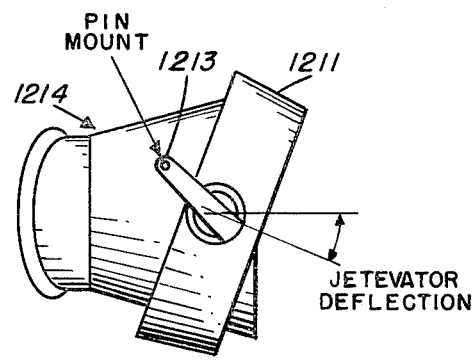

With reference to FIG. 19, there is shown a typical functional drawing of a jetevator unit. Each jetevator is mounted on the rocket exhaust nozzle unit 1214 and consists of a ring assembly 1211 and an actuator arm 1213. The principle element of the unit is the ring assembly 1211 which is supported by a pin mount (not numbered) attached to the spherical section of the motor exhaust nozzle 1214. This ring can be rotated about its pin mount a predetermined number of degrees into either side of the exhaust stream to change the direction of flight of the missile. Other techniques may be used to guide the missile in place of the jetevator technique if desired. For example, the guidance system described may use rotatable nozzles and fluid injection or any other suitable means familiar to those in the missile guidance art.

The power supplied to the various sub-modules of the system may be best seen with reference to FIG. 14b. Whenever the missile is in its launching tube, a separate DC source is used to power the sub-modules of the system. DC power from the fire control is transmitted to the computer block 1124 via positive and negative polarity input terminals. The positive line may be traced through lead 1130, switch 1127 and lead 1126 to the guidance computer 1124. The negative side of the DC source travels via lead 1131, switch 1128 and lead 1125 to computer 1124. The DC voltage is converted to an AC signal in the computer and electrically coupled to the guidance power supply 1121. Leads (not shown) from this block electrically couple the proper AC and DC voltages to the various sub-modules.

The guidance system, once the missile is launched and immediately before missile launch, must have its own self-contained power source. This is accomplished by switching the battery 1129 into the guidance power circuit by switches 1127 and 1128. Once this is done, the missile operates its own power system throughout missile trajectory.

The remaining blocks of the simplified block diagram of the guidance instrumentation of FIG. 13 are the porro mirror functional block 1264 and the optical comparison system 1263. The porro mirror functional block 1264 is mechanically coupled to move with the gimbal assembly 1255. A functional drawing of this may be seen with reference to FIG. 5. An output from the porro mirror functional block 1264 is coupled to the optical comparison system functional block 1263. Also coupled from the vehicle's inertial navigation system functional block 1265 is another output which is coupled to the optical comparison system 1263. Both of these outputs are light outputs and they are compared within the optical comparison system, and an electrical output representative of the error between the two light signals is coupled to the fire control functional block 1250. This optical subsystem is necessary in the alignment process. Alignment is the process whereby the R axis (see FIG. 16) of the stabilized member is made coincident with the azimuth bearing required for a particular missile objective. The alignment process is accomplished by the positioning of the stabilized member about the azimuth axis by reference to the resolver in the gimbal assembly. If the zero reference for missile bearing and the zero reference for the vehicle were aligned, the optical comparison system would be unnecessary. However, the guidance zero reference line and the vehicle's center line are usually not aligned, nor can their exact angular relationship be predetermined by vehicle and missile structure analysis. In order to obtain an accurate measure of the vehicle's and guidance system's reference line alignments, an optical comparison system such as that shown in FIG. 13 is employed so that the angular difference between the guidance system porro mirror axis and the vehicle inertial navigation system reference axis is obtained. The optical comparison system 1263 determines the angular deviation between the two reference lines and transmits an electrical correction to the relative missile bearing which is fed to the fire control from the vehicle inertial navigation system functional block 1265.

As pointed out above, the optical comparison system functional block 1263, the porro mirror functional block 1264 and the vehicle inertial navigation system functional block 1265 form no part of this invention and their function in conjunction with the guidance instrumentation system was only explained insofar as was necessary for a complete understanding of the instant invention.

In operation, the missile of the preferred embodiment usually takes the form of a two-stage solid fueled missile capable of being launched from a submerged launching site or from submerged vehicles. The inertial guidance system which steers the missile to its predetermined target utilizes the Q guidance concept explained previously. Before missile launching, the guidance system operates in conjunction with extensive electronic equipment called the fire control subsystem block 1250 (FIG. 13) which is designed to "set up" the guidance system for the particular missile objective.

To ready a missile for flight, three operations must be performed by fire control prior to missile launching. These are enumerated as:

1. The inertially stabilized platform, on which the accelerometers are mounted, is erected to the local vertical of the launching site or launching point.
2. The inertially stabilized platform is aligned with the firing bearing.
3. The guidance computer is programmed with the necessary data which will enable the guidance computer to guide the missile along a trajectory so that the missile will arrive at the impact point at the same time as the target.

If the missile is to be launched from a submerged vehicle, it is necessary to have an inertially referenced navigation system such as vehicle inertial navigation system 1265 (FIG. 13) in order to measure and supply the ship's latitude, vehicle's longitude, vehicle's heading and vehicle's motion to aid the fire control in performing the above functions.

As pointed out previously, the missile is launched from a known point on the surface of the earth and travels to a predetermined fixed target on the earth's surface. The geoballistic data programmed into the guidance computer 1251 is precalculated for each launch point-target point combination. This information may be stored on a card or by other suitable means. Thus, it can be seen that if the vehicle is traveling on the surface of the earth, it is possible to have it launch missiles from any point on the surface which is a known launch point. Therefore, data may be prepared as needed for each predetermined launch position. This is necessary because of the differences in range, latitude and firing azimuth for each particular launch point and its corresponding target.

In summary then, except for the vehicle's motion vectors, all the factors present in the missile's ballistic problem may be precalculated and most of the required data for programming the computer could be prepared and stored on a geoballistic card, except for the vehicle's motion vectors, which are not predictable and, therefore, their effects must be continuously computed and applied as corrections to the velocity-to-be-gained values up to the instant of firing.

As pointed out above, essential to any inertial guidance system is the establishment and subsequent maintenance of a non-rotating attitude reference for the accelerometers. The guidance system of the instant invention, as shown in FIG. 13 and FIGS. 14$a$–$d$, uses a gimbal supported gyro stabilized component called the stabilized member 1256, FIG. 13, to which the accelerometers 1259 and 1258, respectively, are rigidly attached. As the missile rests in the launching tube of the cruising vehicle, the stabilized member 1256 and the sensitive axes of the accelerometers 1259 and 1258, respectively, which are mounted thereon, will have assumed some haphazard orientation. Before launching the missile, the fire control system 1250 must set the accelerometer axes to the particular orientation required by the guidance concept. This is accomplished by maintaining the stabilized member 1256 in a spaced-fixed reference orientation by three IRIG servo loops. Mounted on the stabilized member are three inertial reference integrating gyros 1257 which respond to angular displacement. The gyro indications are used to develop control signals that drive torque motors acting upon the gimbal system, and thereby maintain the initial gyro orientations. Thus, at all times, the stabilized member 1256 serves as an inertial space reference for the accelerometer axes and the missile axes.

The process which orients the stable member 1256 and thereby orients the accelerometers mounted thereon with respect to the launching vertical, launching horizontal, and J, SR and SV axes is called the erection process. The guidance gimbal assembly is erected through special utilization of the same accelerometers which are used for in-flight acceleration measurements. Because of the particular accelerometer orientations required by the guidance concept, erection will be complete when gravity-induced accelerometer indications are transmitted to the fire control as follows: SR and SV accelerometer indications equal and opposite, and J accelerometer indication zero. The fire control system receives these coded accelerometer outputs and develops signals which reposition the inertial reference until the required erection conditions exist.

The second of the three essential operations enumerated above which must be performed by fire control prior to launch is the alignment process. Alignment is accomplished by the use of a specially accurate gimbal angle resolver 1054, see FIGS. 14*a–d,* which measures the bearing whenever the guidance system is erected. The output of this resolver may be traced by leads 1059 and 1060, 1061 and 1062 to the resolver 1193 in the analog section of the fire control subsystem 1044. The output of the resolver 1054 is matched to the output of resolver 1193 in the fire control subsystem 1044. The resolver 1093 is set to the desired target bearing and any discrepancy between the two resolver outputs constitutes a signal which is used to reposition the inertial reference until the required alignment condition is achieved. However, the alignment resolver 1054 is only capable of positioning the inertial reference with respect to the gimbal assembly. It is inevitable that the gimbal assembly, and the entire missile, will be misaligned with respect to the vehicle's inertial navigation system functional block 1265 which is best shown in FIG. 13, which is the source of target bearing information. Furthermore, this misalignment cannot be measured once and for all, because, during operation of the vehicle, flexure of its structure is sufficient to cause significant alignment errors. For this reason, an optical comparison system consisting of porro mirror 1264 and an optical comparison subsystem functional block 1263 are used to measure the misalignment between the guidance gimbal assembly and the vehicle inertial navigation system while the alignment process is underway, and to transmit an appropriate bearing correction to fire control.

In summary then, it can be seen that the alignment process aims the missile in its launching tube by orienting the SR-SV or X-Z plane with respect to the R reference axis target bearing. Reference may be had to FIG. 16 which shows the R-V reference plane and the X or SR, SV or Z, and J or Y accelerometer axes with respect to these planes.

The final action of the fire control system 1250, as enumerated above as operation number 3, is to supply the guidance system computer 1251 with those Q guidance quantities which are not generated within the computer itself. These quantities may be best seen with reference to FIG. 14*a* and they are the Qsr, Qjsr, velocities-to-be-gained Vg's, and the SKU terms. It is necessary to feed these quantities into the guidance computer 1124, since they are the most sensitive quantities with respect to the change in the predetermined launching position. In other words, these quantities affect the accuracy of the missile flight, and they must be changed whenever a new missile launching point is to be used. The velocities-to-be-gained, along the respective accelerometer axes, are continually modified up until missile launching. according to the velocities imparted to the missile in its launching tube by motion of the vehicle as it is underway. This process was explained in detail above but, briefly, it is the process of detecting the vehicle's motion by means of the vehicle's inertial navigation system 1265 and processing the motions received and transmitting these processed signals to the fire control system 1250 which sends them to the guidance system 1251 as velocity increments, which operate upon the velocities-to-be-gained just as the accelerometer velocity increments do after missile launching. One other function which the fire control system provides is that of supplying electrical power to the guidance system and continually monitoring the performance and preparedness of the guidance system. These functions may be best seen with reference to FIGS. 14*a–d*.

With respect to FIG. 16 and the particular positioning of the accelerometers along the SR, SV and J axes, a more detailed description of this may be had with reference to co-pending application titled A Stable Platform Reference System Ser. No. 435,552 filed Oct. 22, 1965.

Whenever the above processes; that is, the three operations enumerated above, are fulfilled, the fire control system, best shown in FIG. 14 as digital fire control section 1044, generates the SC (start computation) and the T0 (time zero) signals. These signals prevent further information inputs from the fire control subsystem and permit accelerometer velocity increments to enter the computer 1124. At this time, although there is no missile motion within the launching tube, the missile is in flight insofar as the guidance system is concerned. Missile velocities along the sensitive axes of the accelerometers 1139, 1151 and 1172 imparted by motion of the vehicle are detected and transmitted to the guidance computer 1124 to be processed in accordance with the program of the computer.

At signal T0, the computer 1124 is started and begins to program the missile flight. The actual ejection of the missile from the launching tube is timed by fire control subsystem 1044 so that ejection takes place within a predetermined time from the time signal T0 is initiated. If the time exceeds the predetermined time allowed, an excessive erection error will be accumulated, due to the earth's rotation, during the time interval between T0, when erection ceases, and the actual launch. If this predetermined time limit is exceeded, ejection of the missile is prevented; if not, compressed air or steam or any other suitable means is used to eject the missile through a rupturable membrane. As a result of this motion of the missile, the umbilical cord or cable is disconnected and the missile proceeds on its trajectory under control of its guidance system.

Figure 20:
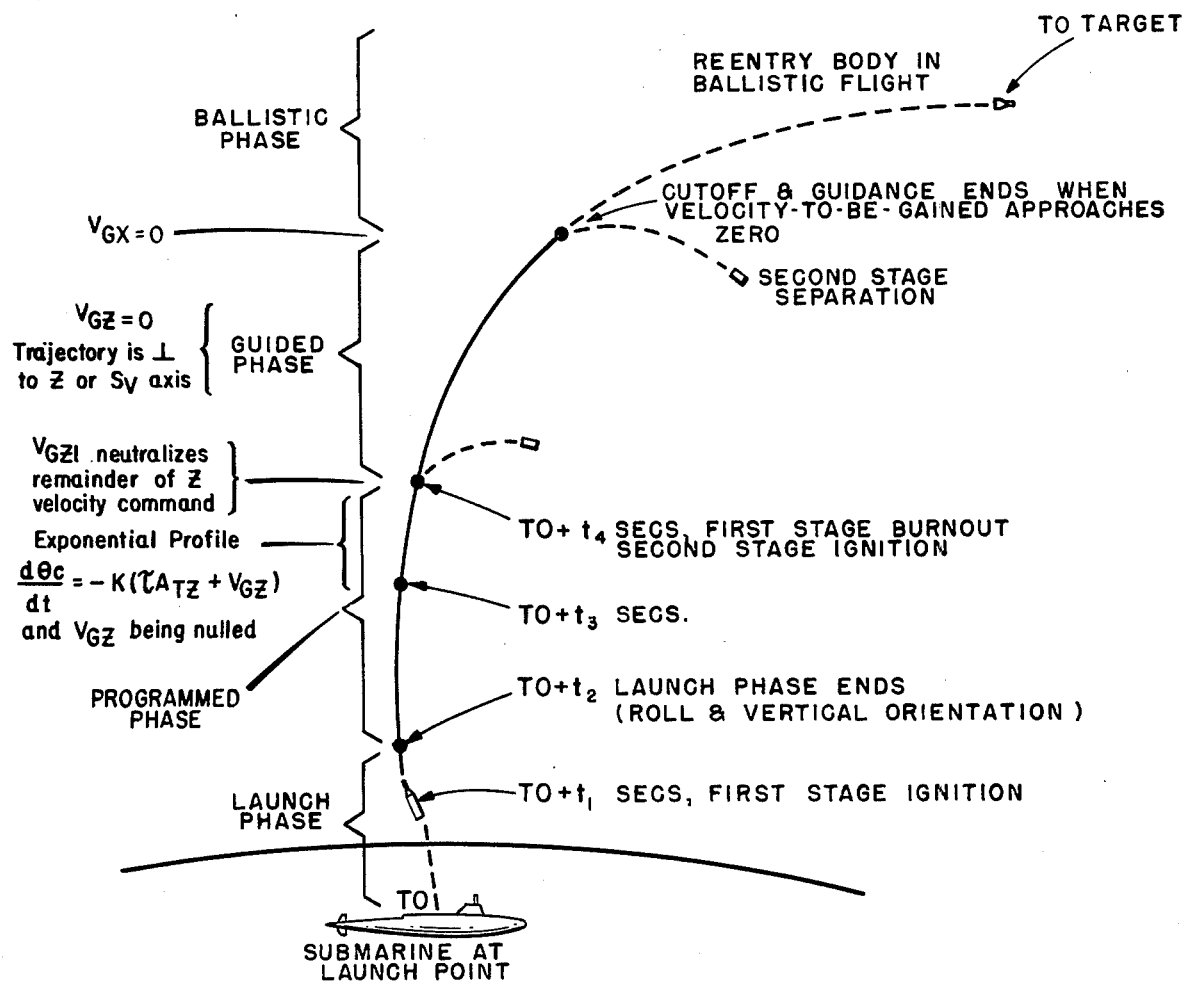
FIG. 20 represents a chronology of guided flight.

Now with reference to FIG. 20, there is shown a chronology of a guided missile flight. This flight may be broken up into four distinct phases; launch phase, program phase, guided phase and ballistic phase. Starting at time T0, whenever the vehicle is at launching point and throughout the launch sequence, the guidance computer 1124 (FIG. 14*a*) of the missile calculates pitch and yaw commands according to the guidance equations derived above; however, no pitch or yaw commands are actually issued until $T0+t_1$ seconds.

Once the missile is launched, at T0 it travels through the water until $T0+t_2$ seconds. At this point, the first stage motor of the missile is ignited and this occurs whenever the autopilot accelerometers indicate that the missile has traveled an approximate predetermined number of feet from T0. This point will normally occur about the point of $T0+t_2$ seconds after ejection of the missile from its launching tube.

The steering commands to the missile autopilot are inhibited until $T0+t_2$ seconds is for allowing the missile to first recover from any unusual attitude which it may be in as it breaks through the surface of the water. The missile control, during the launch phase, is solely through the missile attitude control loop, based on the attitude reference given by the stabilized member and measured by resolvers located on the gimbal axes of the stabilized member. As pointed out above, before launch, the missile pitch axis is oriented so that the missile pitch axis is parallel to the J accelerometer axes.

The launch phase ends $t_2$ seconds after T0, and the guidance system begins to issue steering commands which cause the missile to pitch over toward the target. Steering commands are issued in accordance with the above section dealing with the pitch program. Generally, the missile will pitch toward the target at its maximum rate for about five seconds, and then the pitch tapers off until in the last 20 seconds of the programmed phase only six additional degrees of pitch are attained and at the T0+$t_3$ point the pitch rate is less than 0.2 of a degree per second and the missile is flying at an optimum pitch angle of about 47° above horizontal.

The program phase ends at the first stage burnout and the guided phase of flight begins. After the first stage burnout and the second stage ignition, the missile rapidly pitches down to its terminal pitch angle as determined by the SKU term. First stage burnout takes place after about T0+$t_4$ seconds have elapsed in missile flight. Whenever the flight control system detects the first stage burnout, the first stage is dropped off in any suitable manner known to those skilled in the missile arts and the second stage is ignited.

As the missile continues on its flight, during the guided phase, it flies downrange in response to the pitch and yaw equations. The X or SR velocity-to-be-gained term has been reduced by the increasing missile velocity and has been modified by the effect of the Q terms. When the missile computer determines that the SR velocity-to-be-gained is less than 270 feet per second and, if the SV and J velocities-to-be-gained are less than 90 feet per second, a pre-arm signal PA is sent from the computer to the warhead section of the missile body. This signal is generated only when impact on the target is reasonably certain and it must be received in order for the warhead arming circuits (not shown) to operate when the re-entry body descends at the end of the flight. When the X or SR velocity-to-be-gained term becomes zero, the re-entry body is separated from the missile's second stage, and this ends the guided phase of the missile flight.

As the guided phase of the missile ends, the ballistic phase begins. The missile body which contains the warhead is now in a ballistic trajectory and will continue on until it strikes the target.

In summary, it is apparent that the guidance system of the instant invention has application in the guidance of ballistic missiles, the guidance of satellite launching vehicles and to any other situation in which a suitable desired velocity vector, or "correlated" velocity can be defined. The guidance system uses the computational philosophy of correlated velocity, or Q guidance concept, to guide, in the preferred embodiment, a ballistic missile from a fixed launching point along a trajectory to a predetermined target. The greatest part of the missile flight trajectory is unpowered and unguided and similar in many ways to the trajectory of an artillery shell. The artillery shell is made to hit its target by giving it a particular velocity as it leaves the barrel. The powered portion of the missile trajectory may be visualized as a long curved launch. The missile is steered so that this hypothetical barrel, which has a fixed elevation, is aimed at the target bearing. Then by varying only the speed with which the re-entry body (warhead section of the missile) leaves its "barrel," the range of flight may be varied to "zero in" on the target. Since all missiles perform differently, due to factors which are unpredictable, a means must be provided for varying the release velocity as a function of missile performance. An accelerometer on the stabilized member provides a measurement of missile performance in flight and transmits these measurements to a wired program digital computer that performs all the guidance calculations. Outputs from the computer, representative of missile departure from standard missile performance, are transmitted to a missile autopilot as command signals to cause the missile to correct to a trajectory that will terminate at the predetermined target. The missile is completely independent of ground support at time of launch, and is immune to jamming techniques.

Obviously many modifications and variations of the present invention are possible in the light of the above teachings. It is therefore to be understood that within the scope of the appended claims the invention may be practiced otherwise than as specifically described.

What is claimed is:

1. An inertial guidance system for a ballistic missile that provides navigation and control while it is proceeding in a flight trajectory to a predetermined target comprising:

first inertial reference frame having first, second and third mutually orthogonal axes, said second axis being substantially in a horizontal plane at the time of launch of said missile, and said first and third axes being in a vertical plane that is substantially in the plane of said trajectory, and said first axis is elevated 45° above said horizontal plane and essentially in the direction experiencing the highest dynamic range of input acceleration;

second inertial reference frame having first, second and third mutually orthogonal axes R, J and V, said second axis of said second inertial reference frame aligned with said second axis of said first inertial reference frame in said horizontal plane, said first and third axes being in a vertical plane that is substantially in the plane of said trajectory;

triad of accelerometers the sensitive axis of each being aligned with one axis of said first reference frame, said accelerometers providing signals representative of linear motion of said missile and requiring no information signals from sources external of the missile nor any airborne computation of the position of the missile in space;

triad of gyros, the sensitive axis of each being aligned with one axis of said second reference frame, said gyros providing signals representative of angular motion about the respective axes of said second reference frame and requiring no information signals from sources external of the missile nor any airborne computation of the position of the missile in space;

digital computer means coupled to receive said signals representative of linear motion from said triad of accelerometers for processing against preset parameters stored in said digital computer means for providing control signals along the pitch and yaw axes of said balistic missile;

autopilot means coupled to receive said control signals from said computer means and said signals representative of angular motion from said triad of gyros for providing mechanical control movements; and exhaust nozzle deflection means mechanically coupled to said autopilot means to deflect the exhaust of said ballistic missile for guidance in a flight trajectory.

2. An inertial guidance system as defined in claim 1 wherein said accelerometers are all pendulous gyro integrating accelerometers.

3. The inertial guidance system of claim 1 wherein said digital computer means comprises;

storing means for providing storage of initial values of velocity-to-be-gained along the axes of said first reference frame, combining means coupled to said triad of acelerometers and said storing means for obtaining a composite signal representative of the components of the velocity-to-be-gained vector along the axes of said first reference frame generally in accordance with the equation $$\overline{V}_g = \overline{V}_c - \overline{V}_m$$

where $\overline{V}_g$ = velocity-to-be-gained vector
$\overline{V}_c$ = correlated velocity vector, being that velocity required at the present time to carry the missile to the target in a free fall
$\overline{V}_m$ = missile velocity vector, and pitch and yaw steering means for providing pitch and yaw command signals to guide said missile.

4. The inertial guidance system of claim 3 wherein said yaw steering means comprises yaw circuitry means for producing command yaw signals to said autopilot means in accordance with the equation $$\frac{d\theta_c}{dt} = K[V_{GY} - \tau A_{TY}]$$

where
K = constant
$\tau$ = time constant
$A_{TY}$ = acceleration indicated by accelerometer along second axis of said first inertial reference frame,
$V_{GY}$ = velocity-to-be-gained by the missile along the second axis of said first inertial reference frame.

5. The inertial guidance system of claim 1 wherein said autopilot means comprises inner, middle, and outer gimbal angle resolver means, said resolver means coupled to receive pitch and yaw control signals from said computer means and output means coupled to said resolver means which provides signals representative of missile roll, pitch, and yaw attitude errors.

6. An inertial guidance system for a ballistic missile that is completely independent of ground support at and after time of launch comprising:

stable platform means for providing space-stabilized reference, triad of accelerometers for providing acceleration measurements of said stable platform as it moves through space, said accelerometers requiring no information signals from sources external of the missile nor any airborne computation of the position of the missile in space;

triad of gyros for providing angular measurements of said stable platform as it moves through space, said gyros requiring no information signals from sources external of the missile nor any airborne computation of the position of the missile in space, said triad of gyros positioned on said stable platform means so that the sensitive axis of each gyro is aligned coincident with one of coordinate axes X, Y, and Z of said stable platform, said X and Y axes being substantially in a horizontal plane at the time of launch and said X and Z axes being in a vertical plane that is substantially in the plane of the desired trajectory, said triad of accelerometers positioned on said stable platform means so that the sensitive axis of each is aligned coincident with one axis of an orthogonal X', Y', and Z' reference frame of said stable platform, said Y' axis being coincident with said Y axis, and said X' and Z' axes being in a vertical plane that is substantially in the plane of the desired trajectory, and said X' and Z' axes being respectively above and below said horizontal plane by approximately forty-five degrees, first, second and third driving means electromechanically intercoupling said gyros and said stable platform means for moving said stable platform about inner, middle, and outer axes of a stable platform gimbal system, first, second, third, fourth, and fifth resolver means mechanically coupled to said first, second, and third driving means, said first driving means coupled for movement about the inner gimbal axis in response to signals from a gyro positioned with its sensitive axis along said Z axis, and said second driving means and said first resolver means coupled together for movement about the inner gimbal axis in response to signals from gyros positioned with their respective sensitive axes along said X and Y axes, and said third driving means and said first resolver means coupled together for movement from the outer gimbal axis in response to signals from gyros positioned with their respective sensitive axes along said X and Y axes, output means from said second resolver means coupled to electrically transmit signals representative of angular movement about said inner gimbal axis to the inputs of said third and fourth resolver means, output means from said third resolver means coupled to electrically transmit a signal depending on angular movements about said inner and middle gimbal axes to the input of said fourth resolver means, first amplifier means electrically coupled to receive an output signal from said fourth resolver means that is representative of movement of the missile about its roll axis, the sensitivity of the roll angle signal being independent of the missile's pitch angle, and further being directly representative of roll error, second amplifier means electrically coupled to receive an output signal from said fourth resolver means that is representative of movement of the missile about its yaw axis, the sensitivity of the yaw angle signal being independent of the missile's pitch angle, third amplifier means electrically coupled to receive an output signal from said fifth resolver means that is representative of movement of the missile about its pitch axis, said pitch axis being coincident with the outer gimbal axis, computer means coupled to receive the signal outputs of said triad of accelerometers that are representative of acceleration of said stable platform, respectively, along said X', Y', and Z' axes, said computer means processing the acceleration signals against preset parameters to provide control signals along the pitch and yaw axes of the missile, and an engine cut-off signal, pitch coupling means receiving signals from said computer means and said fifth resolver means for combining these respective signals into a composite signal representative of pitch error, and yaw coupling means receiving signals from said computer means and said fourth resolver means for combining these respective signals into a composite signal representative of yaw error.

7. The inertial guidance system of claim 6 wherein said computer means comprises a digital computer suited for in-flight use.

8. The inertial guidance system of claim 6 wherein said computer means comprises a digital differential analyzer organized for the guidance function and capable of proper operation in a missile environment.

9. The inertial guidance system of claim 6 wherein said triad of accelerometers comprise three pendulous integrating gyro accelerometers.

10. The inertial guidance system of claim 6 wherein said triad of gyros consist of three single-degree-of-freedom inertial reference integrating gyros.

11. An inertial guidance system as defined in claim 6 wherein said pitch and yaw coupling means comprise an incremental stepping motor for receiving electrical pulses from said digital computer that are representative of the desired incremental changes in pitch and yaw angle, and a resolver mechanically connected to said stepping motor and electrically coupled to said fourth and fifth stable platform resolver means for providing electrical signals representative of pitch and yaw errors.

12. An inertial guidance system as set forth in claim 6 wherein said triad of accelerometers comprise pendulous integrating gyro means for sensing movement about said gyro's longitudinal axis, signal generator micorsyn means operatively coupled to said pendulous integrating gyro means to transform the movement sensed into electrical signals, demodulating means coupled to receive the electrical signals from said signal generator means for providing a demodulated output, servo amplifier means electrically coupled to said demodulating means for providing a drive signal to the accelerometer torque motor, torque motor means mechanically coupled to a frame which holds said pendulous integrating gyro means, said motor rotating said gyro to null its signal generator output, and encoder means mechanically coupled to said frame to receive angular movements of said frame and generate output pulses representative of increments of such angular movement.

13. The inertial guidance system as defined in claim 7 wherein said digital computer means comprises storing means for providing storage of initial values of velocity-to-be-gained along the X, Y, and Z axes, combining means coupled to said triad of accelerometers and said storing means for obtaining a composite signal of the velocity-to-be-gained along said X, Y, and Z axes, and pitch and yaw steering circuits for providing pitch and yaw incremental command signals.

14. An inertial guidance system for a ballistic missile that provides navigation and control while it is proceeding in a flight trajectory to a predetermined target, comprising:

a first inertial reference frame comprising mutually orthogonal axes X, Y and Z, said Y axis in a horizontal plane at the time of launch, said X and Z axes in a plane that is perpendicular to said horizontal plane at the time of launch and substantially in the plane of said trajectory, and said X axis being elevated 45° above said horizontal plane and substantially in the direction experiencing the highest dynamic range of input acceleration, a second inertial reference frame comprising mutually orthogonal axes X', Y' and Z', and said X' axis parallel to said X axis, and said Y' axis parallel to said Y axis, and said Z' axis parallel to said Z axis, an inertial measuring unit comprising a triad of accelerometers, the sensitive axis of each accelerometer aligned with one axis of said first reference frame, and said accelerometers providing signals representative of linear motion of said vehicle, said accelerometers requiring no information signals from sources external of the missile nor any airborne computation of the position of the missile in space, and said measuring unit further providing a triad of gyros, the sensitive axis of each gyro aligned with one of said axes in said second reference frame, said gyros providing signals representative of angular motion about the respective axis of said second reference frame, said gyros requiring no information signals from sources external of the missile nor any airborne computation of the position of the missile in space, a digital computer coupled to receive said signals representative of linear motion for processing against preset parameters stored in said computer for providing control signals along the pitch and yaw axes of said ballistic missile, and autopilot means coupled to receive said control signals from said computer means and said signals representative of angular motion from said gyros for providing mechanical control movements.

15. An inertial guidance system as defined in claim 14 wherein said accelerometer aligned with said X axis constitutes a pendulous gyro integrating accelerometer.

16. An inertial guidance system for a ballistic missile as defined in claim 15 wherein said accelerometers along said Y and Z axes constitute pulse rebalanced integrating accelerometers.

17. An inertial guidance system for a ballistic missile as defined in claim 16 wherein said gyros comprise single degree of freedom inertial reference integrating gyros.

18. An inertial guidance system for a ballistic missile as defined in claim 17 wherein the output axis of each of said pulse rebalanced accelerometers and the output axis of two of said gyros are oriented to minimize the effects of acceleration on the error performance of said gyros and accelerometers.

19. An inertial guidance system as defined in claim 18 wherein the output axis of two of said gyros, and the output axis of said pulse rebalanced integrating accelerometers are all essentially parallel with said X axis.

20. An inertial guidance system for a ballistic missile as defined in claim 19 wherein the output axis of said pulse rebalanced integrating accelerometers is substantially parallel to said X axis, and wherein the output axis of one of said gyros is parallel to said X axis and the output axis of the remaining two gyros is parallel to said Z' axis.

21. An inertial guidance system for a ballistic missile as set forth in claim 20 wherein said X axis is elevated by approximately forty-five degrees from said horizontal plane at the time of launch.

22. An inertial guidance system for a ballistic missile as set forth in claim 18 wherein said X axis is elevated by approximately forty-five degrees from said horizontal plane at the time of launch.

23. An inertial guidance system for a ballistic missile as set forth in claim 19 wherein said X axis is elevated by approximately forty-five degrees from said horizontal plane at the time of launch.

24. An inertial guidance system for a ballistic missile as set forth in claim 20 wherein said X axis is elevated by approximately forty-five degrees from said horizontal plane at the time of launch.

25. The inertial guidance system of claim 21 wherein said computer means comprises
storing means for providing storage of initial values of velocity-to-be-gained along the axes of said first reference frame,
combining means coupled to said measurement means and said storing means for obtaining a composite signal representative of the components of the velocity-to-be-gained vector along the axes of said first reference frame generally in accordance with the equation $$\overline{V}_g = \overline{V}_c - \overline{V}_m$$

where
$\overline{V}_g$ = velocity-to-be-gained vector
$\overline{V}_c$ = correlated velocity vector, being that velocity required at the present time to carry the missile to the target in a free fall
$\overline{V}_m$ = missile velocity vector, and pitch and yaw steering means for providing pitch and yaw command signals to guide said missile.

26. An inertial guidance system of claim 25 wherein said pitch steering means comprises
pitch circuitry for producing command signals to activate said autopilot means and pitch said missile in accordance with the equation $$\frac{d\theta_c}{dt} = K(\tau A_{tz} + V_{GZ})$$

where
$(d\theta_c/dt)$ = angular rate of pitch
K = constant
$\tau$ = time constant
$A_{TZ}$ = acceleration indicated by accelerometer along Z axis of said first inertial reference frame, and
$V_{GZ}$ = instantaneous velocity along said Z axis, and incorporates appropriate initial conditions.

27. An inertial guidance system of claim 25 wherein said pitch steering means comprises pitch circuitry for producing command signals to activate said autopilot means and pitch said missile in accordance with a first pitch equation $$\frac{d\theta_c}{dt} = -K(\tau A_{TZ} + V_{GZ})$$

where
$(d\theta_c/dt)$ = angular rate of pitch
K = constant
$\tau$ = time constant
$A_{TZ}$ = acceleration indicated by accelerometer along Z axis of said first inertial reference frame and
$V_{GZ}$ = instantaneous velocity along said Z axis and incorporates appropriate initial conditions
and at a predetermined time later a second pitch equation $$\frac{d\theta_c}{dt} = K(\overline{A}_T \times \overline{V}_G)$$

where
$\overline{a}_T$ = thrust vector
$\overline{V}_G$ = velocity-to-be-gained.

28. An inertial guidance system as defined in claim 25 wherein said pitch steering means affords skewed pitch control, said pitch steering means comprising
pitch circuitry for producing command signals causing said autopilot to pitch said missile in accordance with the equation $$\frac{d\theta_c}{dt} = +K\left[\frac{\pi}{\cos\alpha}(A_{TZ} - \tan\alpha)A_{TX}) + V_Z\right]$$

where
$(d\theta_c/dt)$ = angular pitch rate
$\tau$ = time constant
$A_{TZ}$ = acceleration indicated by accelerometer along said Z axis of said first inertial reference frame,
$A_{TX}$ = acceleration indicated by accelerometer along said X axis of said first inertial reference frame,
$V_Z$ = instantaneous velocity along said Z axis,
$\alpha$ = angle between the X axis of said first reference frame and the average desired missile direction that yields maximum flight range.

29. An inertial guidance system as defined in claim 25 wherein said pitch steering means affords skewed pitch control by controlling the velocity of said missile along a skewed coordinate axis, $Z_{SKU}$, inertially fixed and angularly displaced from said Z axis, said pitch steering means comprising
pitch circuitry producing command signals causing said autopilot to pitch said missile so that the missile velocity in the direction of said $Z_{SKU}$ axis complies with the equation $$V_{SKU} = \int_0^t (A_{TZ} - \tan\alpha\, A_{TX})dt + V_{ZC}$$

where
$V_{SKU}$ = instantaneous velocity along said $Z_{SKU}$ axis,
$A_{TZ}$ = acceleration indicated by accelerometer along said Z axis,
$A_{TS}$ = acceleration indicated by accelerometer along said X axis, tan $\alpha$=constant, where $\alpha$ is the angle between said X axis and the direction that yields the maximum range for the particular missile, and $V_{ZC}$=final desired velocity along said Z axis.

30. The inertial guidance system of claim 25 wherein said yaw steering means comprises yaw circuitry for producing command yaw signals to said autopilot in accordance with the equation $$\frac{d\Psi_c}{dt} = K[\tau A_{TY} - V_{GY}]$$

where $(d\psi_c/dt)$=the angular yaw rate

K=constant $\tau$=time constant $A_{TY}$=acceleration indicated by the accelerometer along said Y axis, and $V_{GY}$=velocity-to-be-gained by the missile along said Y axis.

31. An inertial guidance system for a ballistic missile comprising a triad X, Y, and Z of inertially fixed mutually orthogonal reference axes, and at the time of launch of said missile, said X axis elevated by substantially 45° above the horizontal, said Z axis in the direction approximately 45° below said horizontal, and said X and Z axes substantially in the plane of the intended trajectory, first, second and third accelerometers, the sensitive axis of each accelerometer coinciding with said X, Y, and Z axes, respectively, first and second function generators, and a tan $\alpha$ multiplier, said multiplier receiving the output of said first accelerometer, first, second and third summing means, said first summing means adding the negative of the output of said first function generator to the negative of the output of said first accelerometer, said second summing means adding the negative of the output of said second function generator to the negative of the output of said second accelerometer, and said third summing means adding the negative of the output of said tan $\alpha$ multiplier to the output of said third accelerometer, first, second and third time integrators, said first integrator integrating the added output signal of said first summing means and incorporating in the integration the initial velocity-to-be-gained magnitude in the X direction, said first integrator thereby generating the velocity-to-be-gained signal along said X direction which is the input to the first and second function generators, said second integrator integrating the added output of said second summing means, and said third integrator integrating the added output of said third summing means, and incorporating in the integration the initial velocity-to-be-gained in said Z direction, and a negative Z command neutralizing signal magnitude, first, second, third and fourth amplifiers, said first amplifier amplifying the output signal of said second integrator, said second amplifier amplifying the output signal of said second accelerometer, said third amplifier amplifying the output of said third integrator, and said fourth amplifier amplifying the output of said third summing means, and fourth and fifth summing means, said fourth summing means subtracting the output signal emitted by said first amplifier from the output of said second amplifier, the difference constituting the yaw rate command signal for said missile, said fifth summing means adding the output signals of said third and fourth amplifiers and the sum constituting the pitch rate command signal of said missile.

* * * * *